(12) United States Patent
Hart et al.

(10) Patent No.: US 8,075,863 B2
(45) Date of Patent: Dec. 13, 2011

(54) METHODS AND DEVICES FOR GROWTH AND/OR ASSEMBLY OF NANOSTRUCTURES

(75) Inventors: Anastasios J. Hart, Somerville, MA (US); Alexander H. Slocum, Bow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 1384 days.

(21) Appl. No.: 11/138,881

(22) Filed: May 26, 2005

(65) Prior Publication Data

US 2006/0067871 A1 Mar. 30, 2006

Related U.S. Application Data

(60) Provisional application No. 60/574,413, filed on May 26, 2004, provisional application No. 60/678,335, filed on May 6, 2005.

(51) Int. Cl.
*D01F 9/12* (2006.01)
*D01F 9/127* (2006.01)
(52) U.S. Cl. .................... 423/447.3; 977/843; 977/890
(58) Field of Classification Search ............... 423/447.2, 423/447.3, 299, 322, 324, 348, 351, 364, 423/447.1, 447.4, 447.5; 977/842, 843, 883, 977/893, 890, 891, 892, 895, 896, 897, 900, 977/901; 264/165, 171.1, 171.12, 171.26, 264/172.11, 172.13, 430, 431, 432, 433, 264/437, 464, 474, 489, 494, 1.1, 1.21, 1.27, 264/1.29, 1.36, 1.6, 1.7, 29.2, 103, 138, 141, 264/145, 168, 176.1, 209.1, 209.2, 209.6, 264/209.8, 211.11, 211.24, 212, 240, 339, 264/402, 405, 413, 414, 415, 425, 438, 439, 264/440, 441, 465, 477, 495, 496, 500, 503, 555; 264/563, 564

See application file for complete search history.

(56) References Cited

U.S. PATENT DOCUMENTS 3,549,734 A 12/1970 Yasuda et al.
(Continued)

FOREIGN PATENT DOCUMENTS

WO WO 02092506 A1 11/2002
(Continued)

OTHER PUBLICATIONS

Lai et al., "The crystalline properties of carbon nitride nanotubes synthesized by electron cyclotron resonance plasma," 2003, Thin Solid Films, 444, pp. 38-43.*

(Continued)

*Primary Examiner* — Emily Le
*Assistant Examiner* — Brittany M Martinez
(74) *Attorney, Agent, or Firm* — Wolf, Greenfield & Sacks, P.C.

(57) ABSTRACT

The present invention relates to the synthesis and processing of materials, including nanostructures such as carbon nanotubes (CNTs). Methods and devices are presented for controlling the growth and/or assembly of nanostructures, in some cases using small channel-type environments (e.g., microfluidic channels). In these micro-scale environments, forces can be applied to nanostructures during their growth process, for instance, to control the rate and/or direction of growth of the nanostructures. These forces can also be used to direct the assembly of nanostructures into ordered configurations such as strands or other assemblies having micro- and macroscopic length scales. In some embodiments, multiple forces are applied simultaneously to direct the growth and/or assembly of nanostructures.

21 Claims, 55 Drawing Sheets

U.S. PATENT DOCUMENTS

| | | | |
|---|---|---|---|
| 5,145,616 | A | 9/1992 | Sadanobu et al. |
| 5,169,616 | A | 12/1992 | Ross et al. |
| 5,171,560 | A | 12/1992 | Tennent |
| 5,500,200 | A | 3/1996 | Mandeville et al. |
| 5,762,734 | A | 6/1998 | DeLucia et al. |
| 6,110,590 | A | 8/2000 | Zarkoob et al. |
| 6,159,892 | A | 12/2000 | Moy et al. |
| 6,221,330 | B1 | 4/2001 | Moy et al. |
| 6,232,706 | B1 | 5/2001 | Dai et al. |
| 6,308,509 | B1 | 10/2001 | Scardino et al. |
| 6,325,909 | B1* | 12/2001 | Li et al. ............ 205/106 |
| 6,331,265 | B1 | 12/2001 | Dupire et al. |
| 6,331,690 | B1 | 12/2001 | Yudasaka et al. |
| 6,346,189 | B1 | 2/2002 | Dai et al. |
| 6,375,917 | B1 | 4/2002 | Mandeville et al. |
| 6,379,136 | B1 | 4/2002 | Najour et al. |
| 6,413,487 | B1 | 7/2002 | Resasco et al. |
| 6,478,994 | B1* | 11/2002 | Sneddon et al. ............ 264/43 |
| 6,699,454 | B1 | 3/2004 | Moy et al. |
| 6,790,425 | B1 | 9/2004 | Smalley et al. |
| 6,803,840 | B2* | 10/2004 | Hunt et al. ............ 333/186 |
| 6,837,928 | B1 | 1/2005 | Zhang et al. |
| 6,880,576 | B2* | 4/2005 | Karp et al. ............ 137/806 |
| 6,962,823 | B2* | 11/2005 | Empedocles et al. ............ 438/3 |
| 7,115,305 | B2* | 10/2006 | Bronikowski et al. ..... 427/249.1 |
| 7,229,692 | B2* | 6/2007 | Melechko et al. ............ 428/446 |
| 7,290,667 | B1* | 11/2007 | Bakajin et al. ............ 210/503 |
| 7,329,567 | B2* | 2/2008 | Furukawa et al. ............ 438/142 |
| 2001/0014307 | A1 | 8/2001 | Moy et al. |
| 2001/0019238 | A1 | 9/2001 | Dai et al. |
| 2002/0014667 | A1 | 2/2002 | Shin et al. |
| 2002/0085968 | A1 | 7/2002 | Smalley et al. |
| 2002/0090331 | A1 | 7/2002 | Smalley et al. |
| 2002/0102193 | A1 | 8/2002 | Smalley et al. |
| 2002/0102194 | A1 | 8/2002 | Smalley et al. |
| 2002/0102201 | A1 | 8/2002 | Colbert et al. |
| 2002/0113335 | A1 | 8/2002 | Lobovsky et al. |
| 2002/0117659 | A1 | 8/2002 | Lieber et al. |
| 2002/0146714 | A1* | 10/2002 | Lieber et al. ............ 435/6 |
| 2002/0150524 | A1 | 10/2002 | Smalley et al. |
| 2002/0159943 | A1 | 10/2002 | Smalley et al. |
| 2002/0172767 | A1 | 11/2002 | Grigorian et al. |
| 2002/0178846 | A1 | 12/2002 | Dai et al. |
| 2002/0185184 | A1* | 12/2002 | O'Connor et al. ............ 137/822 |
| 2003/0012722 | A1 | 1/2003 | Liu |
| 2003/0013046 | A1* | 1/2003 | Fonash et al. ............ 430/314 |
| 2003/0042128 | A1 | 3/2003 | Harutyunyan et al. |
| 2003/0066960 | A1 | 4/2003 | Colbert et al. |
| 2003/0075444 | A1 | 4/2003 | Huang et al. |
| 2003/0102585 | A1 | 6/2003 | Poulin et al. |
| 2003/0116503 | A1 | 6/2003 | Wang et al. |
| 2003/0165074 | A1 | 9/2003 | Segal et al. |
| 2003/0165418 | A1* | 9/2003 | Ajayan et al. ............ 423/447.2 |
| 2003/0165648 | A1 | 9/2003 | Lobouvsky et al. |
| 2003/0170166 | A1 | 9/2003 | Smalley et al. |
| 2003/0175200 | A1 | 9/2003 | Smalley et al. |
| 2003/0186522 | A1 | 10/2003 | Duan et al. |
| 2003/0190277 | A1 | 10/2003 | Moy et al. |
| 2003/0190278 | A1 | 10/2003 | Wang et al. |
| 2003/0198812 | A1 | 10/2003 | Rueckes et al. |
| 2003/0211030 | A1 | 11/2003 | Olivier et al. |
| 2003/0211322 | A1 | 11/2003 | Zhang et al. |
| 2003/0234465 | A1 | 12/2003 | Chen et al. |
| 2004/0005258 | A1* | 1/2004 | Fonash et al. ............ 422/271 |
| 2004/0005269 | A1 | 1/2004 | Huang et al. |
| 2004/0005723 | A1* | 1/2004 | Empedocles et al. ............ 438/1 |
| 2004/0022719 | A1 | 2/2004 | Beguin et al. |
| 2004/0028812 | A1 | 2/2004 | Wessels et al. |
| 2004/0053053 | A1 | 3/2004 | Jiang et al. |
| 2004/0053780 | A1 | 3/2004 | Jiang et al. |
| 2004/0055892 | A1 | 3/2004 | Oh et al. |
| 2004/0075159 | A1 | 4/2004 | Vogeli |
| 2004/0076562 | A1* | 4/2004 | Manzanec et al. ............ 422/211 |
| 2004/0077107 | A1 | 4/2004 | Vogeli |
| 2004/0238052 | A1* | 12/2004 | Karp et al. ............ 137/822 |
| 2005/0112051 | A1* | 5/2005 | Liu et al. ............ 423/447.1 |
| 2005/0272159 | A1* | 12/2005 | Ismagilov et al. ............ 436/34 |

FOREIGN PATENT DOCUMENTS

| | | | |
|---|---|---|---|
| WO | WO 03052181 | A1 | 6/2003 |
| WO | WO 03060923 | A1 | 7/2003 |
| WO | WO 03062146 | A1 | 7/2003 |
| WO | WO 2004007361 | A2 | 1/2004 |

OTHER PUBLICATIONS

Araki et al., "Template synthesis and characterization of gold nano-wires and -particles in mesoporous channels of FSM-16, " 2003, Journal of Molecular Catalysis A: Chemical, 199, pp. 95-102.*

Chan et al., "Size-Controlled Growth of CdSe Nanocrystals in Microfluidic Reactors," 2003, Nano Letters, vol. 3, No. 2, pp. 199-201.*

Huang et al., "Controlled Growth of Single-Walled Carbon Nanotubes from an Ordered Mesoporous Silica Template," 2003, Nano Letters, vol. 3, No. 3, pp. 299-303.*

Jensen, "Microreaction engineering * is small better?," 2001, Chemical Engineering Science, 56, pp. 293-303.*

Jeon et al., "Fabricating complex three-dimensional nanostructures with high-resolution conformable phase masks," 2004, PNAS, vol. 101, No. 34, pp. 12428-12433.*

Kenis et al., "Microfabrication Inside Capillaries Using Multiphase Laminar Flow Patterning," 1999, Science, vol. 285, pp. 83-85.*

Kyotani et al., "Preparation of Ultrafine Carbon Tubes in Nanochannels of an Anodic Aluminum Oxide Film," 1996, Chem. Mater., 8, pp. 2109-2113.*

Matsumoto et al., "Single-Electron Transistor with Ultra-High Coulomb Energy of 5000 K Using Position Controlled Grown Carbon Nanotube as Channel," 2003, Jpn. J. Appl. Phys., vol. 42, pp. 2415-2418.*

Tseng et al., "Monolithic Integration of Carbon Nanotube Devices with Silicon MOS Technology," 2004, Nano Letters, vol. 4, No. 1, pp. 123-127.*

Yanagishita et al., "Carbon Nanotubes with a Triangular Cross-section, Fabricated Using Anodic Porous Alumina as the Template," 2004, Adv. Mater., 16, No. 5, pp. 429-432.*

Zhang et al., "Electric-field-directed growth of aligned single-walled carbon nanotubes," 2001, Applied Physics Letters, vol. 79, No. 19, pp. 3155-3157.*

Fan, S. et al., "Self-Oriented Regular Arrays of Carbon Nanotubes and Their Field Emission Properties," *Science*, 1999, vol. 283, pp. 512-514.

Franklin, N. R. et al., "An Enhanced CVD Approach to Extensive Nanotube Networks with Directionality," *Advanced Materials*, 2000, vol. 12, No. 12, pp. 890-894.

Gjerde, K. et al., "Fabrication of Microliquid Channels with In-situ Grown Inclined Carbon Nanotubes," $8^{TH}$ *International Conference on Miniaturized Systems for Chemistry and Life Sciences*, 2004, pp. 327-329, Malmo, Sweden.

Hart, A. et al., "Design and Fabrication of Microchannel Arrays for Combinatorial Studies of Nanomaterials Growth," Department of Mechanical Engineering, MIT, May 2005, Proc. of $5^{th}$ Euspen International Conference, Montpellier, France.

Huang, Y. et al., "Directed Assembly of One-Dimensional Nanostructures into Functional Networks," *Science*, 2001, vol. 291, pp. 630-633.

Liivak, O. et al., "A Microfabricated Wet-Spinning Apparatus to Spin Fibers of Silk Proteins. Structure—Property Correlations," *Macromolecules*, 1998, vol. 31, pp. 2947-2951.

* cited by examiner (a)

(b)

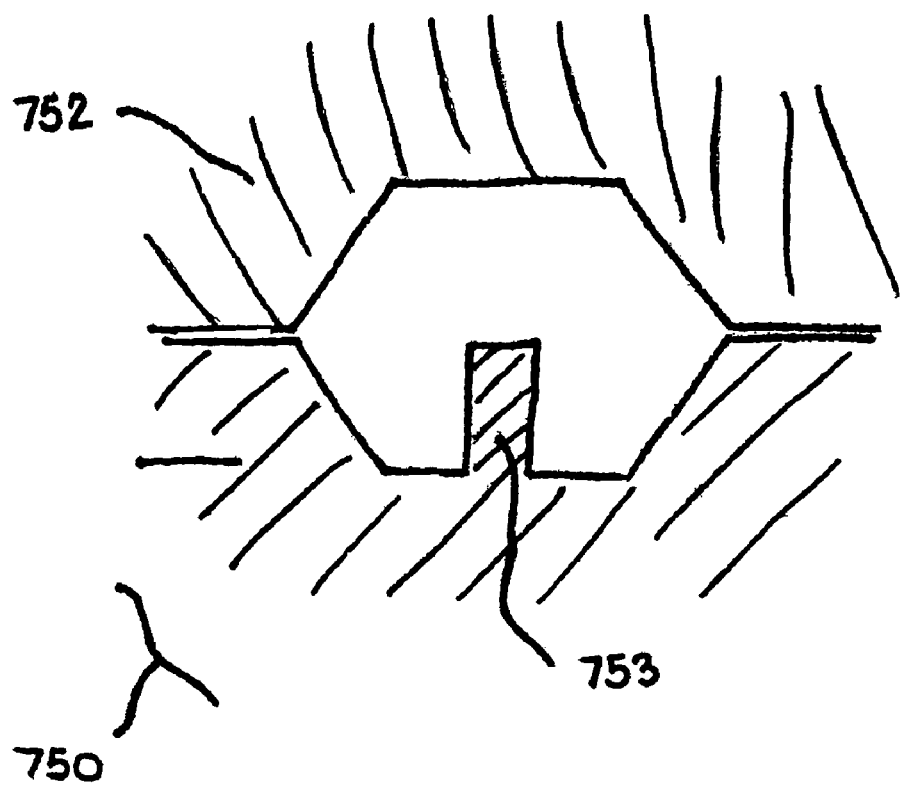
FIG. 17 (con't)

(a)

(b)

(a)

(b)

(a) 1

(b) 2

(c) 3

(d) 4

(e) 5

(f) 6

METHODS AND DEVICES FOR GROWTH AND/OR ASSEMBLY OF NANOSTRUCTURES

RELATED APPLICATIONS

This application claims priority under 35 U.S.C. §119(e) to U.S. Provisional Application Ser. No. 60/574,413, entitled "Methods and Devices for Growth and Assembly of Nanostructures Using Small Channel Environments," filed on May 26, 2004, and to U.S. Provisional Application Ser. No. 60/678,335, entitled "Methods and Devices for Growth and Assembly of Nanostructures Using Small Channel Environments," filed on May 6, 2005, which are incorporated herein by reference.

FIELD OF INVENTION

The present invention relates generally to the synthesis and processing of materials, and more particularly to the growth and/or assembly of elongated nanostructures such as carbon nanotubes.

BACKGROUND

The process of synthesizing nanostructures by chemical vapor deposition (CVD), force instance by the Vapor-Liquid-Solid (VLS) mechanism, involves growth of a rod or tube-like solid nanostructure from a catalyst or seed particle. The particle decomposes gaseous reactive precursors, and under appropriate conditions, the nanostructure grows from the particle. Elongated nanostructures (e.g., rod- or tube-like) can be grown by this method.

While these nanostructures and seed particles are commonly only a few nanometers in diameter, reaction zones in traditional growth systems for nanomaterials, such as tube furnaces, are centimeters to meters in size. In these systems, the growth reactions are often mediated in part by the flow rates, pressure, and temperature established at the macro-scales of the growth chambers, rather than at the micro- and nanoscales of the growth processes. In addition, because the forces experienced by the nanostructures during growth are dominated by phenomena such as thermal vibration, free convection, or surface interactions, growth systems may not be capable of efficiently directing the growth and/or assembly of individual nanostructures, or groups of nanostructures, i.e., into ordered macroscopic configurations (e.g., fibers). Often, localized control of growth conditions is achieved by the location of the catalyst particles, which determine where growth initiates.

SUMMARY OF THE INVENTION

Methods and devices for the growth and/or assembly of nanostructures as well as elongated nanostructures are provided.

In one aspect of the invention, a method is provided. The method comprises providing a catalyst positioned in a microfluidic channel, flowing a fluid in a first direction in the microfluidic channel, initiating growth of an elongated nanostructure from the catalyst, and continuing growth of the elongated nanostructure substantially in the first direction in the microfluidic channel.

In another aspect of the invention, a method is provided. The method comprises providing a microfluidic channel, and growing a cylindrical elongated nanostructure in the microfluidic channel, wherein the ratio of a cross-sectional dimension of the microfluidic channel to a cross-sectional dimension of the cylindrical elongated nanostructure is greater than 10:1.

In another aspect of the invention, a method is provided. The method comprises flowing a fluid in a first direction, growing a plurality of elongated nanostructures substantially in the first direction, and assembling, at least in part by the fluid flowing in the first direction, a strand comprising the plurality of elongated nanostructures.

In another aspect of the invention, a method is provided. The method comprises growing a plurality of elongated nanostructures substantially in a first direction by applying a first force in the first direction, and displacing the elongated nanostructures by applying a second force in a second direction.

In another aspect of the invention, a method is provided. The method comprises growing a plurality of elongated nanostructures substantially in a first direction by applying a first force in the first direction, and growing the plurality of elongated nanostructures substantially in a second direction by applying a second force in the second direction.

In another aspect of the invention, a method is provided. The method comprises providing a porous substrate including a back surface and a front surface, flowing a fluid from the back surface to the front surface of the substrate, passing the fluid through pores of the substrate, and growing an elongated nanostructure from a surface of the substrate.

In another aspect of the invention, a structure is provided. The structure comprises a strand including a first end and a second end defining a length and comprising a plurality of nanotubes or nanowires, wherein at least about 50% of the nanotubes or nanowires extend from the first end to the second end, the length being at least 1 cm.

In another aspect of the invention, a method is provided. The method comprises providing a precursor to an elongated nanostructure in a chamber in fluid communication with a microfluidic channel, and flowing the precursor in the microfluidic channel.

An embodiment of the present invention provides a method for controlling growth of elongated nanostructures, such as carbon nanotubes.

Another embodiment provides a method for using small- or micro-scale environments, such as reactor devices comprising networked arrays of microchannels containing growth sites, to control and direct the growth of and/or assembly of nanostructures.

Another embodiment provides a method for continuous production of elongated nanostructures using micro-scale environments by controlling growth of individual nanostructures or groups of nanostructures at isolated growth sites, and by assembling sequentially larger groups of nanostructures before the output point of the environment.

Another embodiment provides a method for growing and manipulating nanostructures with extremely large aspect ratios within devices, and assembling these nanostructures into desired configurations and orientations having desired properties.

Another embodiment provides a method for using forces in micro-scale environments, such as shear forces and pressure forces introduced by fluid flows in microchannels, and electrostatic forces introduced by electric fields, for controlling the growth of nanostructures, and the configuration and orientation of growth and assembly of nanostructures.

Another embodiment provides a method for using a gas flow in a microchannel to establish forces on a nanostructure or nanostructures growing from fixed or floating sites in a microchannel, for example to affect the processes of growth and assembly of nanostructures, to orient the nanostructures with the gas flow, to exert forces on the growth sites, and/or to suspend the nanostructures in the channel.

Another embodiment provides a method for creating micro-scale (e.g., microchannel) environments with features, such as islands, for anchoring growth sites and smooth surfaces, with dimensions that approach the critical dimensions of the nanostructures of interest, using techniques including microfabrication and micromachining processes known to those of ordinary skill in the art.

Another embodiment provides a method for creating three-dimensional structures within micro-scale environments, such as microchannels with different depths, microchannels with sudden changes in cross-sectional dimensions, and shaped protrusions.

Another embodiment provides a method for creating massively parallel arrays of microchannels, growth sites, or other structures in accordance with embodiments of the present invention, for distributing and networking these features to achieve growth and assembly of nanostructures in the desired configurations and orientations, and to enable continuous production of nanostructures using the environment, or production of nanostructures within the environment and then removal of the environment so that the nanostructures can be used in other means (e.g., as a microchannel gas sensor).

Another embodiment provides a method for establishing isolated sites for the growth of nanostructures or groups of nanostructures, where the growth sites may be defined by structures such as islands in microchannels, and/or patterned with materials such as catalysts to define their locations.

Another embodiment provides a method for configuring the position, orientation, and other parameters of growth sites to enable control of the growth and assembly of nanostructures, in accordance with embodiments of the present invention.

Another embodiment provides a method for using a wide variety of catalyst materials and reactive and non-reactive chemical species to grow nanostructures within micro-scale devices, using preparation and deposition methods known to those of ordinary skill in the art, to enable production of a wide variety of nanostructures in a wide variety of configurations by configuring the methods and devices as desired.

Another embodiment provides a method for designing micro-scale environments to introduce forces of desired magnitudes at desired locations on the nanostructures.

Another embodiment provides a method for using micro-scale or nano-scale structures within micro-scale environments to direct and enhance field-induced forces on the nanostructures of interest within micro-scale environments.

Another embodiment provides a method for establishing precise control within micro-scale environments, over the conditions required for growth and assembly of nanostructures, where the length scales of control approach the critical dimensions of the nanostructures, and the time scales of control approach the natural time scales of the growth reactions and processes.

Another embodiment provides a method for precisely controlling delivery of reactive and non-reactive species, catalysts, support materials, and other materials needed for the growth and assembly of nanostructures, to the locations of growth and assembly within micro-scale environments.

Another embodiment provides a method for establishing precise control using elements integrated with micro-scale devices, such as microfluidic resistors, to introduce precise flow rates of chemical species such as reactive and non-reactive gases to the microchannels and growth sites, and microfabricated heating elements to control the temperatures at localized regions within environments such as at the growth sites.

Another embodiment provides a method for decoupling the supplies of the individual reactive and non-reactive species and other delivered materials, such that the conditions required for growth of the nanostructures are decoupled from the conditions required for control over the configuration and orientation of the nanostructures, and for the assembly of individual nanostructures or groups of nanostructures.

Another embodiment provides a method for avoiding undesired interactions between the nanostructures and surfaces within micro-scale growth environments, by using forces applied to the nanostructures to suspend the nanostructures during the growth and assembly processes, where the surface interactions can prematurely retard or stall the growth of nanostructures by inducing a force on the growth site which makes continuation of the growth process energetically unfavorable, or promotes the introduction of impurities or defects.

Another embodiment provides a method for anchoring nanostructures to structures such as islands within micro-scale environments, and for enabling the ordered growth and subsequent assembly of elongated nanostructures.

Another embodiment provides a method for using electrodes in the vicinity of microchannel structures to establish electric fields within microchannels, for example to affect the processes of growth and assembly of nanostructures, and to orient the nanostructures as desired.

Another embodiment provides a method for enabling a wide variety of designs of micro-scale environments within the accordance of the present invention, including, but not limited to, arrays of microchannels.

Another embodiment provides a method for fabricating micro-scale environments with feature dimensions, tolerances, and precisions in the nano-scale (e.g., islands within the microchannels), with nanometer- or atomic-scale dimensions, using fabrication processes known to those skilled in the art.

Another embodiment provides a method for enabling micro-scale environments to be coupled with elements of conventional growth and metrology systems for nanostructures, including, but not limited to, tube furnaces and plasma-enhanced reactors, rotameters and mass flow controllers, thermocouples, vacuum pumps, and spectroscopy instrumentation.

Another embodiment provides a method for enabling a micro-scale environment to be coupled to a heated substrate, or packaged inside a conventional tube furnace, to provide external control over the temperature of the micro-scale environment; or, heat can be applied directly to the micro-scale environment and/or locally to the growth sites.

Another embodiment provides a method for enabling micro-scale environments to be interconnected or arrayed to increase the efficiency or throughput, or to otherwise enhance the function or feasibility of their operation.

Another embodiment provides a method for enabling micro-scale environments to be coupled with external elements to enhance control over the growth and assembly of nanostructures within the micro-scale environments, such as providing feedback control on the relevant variables of the growth process which affect the quality of the nanostructures, including, but not limited to, the delivery rates of reactive and non-reactive species, operating pressures, operating temperatures, sources of energy applied to the device such as thermal energies, and electrical inputs to the device, by monitoring the quality of the nanostructures being produced or monitoring signals produced by sensors monitoring the process conditions.

Another embodiment provides a method for enabling continuous or periodic collection of nanostructures from the output of micro-scale environments designed in accordance with the present invention.

Another embodiment provides a method for enabling nanostructures to remain in micro-scale environments in a desired configuration and orientation, following completion of the desired growth and assembly processes, such as for in-situ metrology of the nanostructures after the growth and assembly process is terminated at a desired instance, or for use in another application in the micro-scale environment.

Another embodiment provides a method for introducing chemical species at desired specific locations in micro-scale environment other than growth sites, affecting the assembly of nanostructures, preventing the accumulation of, or removing undesirable growth products from, the nanostructures and from the environment, inducing forces on the nanostructures, and/or affecting the properties of the nanostructures as desired.

Another embodiment provides a method for enabling operation of micro-scale environments designed in accordance with the present invention in simultaneous or exclusive modes, including, but not limited to, preparing the device for growth and assembly of nanostructures, initiating the growth and assembly of nanostructures, continuing the growth and assembly of nanostructures, purifying the nanostructures, introducing additional reactive or non-reactive species for other additional processing of the nanostructures, releasing the nanostructures from the device, and cleaning the device to remove undesirable growth products.

Another embodiment provides a method for configuring micro-scale devices, and specifically the handling of reactive and non-reactive species, the microchannels and islands and other elements which affect the forces applied to the nanostructures, and the growth sites for the nanostructures, to keep the growth sites active for essentially limitless durations, therefore enabling the growth of indefinitely long nanostructures from each growth site.

Another embodiment provides a method for enabling refreshing and/or replacement of an inactive growth site with a new and suitably active growth site if the first growth site is inactivated by accumulation of undesirable reaction products, by detachment of the growth site from its support, or by other means.

Another embodiment provides a method for delivering controlled amounts of energy to specific desired areas within micro-scale environments (i.e., to the growth sites), at desired instances during the operation of devices, including during the growth and assembly processes, by means such as alternating current electric or magnetic fields, local resistive heaters, or laser beams, to affect and control the growth and assembly processes.

Another embodiment provides a method for processing streams of floating growth sites such as metal nanoparticles within the flows through microchannels of micro-scale environments.

Another embodiment provides a method for heating the floating growth sites by applying alternating electric or magnetic fields to microchannels and structures in the vicinity of the microchannels.

Another embodiment provides a method for stabilizing floating growth sites against agglomeration at undesired locations in the micro-scale environments, by inducing electrostatic repulsion between the growth sites.

Another embodiment provides a method for focusing a flow containing floating growth sites, floating nanostructures, or nanostructures suspended in the flow and anchored to islands, such as within a microchannel or network of microchannels, to influence the nanostructures to adopt a more organized configuration.

Another embodiment provides a method for achieving said focusing with the aid of an electric field applied in the vicinity of the site where the nanostructures are to be focused.

Another embodiment provides a method to cause the self-assembly of the nanostructures by attractive surface interactions.

Another embodiment provides a method for configuring micro-scale environments, and designing specially suited micro-scale environments such as large arrays of parallel microchannels and microchannel networks, for conducting large numbers of simultaneous experiments regarding nanomaterials growth and assembly, by specifically varying a single operating parameter or other condition, or a set of operating parameters or conditions, either by suitable design variation of the integrated control elements such as fluidic resistors or by suitable adjustment of externally-established parameters such as temperature and operating pressure, which determine the growth and assembly conditions inside the micro-scale environments.

Another embodiment provides a method for creating tunable mechanical elements within micro-scale environments, such as adjustable gaps which act as microchannels or fluidic resistors, for adjusting the conditions for growth and assembly of nanostructures.

Other aspects, embodiments, advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention relates to the synthesis and processing of materials, including nanostructures such as carbon nanotubes (CNTs). Methods and devices are presented for controlling the growth and/or assembly of nanostructures, in some cases using small channel-type environments (e.g., microfluidic channels). In these micro-scale environments, forces can be applied to nanostructures during their growth process, for instance, to control the direction of growth of the nanostructures. These forces can also be used to direct the assembly of nanostructures into ordered configurations such as strands or other assemblies having micro- and macroscopic length scales. In some embodiments, multiple forces are applied simultaneously to direct the growth and/or assembly of nanostructures.

A cross-sectional dimension, as used herein, refers to a dimension perpendicular to the length (i.e., the longest axis) of a structure. Both channels and elongated nanostructures, for instance, have cross-sectional dimensions that may include a height, width, and/or a diameter. An aspect ratio refers to the ratio of the length to a cross-sectional dimension of the structure.

Nanostructures, as used herein, refer to structures having a cross-sectional dimension of less than about 100 nm. Examples of nanostructures include nanotubes and nanowires (used interchangeably herein with nanorods). In some instances, elongated nanostructures are described; elongated nanostructures have an aspect ratio of at least 10:1. Elongated nanostructures (e.g., nanotubes and nanowires) may be cylindrical, i.e., have a substantially circular cross-section.

Figure 1:
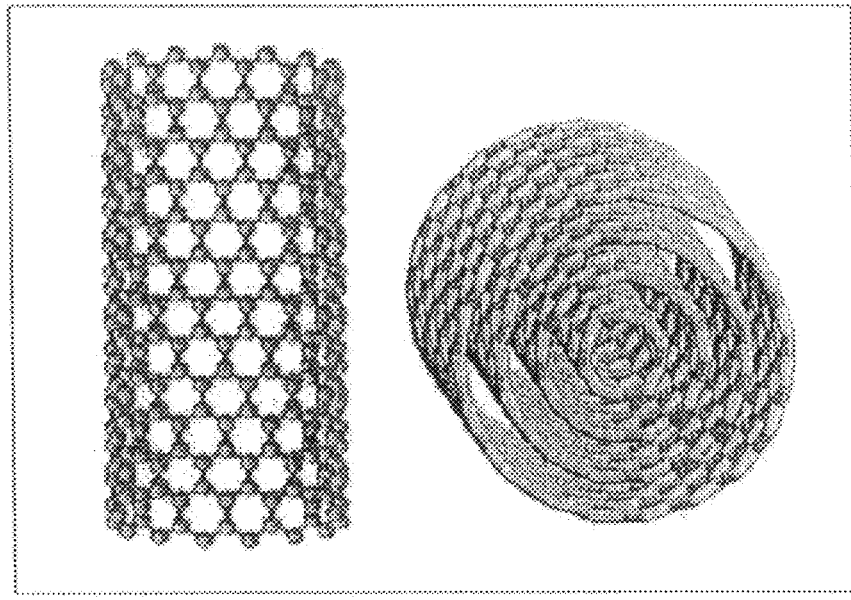
FIGS. 1A and 1B (reproduced from M. S. Dresselhaus et al. Nanowires and nanotubes. Mater. Sci. and Eng. C, 1008:1-12, 2002 and K. K. B. Teo et al. Catalytic synthesis of carbon nanotubes and nanofibers. In Encyclopedia of Nanoscience and Nanotechnology, Volume X, pages 1-22, 2003) show a diagram of a single-walled and a multi-walled carbon nanotube (CNT), and a schematic of the base-growth mechanism for growth of nanostructures including carbon nanotubes by chemical vapor deposition, respectively.
Figure 1:
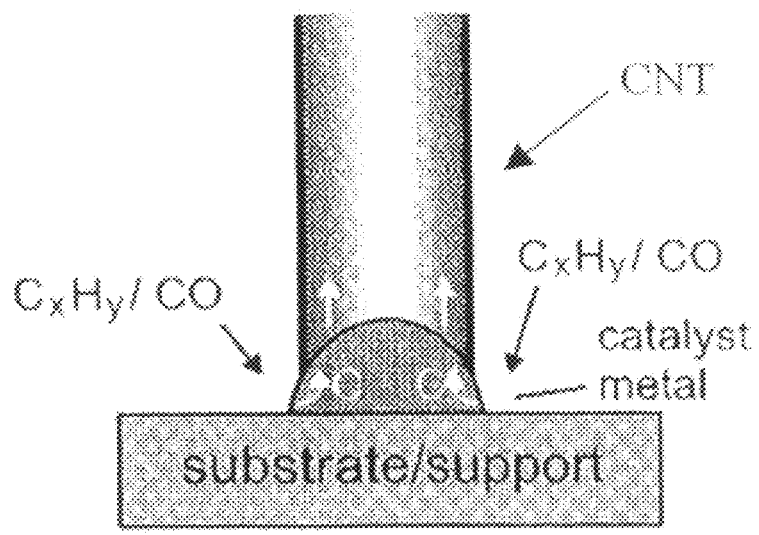
Figure 2:
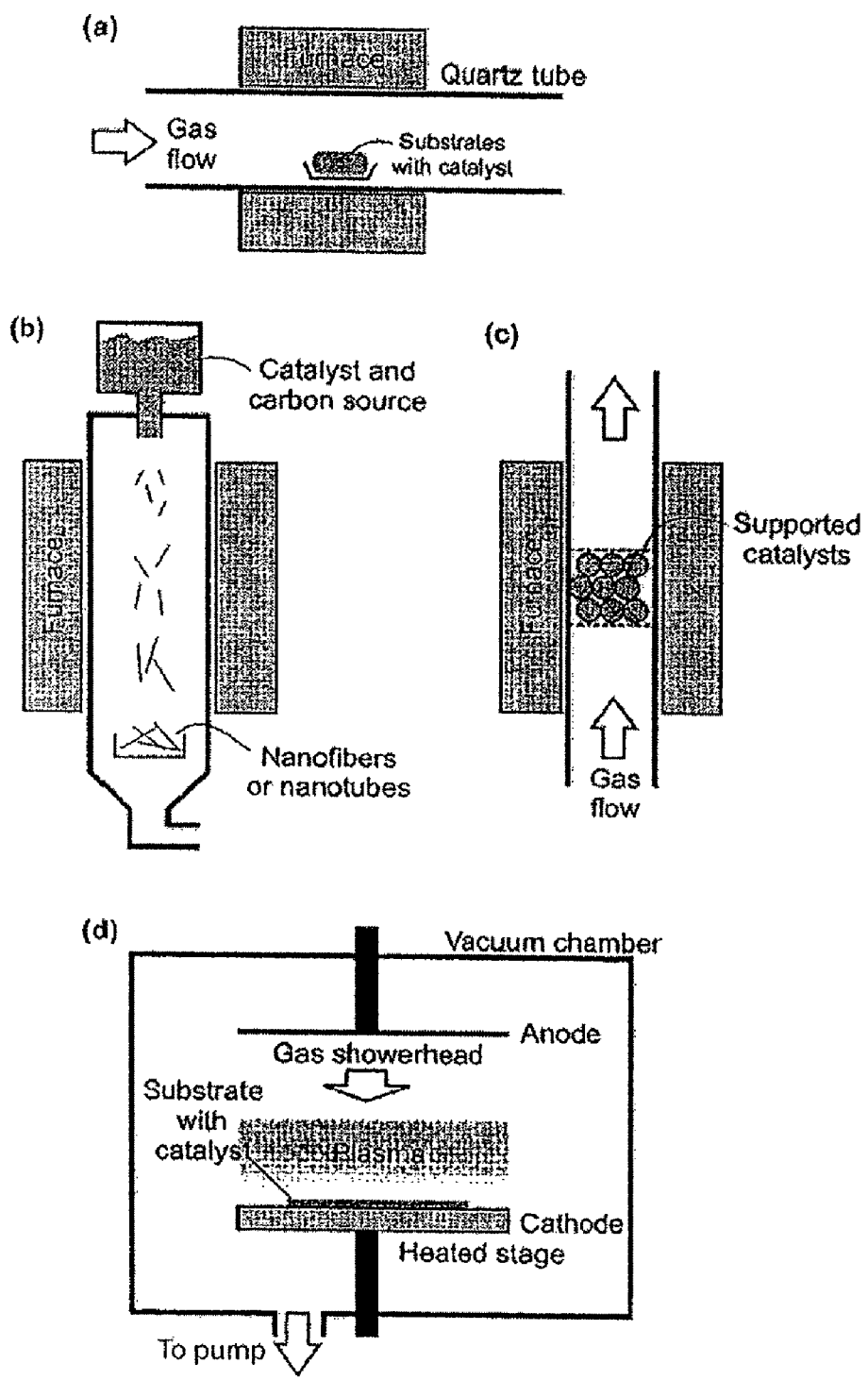
FIGS. 2A-D (reproduced from K. K. B. Teo et al. Catalytic synthesis of carbon nanotubes and nanofibers. In Encyclopedia of Nanoscience and Nanotechnology, Volume X, pages 1-22, 2003) show typical furnace configurations for growing carbon nanotubes and other nanostructures by chemical vapor deposition: (a) horizontal 'fixed catalyst' tube furnace; (b) vertical 'floating catalyst' tube furnace; (c) fluidized bed reactor; (d) plasma-enhanced chamber.
Figure 3:
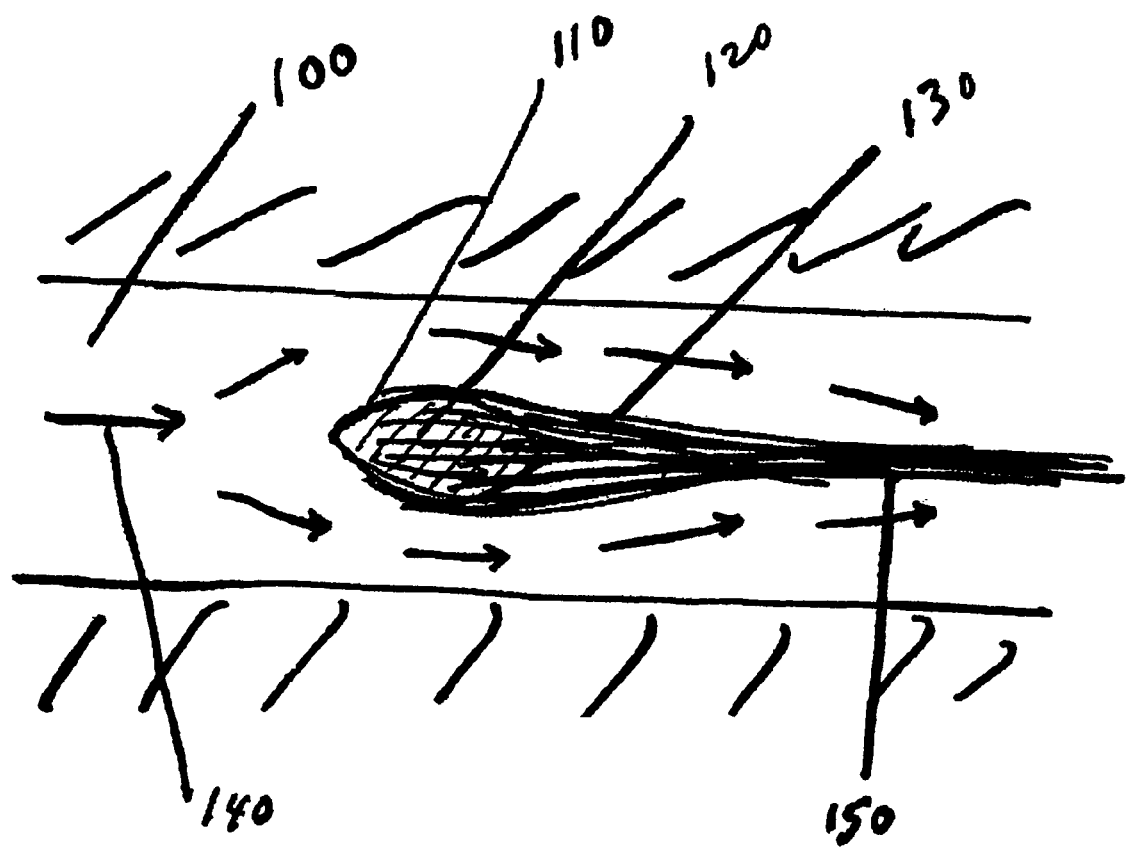
FIG. 3 shows the top view of a region of an exemplary microchannel containing an island from which nanostructures (e.g., carbon nanotubes) can grow in alignment with flow in the microchannel, according to one embodiment of the invention.

In one embodiment, a microchannel can function as a micro-scale environment in which the growth conditions of nanostructures can be tailored to achieve a desired configuration and orientation of nanostructures. For instance, FIG. 3 shows a microchannel 100 comprising an island 110 which anchors the growth of cylindrical elongated nanostructures 130 (e.g., carbon nanotubes). Island 110 is coated with catalyst 120, which seeds the growth of CNTs. As the CNTs grow, they may initially assemble due to surface forces or other short-range interactions. In some instances, fluid forces and/or other forces may also cause assembly. As the CNTs grow longer, the CNTs can be directed and assembled along the channel by gas flow 140, which can include a mixture of reactive and non-reactive species needed to grow the nanostructures. In some instances, assembly of relatively long CNTs can be directed by both surface forces between the CNTs and by fluid flow. A method for growing an nanostructure may comprise positioning a catalyst in a microfluidic channel, flowing a fluid in a first direction in the microfluidic channel, initiating growth of an elongated nanostructure from the catalyst, and growing the elongated nanostructure substantially in the first direction in the microfluidic channel. The process of initiating growth may occur in the first direction, or in a different direction. Channels having different geometries and/or configurations can influence the growth and/or assembly of nanostructures, as described in more detail below.

The CNTs may be focused downstream in the channel to form an assembly such as a bundle 150, where once the individual nanotubes are sufficiently close to each other, they can become attracted to each other by van der Walls forces. While this figure shows many nanotubes growing from a single island, and later combining to form a bundle, it is appreciated that the nanotubes may combine into bundles because of surface interactions before they are focused by the downstream flow. In some instances, an individual growth site may seed a bundle of nanotubes itself.

Figure 4:
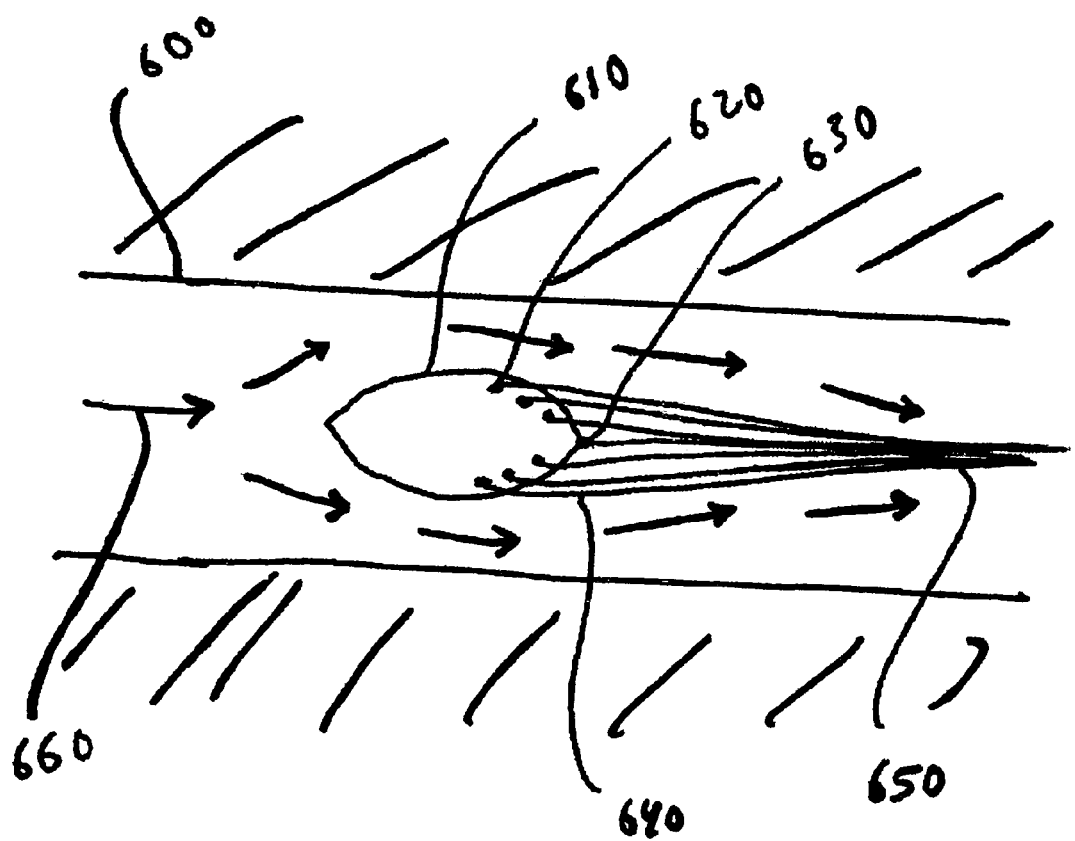
FIG. 4 shows the top view of a region of another exemplary microchannel containing an island from which nanostructures (e.g., carbon nanotubes) can grow in alignment with flow in the microchannel, and where the growth sites of individual nanostructures can be positioned at specific locations on the surface of the island, according to another embodiment of the invention.

FIG. 4 shows growth sites 620 positioned on island 610. The growth sites may be isolated sites that are positioned and sized to determine the size and initial growth orientation of the nanostructures or groups of nanostructures. Specifically with relevance to the positioning of an island in a microchannel 600 with a mean gas flow 660, positioning of growth sites 620, e.g., along the outer edge of the island or at the tip of the island 630, can allow the nanostructures to be drawn from the edge of the island by the gas flow, at relatively short lengths. This can reduce the likelihood of unfavorable surface interactions which are known to slow or halt the growth of nanostructures. In this exemplary configuration, the nanostructures growing from the isolated growth sites on the island are drawn downstream by the distribution of the gas flow into a suspended configuration 650. The suspended configuration may assemble due to attractive forces between the nanostructures (i.e., self-assembly) and/or because of forces produced by the fluid flow.

While some figures show growth sites located only on the top surface of an island, it is appreciated that the growth sites, and therefore the catalyst suitable for growth of the desired nanomaterials, may be located on any surface within the micro-scale and microchannel environments. As exemplary locations, FIG. 5 indicates that the growth sites may be placed on top surface 422 of the island, sidewalls 421A and 421B of the island, floor areas 413A and 413B of the channel, and/or sidewalls 412A and 412B of the channel. In some embodiments, the growth sites are localized to one or more of these areas, with the size of the area determined by the density of the growth sites and the number of nanostructures desired from the particular area of growth sites.

In one particular embodiment used to grow and assemble long CNTs, the growth sites are nanometer-scale (e.g., 1-100 nm diameter) catalyst particles of transition metals (e.g., Fe, Co, Ni), transition metal oxides (e.g., $Fe_2O_3$) or alloys of transition metals (e.g., Fe/Mo, Co/Mo). In another embodiment, the catalyst is prepared and deposited, and the growth sites are designed to promote the exclusive growth of single-walled nanotubes (SWNTs) or multi-walled nanotubes (MWNTs). Additionally, the catalysts can be prepared and patterned at the desired locations using a wide variety of techniques known to those of ordinary skill in the art, including physical vapor deposition (e.g., DC magnetron sputtering, thermal evaporation, electron beam evaporation), contact printing (e.g., using an elastomer stamp), self-assembly of template films (e.g., metal-loaded block copolymer micelles), and spin-coating.

A variety of chemical species, such as gases and mixtures of gases, may be introduced to the microchannel environments as reactive and non-reactive species for growing and assembling the nanostructures. In another embodiment for CNT growth, common mixtures include $C_2H_4/H_2$, $CH_4/H_2$, $CO/H_2$, $C_2H_2/NH_3$, hexane vapor, ethanol vapor, camphor vapor, and so on. A variety of growth site materials, support materials (e.g., $Al_2O_3$, $MgO_2$), and reactive and non-reactive species may be used based on this knowledge to configure the devices and methods of the present invention to grow and assemble nanostructures as desired.

While the growth sites may remain attached to their original locations, i.e., nanostructures such as carbon nanotubes growing in the "base-growth" mode, it is also possible for a growth site to detach from its initial location when growth of the nanostructure begins and while the nanostructure remains anchored to that position. This mode of growth is commonly known as the "tip-growth" mode. Hence, in the present invention, if a growth site is located at the unconstrained end of the nanostructure, the growth site can move along the microchannel as the nanostructure lengthens. Tip-growth has been observed previously by others to be important for growing long CNTs, because the growth site was free of constraint from interactions with the substrate, and tip growth was initiated by applying a rapid temperature change or an electric field to the initial location of the growth sites. The "jumpstart" in growth by an applied electric field or by rapid heating has been suggested to be important to pull the CNTs upward until they were trapped by laminar flow in a tube furnace.

In some cases, the nanostructures can be grown in microchannels by the application of directed forces. Sometimes, directed forces can prevent interactions between the nanostructures and surfaces. In one embodiment, the confined length scales of the gas flows (i.e., lengths much smaller than conventional systems such as a 1" tube), and other fields applied in the channels, can cause the nanostructures to float in relatively short distances. In some instances, this is a distinct advantage over other approaches. Furthermore, although both base-growth and tip-growth modes are possible within some embodiments of the present invention, the ability to retain the growth site at a pre-determined location (i.e., on an island) by base-growth can enable growth of very long nanostructures (e.g., centimeters or greater) and/or enable assembly of these nanostructures downstream of the growth sites. For instance, placement of the growth sites on edges of microstructures can enable the nanostructures to be entrained in the surrounding flow almost immediately.

In instances where a "jumpstart" such as rapid heating or application of a vertical electric field would be advantageous in establishing the desired growth conditions, the micro-scale environments designed in accordance with the present invention may be well-suited for the application of these effects. As discussed in more detail below, rapid changes of temperature at desired locations in the micro-scale environments, and the ability to direct and enhance fluid and electric field-enhanced forces on the nanostructures by suitably designing exemplary features such as the cross-sections and paths of microchannels and microchannel networks, the island shapes, and electrode patterns, can further enable the growth of the nanostructures to be precisely controlled over a wide range of operating parameters.

In one embodiment, a method of growing an elongated structure comprises flowing a fluid in a first direction and growing a plurality of elongated nanostructures substantially in the first direction. The plurality of elongated nanostructures may assemble into a larger structure such as a bundle, strand, or fiber, and assembly may be directed by the fluid flowing in the first direction. A bundle (used interchangeably herein with a strand or fiber), is an elongated assembly comprising more than one elongated nanostructures. Bundles, strands, or fibers can comprise more than 10, more than 100, more than 1,000, more than $10^5$, more than $10^7$, or more than $10^{10}$ elongated nanostructures. In some cases, elongated nanostructures assemble to form a microfluidic component (e.g., a filter, mixer, or reactor) in the microchannel.

In some cases, the fluid flowing in the first direction is predominately laminar, which can aid in the growth and/or assembly process. For instance, laminar flows can produce high fluid shear forces on the elongated nanostructures, which may increase the growth rate of the structures compared to conventional CVD processes by resolving forces at the bases (e.g., the bonds where additional carbon atoms are added to increase the length of the nanostructure) of the nanostructures, and hence may "mechanically assist" precipitation of carbon at the catalyst.

Figure 6:
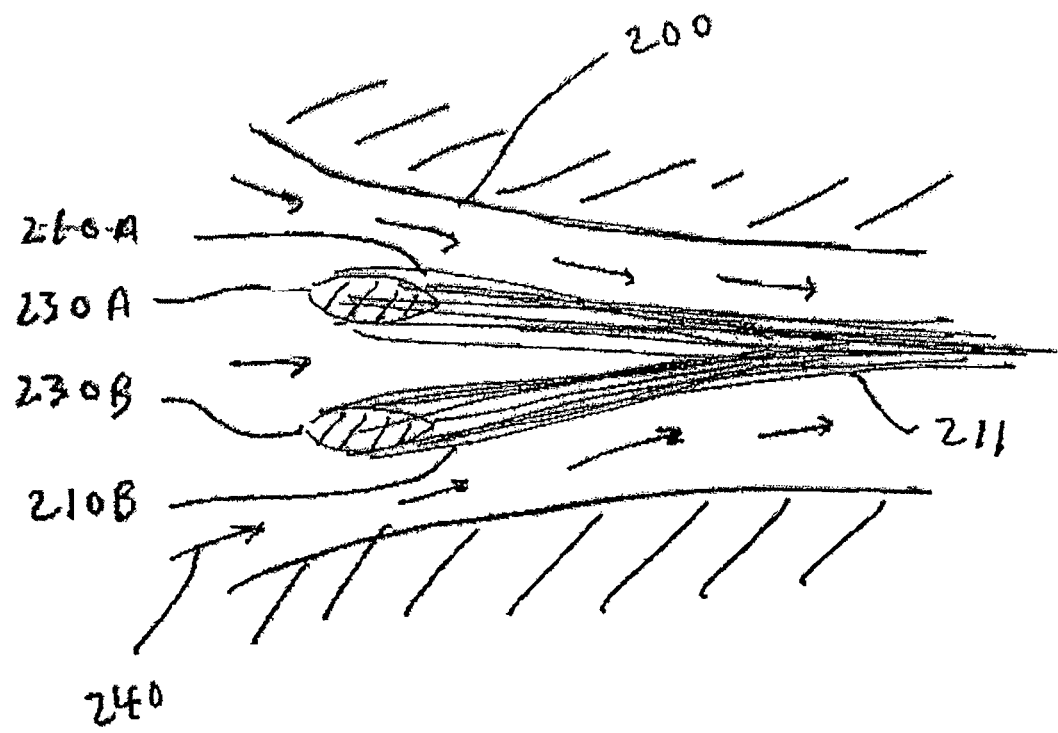
FIG. 6 shows the top view of a region of an exemplary microchannel containing two islands from which nanostructures (e.g., carbon nanotubes) can grow in alignment with fluid flow; these nanostructures can be merged into a single bundle by focusing the gas flow (e.g., by converging the cross-section of the channel), according to another embodiment of the invention.

Sometimes, assembly comprises applying a first force (e.g., a fluid force) to the elongated nanostructures and allowing the nanostructures to become attracted to one another by a second force (e.g., by van der Waals interactions). For instance, as shown in FIG. 6, a plurality of areas of growth sites and/or of individual and isolated growth sites (e.g., islands holding growth sites and anchoring nanostructures) may be positioned within a single microchannel 200. The microchannel can contain islands 230A and 230B that can anchor growth of groups 210A and 210B of CNTs, which are focused into a single group 211 by flow 240. As illustrated in this diagram, single group 211 may be a bundle, strand, or fiber, grown substantially in the direction of fluid flow 240.

Figure 7:
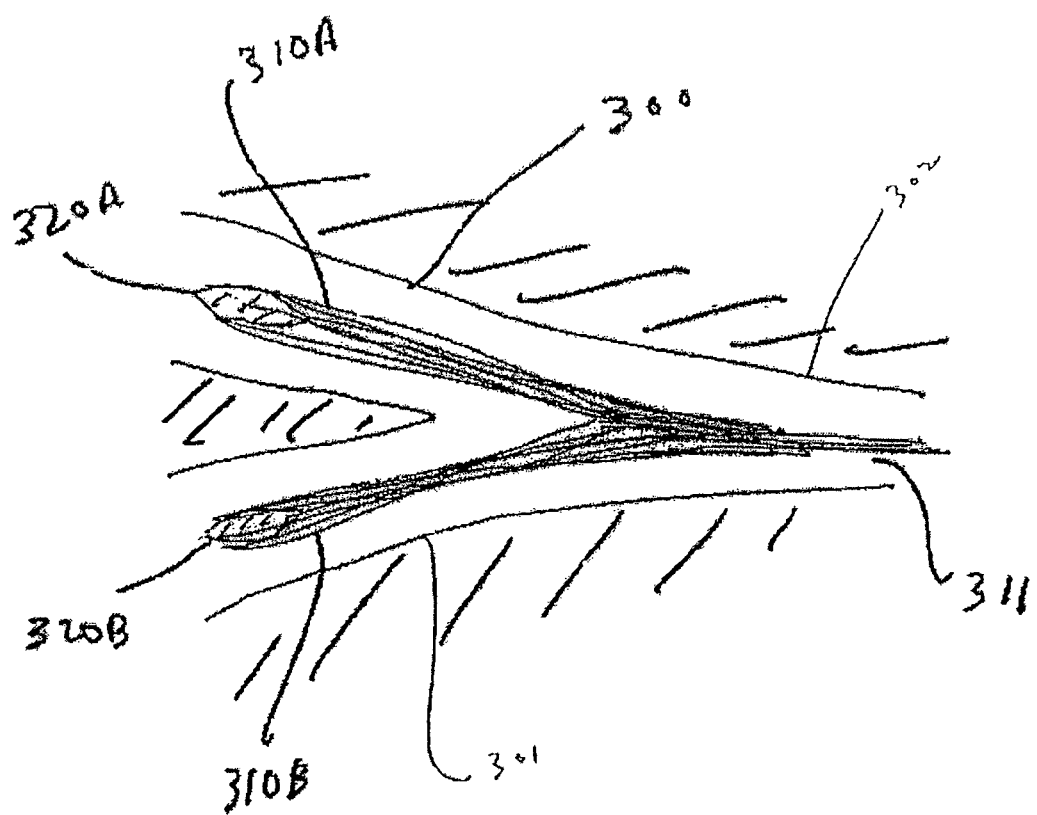
FIG. 7 shows the top view of a region in which two microchannels, each carrying bundles of suspended nanostructures, merge to create a larger bundle of nanostructures, according to another embodiment of the invention.

Focusing of nanostructures may also be achieved by converging (i.e., merging) individual nanostructures and/or groups of nanostructures grown and supported in individual channels, as shown in FIG. 7. As show in this figure, islands 320A and 320B are positioned in microchannels 300 and 301, respectively. Microchannels 300 and 301 converge and combine into a single channel 302, which can direct the combination of nanostructures 310A and 310B into a single configuration 311 (e.g., a strand). Additional embodiments distinct from those shown in the drawings may include one or more wide arrays comprising tens, hundreds, or more parallel islands in a single area, where the flow can be focused by the outer geometry of the area to influence the direction of growth and/or the locations of focusing and assembly.

Figure 8:
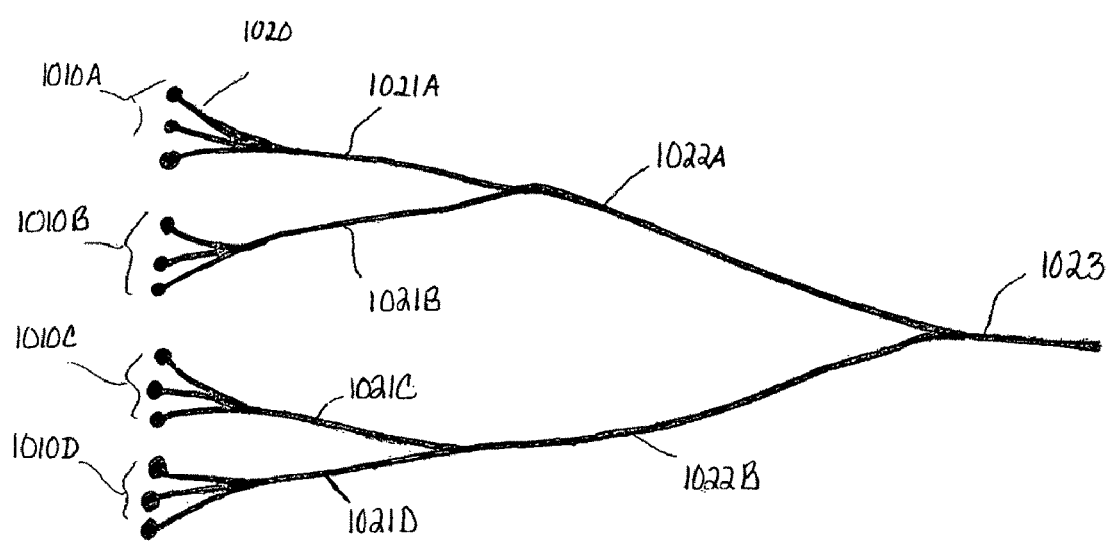
FIG. 8 shows how individual nanostructures or groups of nanostructures (e.g., bundles, strands, or fibers) are sequentially combined into larger structures, according to another embodiment of the invention.

FIG. 8 shows a strategy for sequentially assembling individual nanostructures or isolated groups of nanostructures into larger groups of nanostructures (e.g., micro-scale or macro-scale fibers of CNTs), by converging the growth paths of the nanostructures, such as by directing the nanostructures by suspending the nanostructures in merging networks of microchannels. As illustrated in FIG. 8, four areas of growth sites 1010A-D are shown, and each site anchors the growth of a nanostructure or group of nanostructures such as 1020. Second-stage groups of nanostructures such as 1021A and 1021B can be formed by merging the paths of the primary nanostructures 1020, and then third-stage nanostructures 1022A and 1022B can be formed by joining pairs of secondary nanostructures. Finally, a fourth stage nanostructure 1023 can be formed by merging the paths of 1022A and 1022B. This methodology can be applied to join any suitable number of nanostructures, into sequentially larger nanostructures, and to incorporate any suitable number of joining stages by appropriately inducing forces on the nanostructures contained within the micro-scale environments.

The locations of the focusing points for assembling individual nanostructures or groups of nanostructures into larger arrangements can be chosen to be any suitable position (i.e., in a microchannel). For example, the locations may be close to the growth or anchoring sites, or far from the growth or anchoring sites.

It is appreciated that while the nanostructures and assemblies of nanostructures appear to have aspect ratios of only one to two orders of magnitude in some figures, nanostructures and/or assemblies may be grown to very long lengths (e.g., centimeters or longer) by the devices and methods provided herein, e.g., by appropriate control of the growth conditions and the forces applied to the nanostructures. Elongated nanostructures may be grown to a length of greater than 0.05 mm, greater than 0.5 mm, greater than 1 mm, greater than 5 mm, greater than 1 cm, greater than 5 cm, greater than 10 cm, greater than 50 cm, greater than 1 m, or longer.

An elongated nanostructure has a aspect ratio of at least 10:1. In some embodiments, elongated nanostructures and/or assemblies of elongated nanostructures having very large aspect ratios can be formed. Elongated nanostructures and/or assemblies can have, for instance, aspect ratios of greater than 10:1, greater than 100:1, greater than 1,000:1, greater than 10,000:1, greater than $10^5$:1, or greater than $10^6$:1. The aspect ratio depends, in part, on the growth conditions applied.

The growth and/or assembly of nanostructures can be controlled within the micro-scale environments of the present invention by applying directed forces to the nanostructures and/or to the growth sites, by methods such as precisely controlled gas flows and application of electric fields in the microchannels. However, in some embodiments, forces can be directed to non micro-scale environments (i.e., macro-scaled environments).

In one embodiment, one, or a plurality of, elongated nanostructures can be grown substantially in a first direction by applying a first force in the first direction. The first force may be a fluid flow, an electric field, or an electromagnetic field, for example. The nanostructure(s) can be displaced (i.e., relative to the channel and/or to the fluid flow) by application of a second force in a second direction, in some cases, while the first and second forces are applied simultaneously. In some instances, displacing comprises moving all, or a portion, of the nanostructure from a first position to a second position. Displacing may also comprise translating, rotating, bending, and/or aligning all, or a portion of, the nanostructures.

In another embodiment, a first force can direct the growth of one, or a plurality of, elongated nanostructures substantially in a first direction (e.g., by applying a force in the first direction), and the nanostructures can be grown substantially in a second direction by applying a second force in the second direction. In some instances, the first and second forces are applied simultaneously. The first and second forces can be the same or different, depending on the application, and the first and second directions can also be the same or different. In some cases, more than two forces and/or torques can be applied to the nanostructures.

Figure 9:
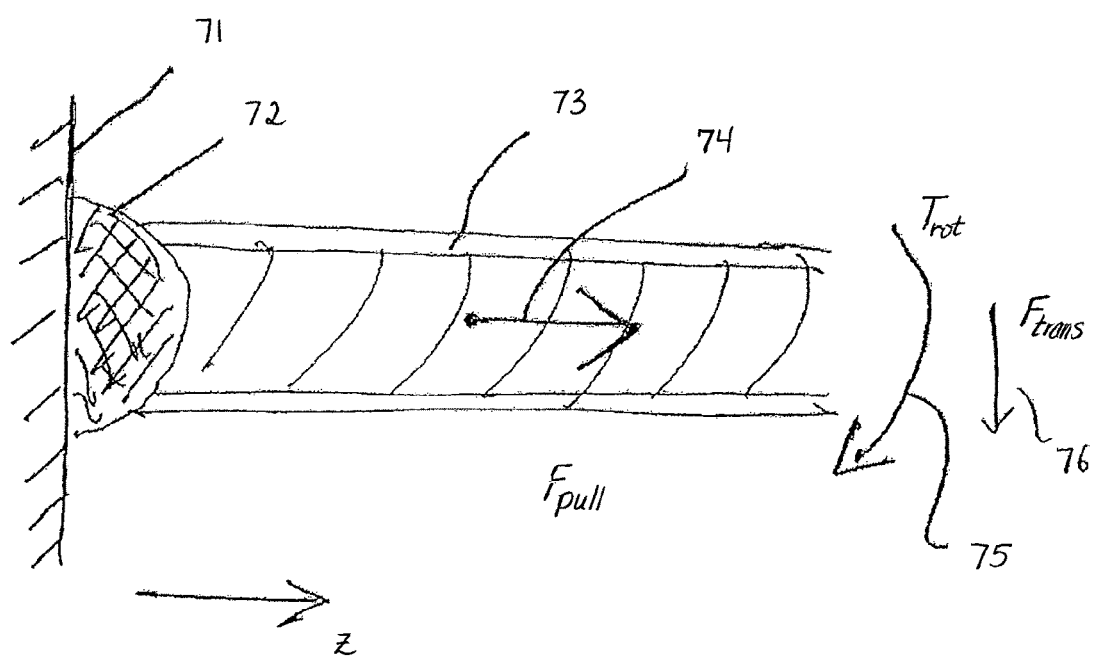
FIG. 9 shows a nanostructure (e.g., a carbon nanotube) growing from a catalyst particle fixed to a substrate, where an axial force ($F_{pull}$), a transverse force ($F_{trans}$), and a torque ($T_{rot}$) are applied to the nanostructure to direct its growth, according to another embodiment of the invention.
Figure 10:
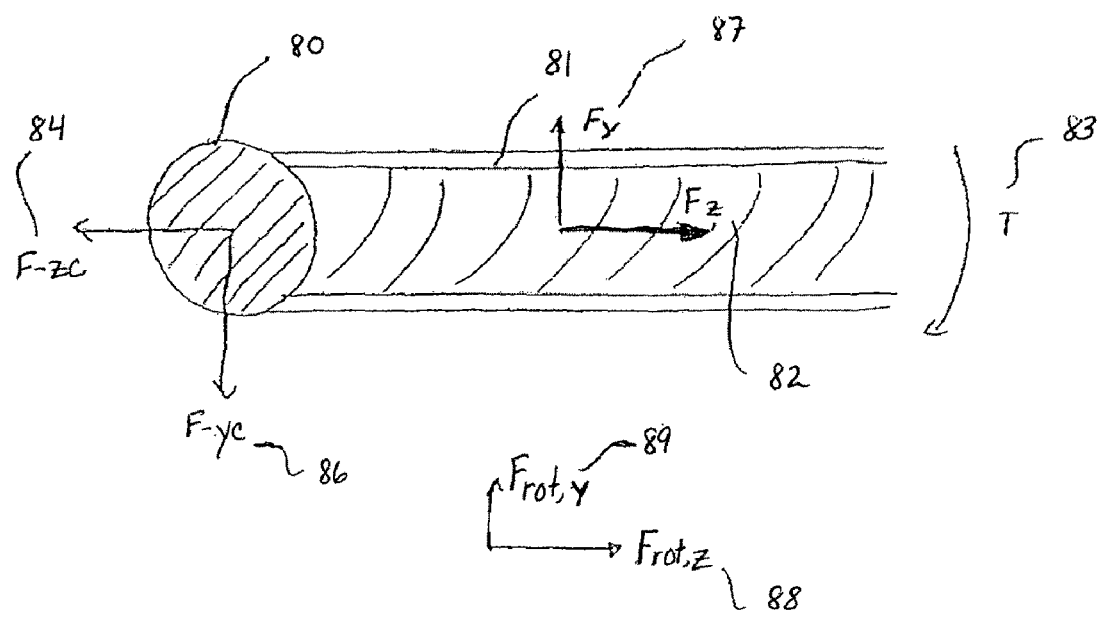
FIG. 10 shows a nanostructure (e.g., a carbon nanotube) attached to a catalyst particle suspended in a medium (e.g., a gas or liquid), where a first force ($F_z$) is applied to the nanostructure in the direction of growth, a second force ($F_{-z}$) is applied to the catalyst particle opposite to the direction of growth, and a torque (T) is applied to the nanostructure with the attached catalyst particle, according to another embodiment of the invention.

FIG. 9 shows a nanostructure (e.g., a CNT) 73 growing from a catalyst particle 72 attached to a substrate 71. The substrate can be, for example, an island or an area of a microchannel device designed in accordance with the present invention. As illustrated in FIG. 9, an axial force 74, ($F_{pull}$), a transverse force 76 ($F_{trans}$) and a torque 75 ($T_{rot}$) are applied to the nanostructure. FIG. 10 shows an alternate configuration for applying a force to a nanostructure, in which the growth site 80 and nanostructure 81 are not attached to a substrate (i.e., they are "floating"). An axial force 82 ($F_z$) and transverse force 87 ($F_y$) are applied to the nanostructure, an axial force 84 ($F_{-zc}$) and a transverse force ($F_{-yc}$) are applied to the growth site, and a torque 83 (T) is applied to the nanostructure with attached growth site. The net forces 88 ($F_{net,x}$) and 89 ($F_{net,y}$) on the structure and on the growth site are the sums of the individual force components. While these forces can be applied while the growth sites are active (i.e., when growth of the nanostructure is ongoing), the forces may also be applied after growth of the nanostructures is terminated.

In one embodiment, a method for establishing forces on a nanostructure comprises flowing a fluid in a first direction in a microchannel and growing an elongated nanostructure (i.e., from a catalyst) in the microchannel substantially in the first direction. In some instances, a plurality of elongated nanostructures can be grown in a microchannel (i.e., in the first direction). For example, greater than 10, greater than 50, greater than 100, greater than 500, greater than 1000, or greater than 10,000 elongated nanostructures can be grown in the microchannel, and in some cases, may be grown and/or assembled substantially aligned in the first direction. In some instances, the plurality of nanostructures are grown preferentially in the first direction in the microfluidic channel. For instance, greater than 50%, greater than 70%, greater than 80% of the plurality of nanostructures, or substantially all of the nanostructures, can be grown substantially in the first direction in the microchannel.

Figure 11:
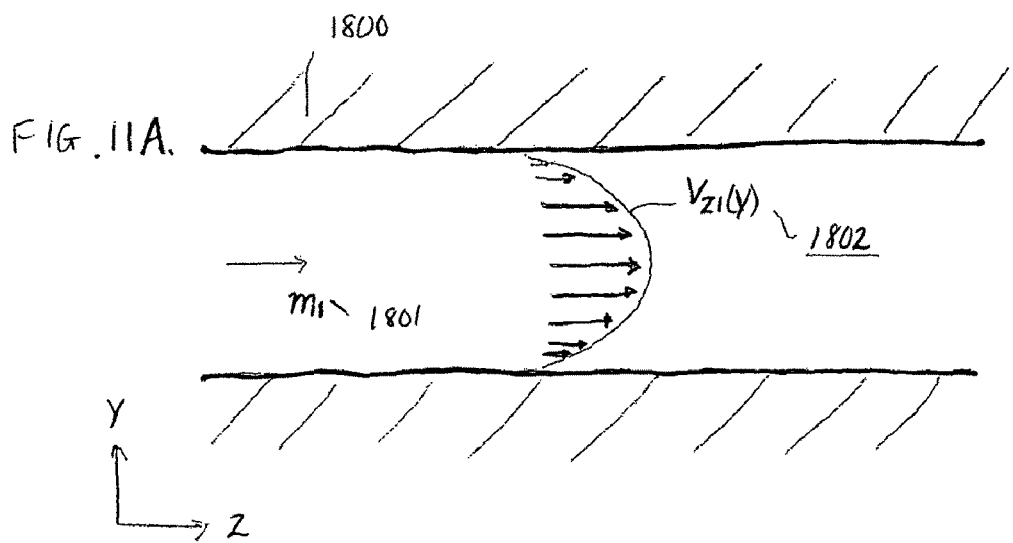
FIGS. 11A-C show exemplary diagrams of how fluid flow in a microchannel directs a nanostructure, where the cross-sectional velocity profile is altered by the presence of the nanostructure, and the flow exerts a shear force ($\tau$) on the nanostructure and causes it to "float" near the center of the microchannel, according to another embodiment of the invention.
Figure 11:
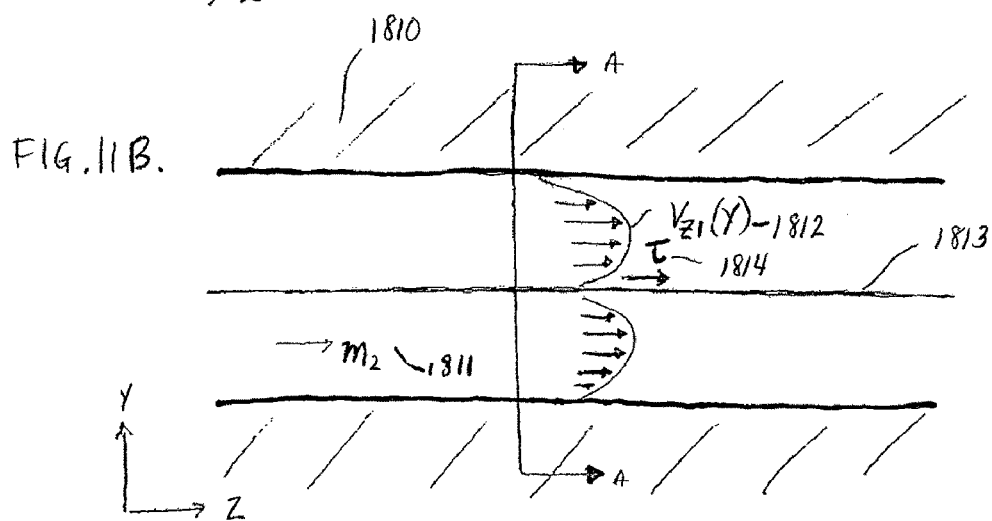
Figure 11:
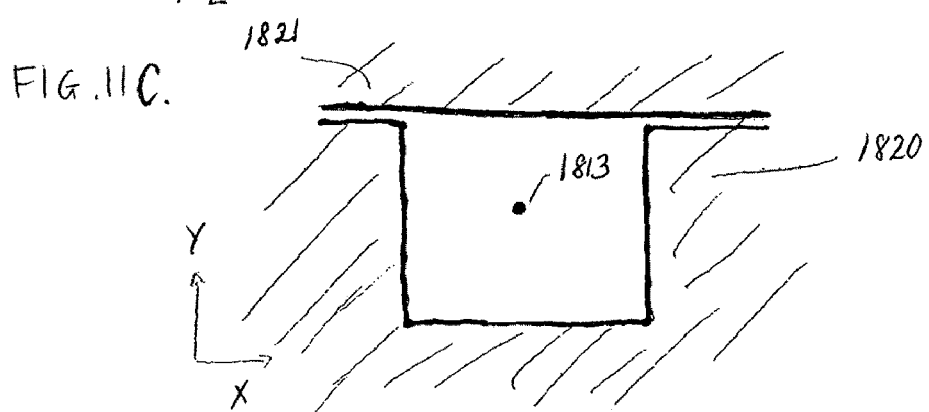

Flows inside the microchannels can induce forces on the nanostructures, which can direct the assembly of nanostructures into structures such as bundles, strands, and/or fibers. FIG. 11A shows a side view of microchannel 1800 containing a flow of gas 1801 ($m_1$). Consistent with fluid mechanics models widely known to those of ordinary skill in the art, a fully-developed laminar flow within this channel produces a parabolic velocity profile as indicated by the sketched profile 1802 ($V_{z1}$). This flow can be further classified into a variety of flow regimes (e.g., no-slip flow, slip-flow, transition flow, free-molecule flow, incompressible or compressible flow) based on the properties of the gas mixture in the channel, the temperature and pressure, the relevant length scales of the system, and other parameters.

FIG. 11B shows a side view of microchannel 1810 containing flow 1811 ($m_2$) and elongated nanostructure 1813 suspended in the channel. The surface of the nanostructure constrains the flow in the channel, giving rise to the velocity profile 1812 ($V_{z1}$), where the flow velocity is retarded on the surface of the nanostructure, and can induce a shear stress 1814 ($\tau$) on the surface of the nanostructure. This shear stress can induce an axial force on the nanostructure, acting to "pull" the nanostructure away from the growth site.

FIG. 11C shows how nanostructure 1813 is suspended in the cross-section of the microchannel comprising substrate 1820 and covering surface 1821. The transverse pressure gradient caused by the gas flow can cause the nanostructure to "float" in the center of the microchannel and to orient with the gas flow. By shaping the path of the microchannel, the growth trajectory of the nanostructure can be controlled, and, in some embodiments, such trajectories can be used to direct nanostructures to be joined.

Figure 12:
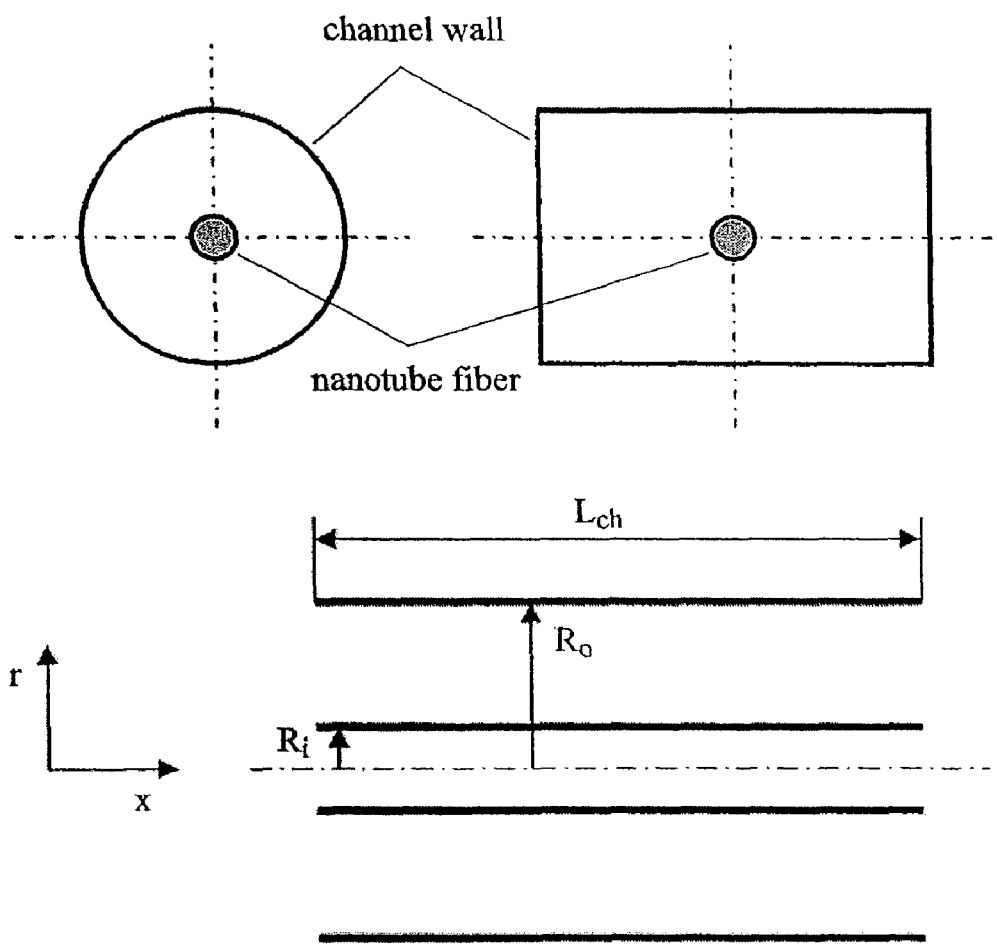
FIG. 12 shows how the gas flow around an elongated nanostructure suspended in a microchannel is modelled by treating the nanostructure as a cylinder, according to another embodiment of the invention.
Figure 13:
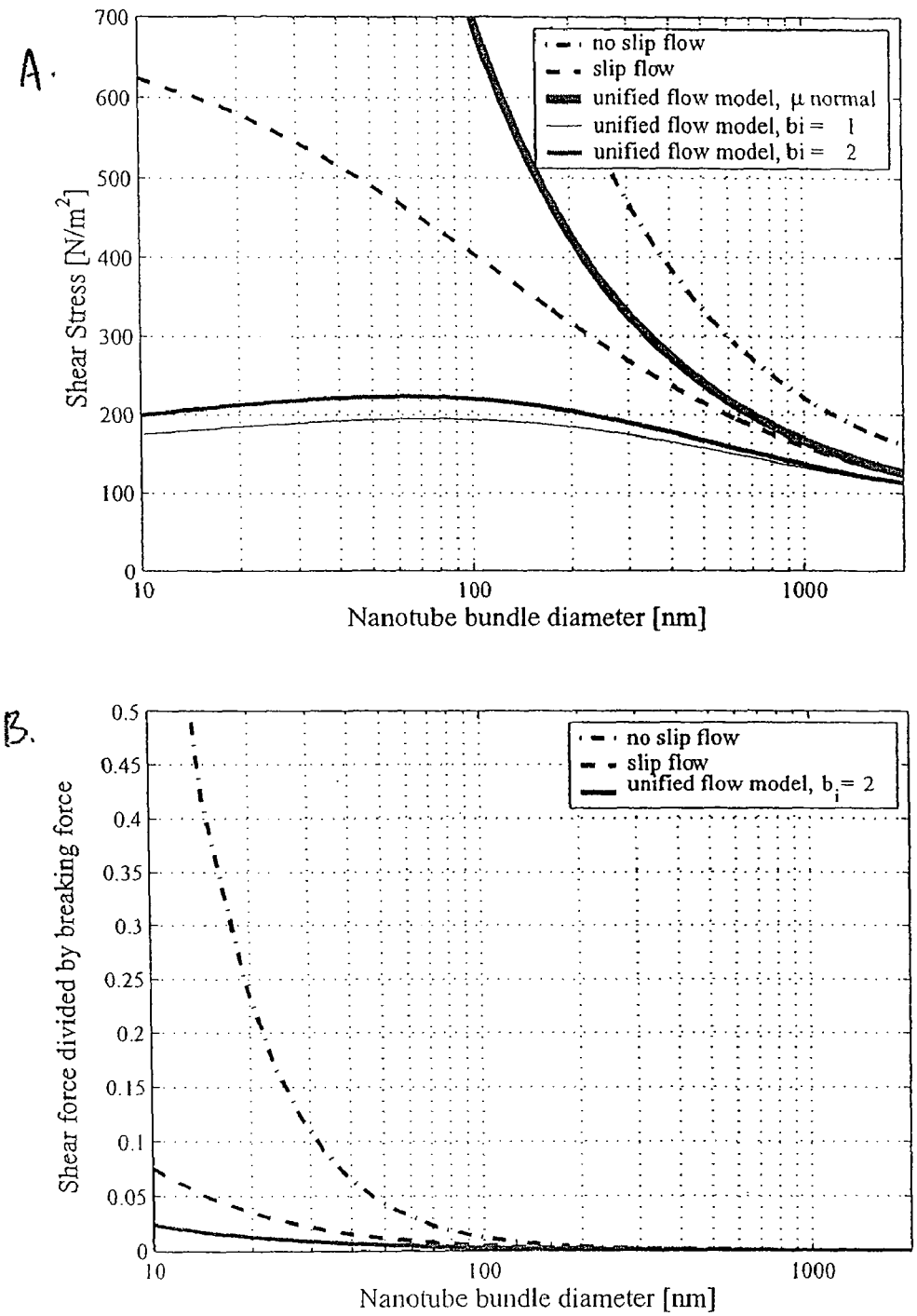
FIGS. 13A and 13B show the result of calculations of the shear stress and normalized axial force induced on a cylindrical bundle of carbon nanotubes suspended in the center of a microchannel, modelled as illustrated in FIG. 12, according to another embodiment of the invention.

In some instances, first order models of the forces introduced on nanostructures by gas flows, specifically, high-temperature gas flows that would be used to grow CNTs by CVD, can model the suspended nanostructure in a microchannel as an annular geometry, as shown in FIG. 12. In these models, long microchannels are treated as containing compressible slip flows. Flows can occur around groups of nanostructures with characteristic cross-sectional dimensions (e.g., diameters) ranging from a few nanometers to microns, and the flow boundary conditions can range from those for slip flows to transition flows, i.e., based on the Knudsen number of the flow, which indicates the magnitude of rarefaction. A suitable method of applying boundary conditions to obtain accurate analytical estimates of shear stresses on micro and nanoscale surfaces in micro-scale gas flows is presented by the so-called unified flow model of Karniadakis and Beskok. FIG. 13 shows results of calculations of shear stresses and normalized shear forces for nanostructure bundles of various cross-sectional dimensions, using various flow models for an exemplary 900° C. $CH_4$ flow in, a microchannel containing a single nanostructure bundle. This calculation is for an average flow velocity of 1 m/s, and as indicated by FIG. 13, this flow can introduce significant axial forces on the nanostructures. However, it is intended that a wide range of velocities, e.g., ranging from 0.0001 to 1 m/s or higher (i.e., giving laminar flows), may easily be achieved in microchannels. These fluid velocities may provide desired forces on the nanostructures, depending on the sizes and configurations of the nanostructures.

Figure 14:
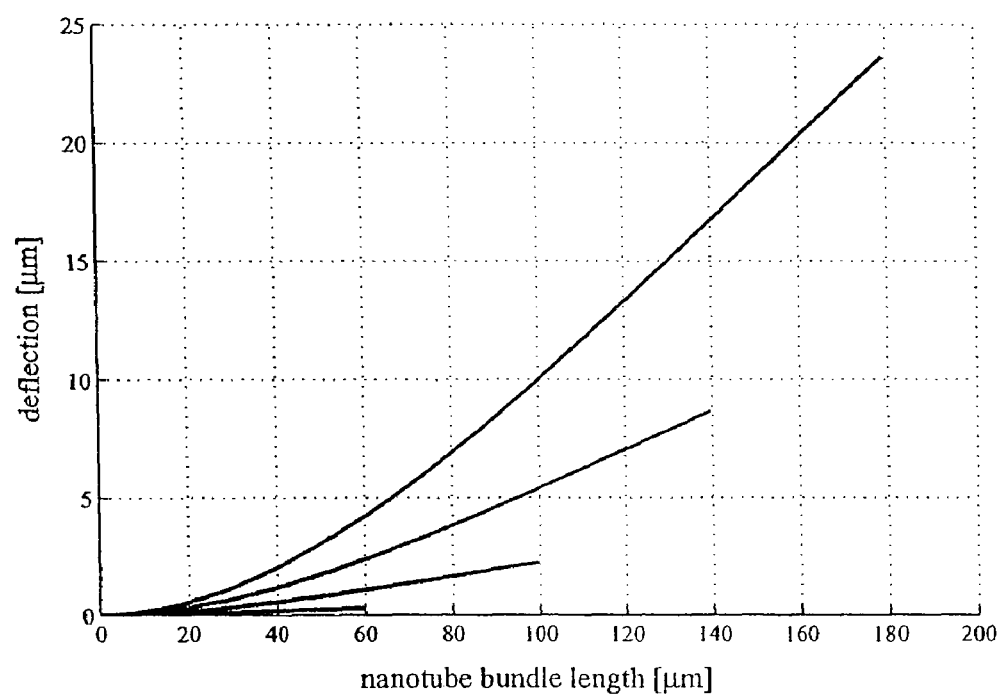
FIG. 14 shows the result of calculations of the bending induced on a cylindrical bundle of single-walled carbon nanotubes suspended in a fluid flow, modelled as cylinder in cross-flow, according to another embodiment of the invention.

In addition to the introduction of axial shear forces, it can be demonstrated that cross-flows can induce significant bending forces on nanostructures (FIG. 14). Hence, a transverse flow can direct the position of nanostructures while, based on the angle of the flow relatively to the nanostructure, also simultaneously inducing an axial force. The total axial force on a nanostructure, which is resolved by summing the shear stress on the surface nanostructure, generates a reaction force at the position in which the nanostructure is anchored (i.e., at the growth site). In some cases, this force is of sufficient magnitude can assist the growth of the nanostructure, but not to detach the nanostructure from its anchor position. The force resolved at the growth site, in addition to the action of suspending the growing nanostructures in the gas flow, can enable the growth of nanostructures at exceptionally high rates. On the contrary to a "pulling" force, significant anecdotal evidence demonstrates that a force "pushing" against a growth site, such as when a CNT becomes attached to a substrate by van der Walls forces, can slow or halt the growth process. Other types of forces that can be applied to nanostructures are discussed in more detail below.

Figure 15:
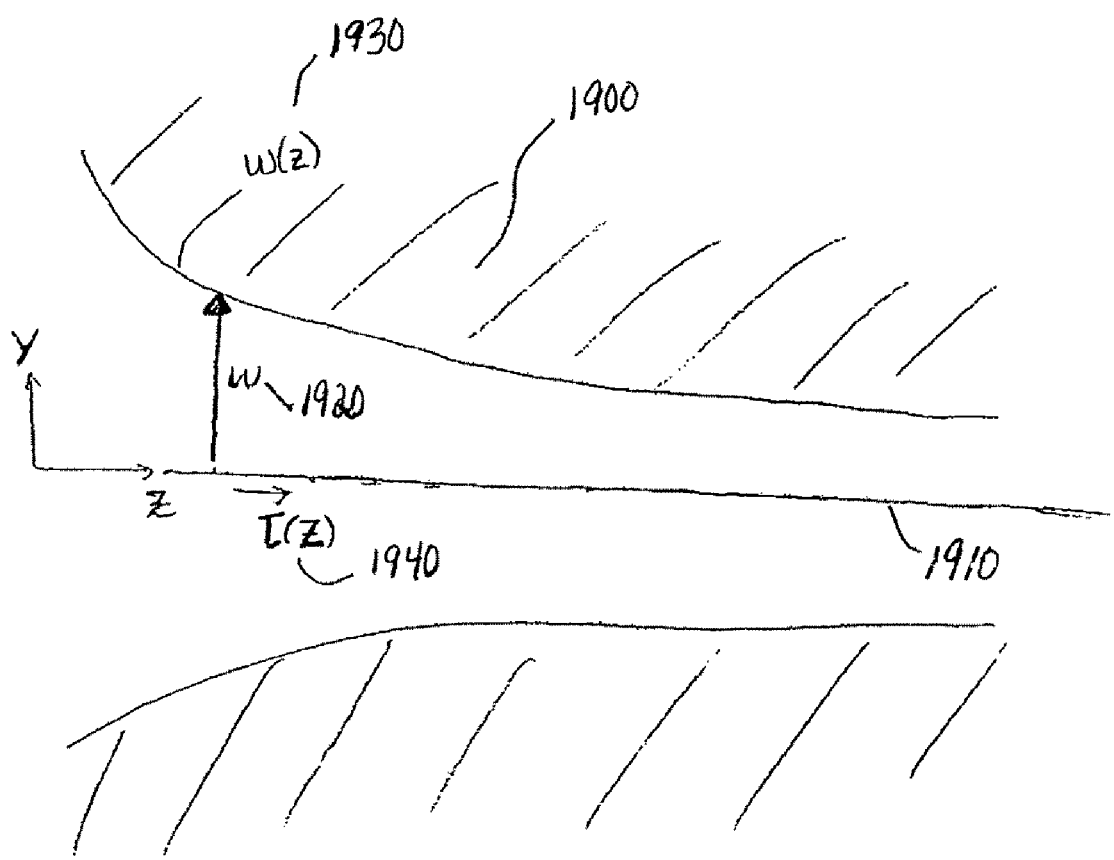
FIG. 15 shows how the cross-sectional shape of a microchannel can be designed to induce a desired force distribution along the length of a nanostructure in the microchannel, according to another embodiment of the invention.

FIG. 15 indicates schematically how the microchannels can be designed to provide a desired distribution of shear stress on a nanostructure. Here, microchannel 1900 has cross-sectional profile 1930 (w(z)), where local width 1920 (w) of the microchannel affects the flow in the microchannel. This, in turn, affects the local shear stress 1940 (r(z)) on nanostructure 1910. Advantageously, the microchannel environment can provide confined flows, and the channel geometry can be designed and the flow conditions chosen to provide desired forces on nanostructures. In addition, the trajectories of the microchannels can be used to direct the trajectories of the growing nanostructures, i.e., by designing microchannels that converge and/or merge in a microfluidic system.

Nanostructures grown and/or positioned in a microchannel may have different cross-sectional dimensions relative to a cross-sectional dimension of the microchannel. For instance, the ratio of a cross-sectional dimension of the microchannel to a cross-sectional dimension of an elongated nanostructure, or assembly of nanostructures, may be greater than 2:1, greater than 5:1, greater than 10:1, greater than 50:1, greater than 100:1, greater than 1000:1, greater than $10^4$:1, greater than $10^7$:1, greater than $10^9$:1, or greater. A large ratio may be characteristic of, for example, a single elongated nanostructure in a microchannel, and a small ratio may be characteristic of a plurality of nanostructures that form a larger structure (e.g., a bundle, fiber, and/or strand) in a microchannel.

Figure 16:
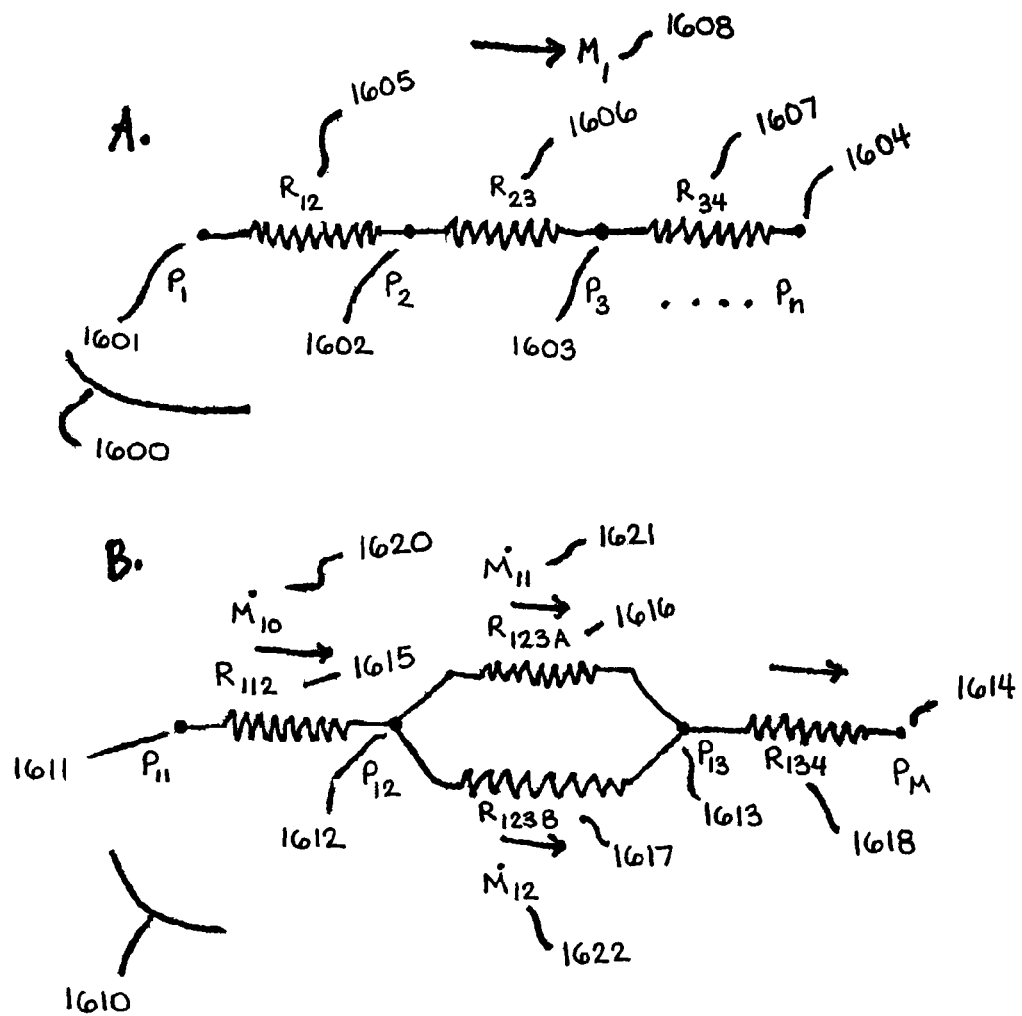
FIGS. 16A and 16B are exemplary diagrams showing how fluid resistance models are used to model the flows through microchannel networks used for directing the growth and/or assembly of nanostructures, according to another embodiment of the invention.

It is appreciated that when the cross-sectional dimensions of the nanostructures are substantially smaller (e.g., less than 10 times, less than 50 times, less than 100 times, less than 500 times, or less than 1000 times smaller) than the cross-sectional dimensions of the confining environment (e.g., the effective "hydraulic" diameter of the microchannel), the forces induced by the flows around the nanostructures can be relatively independent of the characteristic dimensions of the confining environment, and may depend more strongly on the surrounding flow rate and on the characteristic dimensions of the nanostructures. Accordingly, the embodiments of the present invention can also be achieved without microchannels, i.e., with larger scale channels (e.g., channels with millimeter-, centimeter-, or meter-sized dimensions) and/or with wide trenches containing a plurality of parallel islands, as long as sufficient flow control is introduced to establish the desired forces for growth and/or assembly of nanostructures. An embodiment of this sort of configuration can, for instance, feature microchannels as fluidic resistors to deliver precise flow rates to larger areas, where the flow is used to direct the growth and/or assembly of nanostructures from fixed or floating growth sites. For the micro-scale flow environments designed in accordance with the present invention, it may be desirable to model the distribution of fluids within the micro-scale growth environments using fluidic resistance models as shown in FIG. 16.

Figure 17:
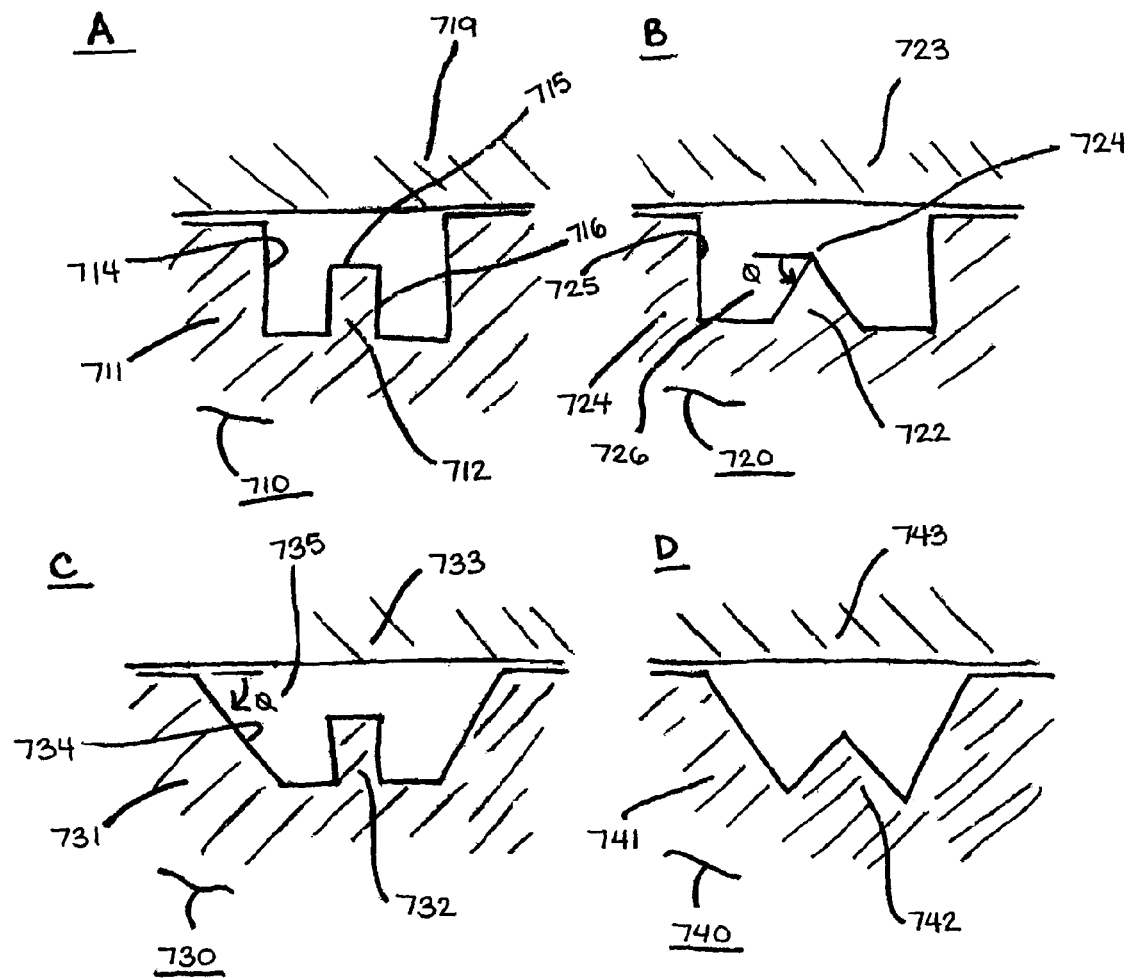
FIGS. 17A-E show cross-sectional geometries of microchannels and islands that are achieved using conventional microfabrication processes known to those of ordinary skill in the art, according to another embodiment of the invention.

While many of the drawings accompanying the present invention show microchannels with rectangular cross-sections comprising generic "football"-shaped islands from the top view, the microchannels and/or islands can be made in a variety of geometries, shapes, and/or configurations, which may be limited by the fabrication technologies known to those of ordinary skill in the art. As shown in FIG. 17, the channels and islands can have substantially vertical sidewalls or sloped sidewalls, or combinations of both. For example, microchannel 711 with cover 719 may have vertical sidewalls 714, with an island having a horizontal top surface recessed below the top surface of the substrate. Additionally, microchannel 724 may have vertical sidewalls 725, and contain a sloped island 722 with a very sharp (e.g., nanometer-scale radius) apex 724. Furthermore, microchannel 731 may have straight sidewalls 734, and can contain island 732 having vertical sidewalls. Microchannel 741 has both sloped sidewalls and a sloped island. Microchannel 751 is covered by a complimentary substrate 752, which creates a sloped symmetric cross-sectional geometry. These cavities and islands can be fabricated in both the substrate and the mating top structure, in some embodiments of the invention.

Figure 5:
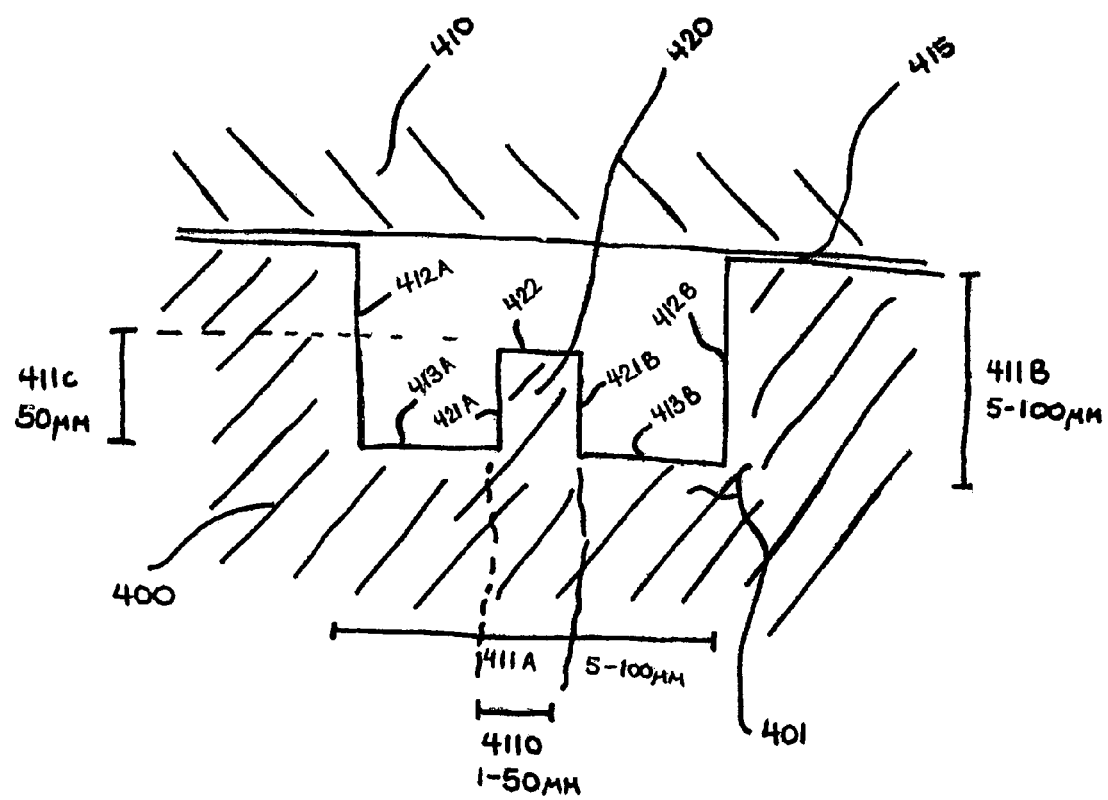
FIG. 5 shows the cross-sectional geometry of a microchannel containing an island, with one or more surfaces of the microstructure coated with a material for promoting and anchoring the growth of nanostructures, such as a catalyst, according to another embodiment of the invention.

FIG. 5 indicates exemplary ranges of dimensions of an embodiment of a microchannel configured in accordance with the present invention. In some cases, width 411A of the channel can range from 5-100 μm, and depth 411B can range from 5-100 μm; island width 411D can range from 1-50 μm, and island height 411C can range from 2-50 μm. However, it is recognized that these dimensions may be chosen from much wider ranges, as dictated by the desired configuration of the microchannel devices designed for a particular application, as discussed in more detail below.

Considerations that may affect the dimensions of the devices include the feature size limitations of the device fabrication processes, the desired areas of growth sites, the dimensions of the nanostructures, and as discussed later, the influences of the device dimensions on the field-induced forces on the nanostructures. Within these limitations, sizes of important structural features may be as small as a few nanometers, or as large as many millimeters or larger, as long the desired control of the growth and processes is achieved within environments designed in accordance with the present invention.

In addition, the microchannels discussed herein may be several millimeters in length or longer (e.g., greater or equal to 1 mm, greater or equal to 5 mm, greater or equal to 1 cm, greater or equal to 5 cm, or greater or equal to 10 cm), to facilitate stabilization and processing of the nanostructures, before optionally exiting the device to an output collector.

FIG. 5 also shows a cross-section of an exemplary microchannel and island used to anchor the growth of nanostructures. In one embodiment, the substrate 400 is made of a material which is resistant to the high temperatures and chemical conditions suitable for growing nanostructures by CVD, such as silicon. Microchannel 401 can be created in the substrate and island 420 may be situated roughly in the center of the channel. In some instances, the height of the microchannel is roughly equal to half the depth of the microchannel. The microchannel and/or the array of networked microchannels may be closed by a cover 410. In some cases, it is desirable for mating surface 415, positioned between the microchannel substrate and the cover, to provide a good seal against escape of gases from the microchannel environment; however, in other cases, it can also be desirable for this cover to be removable for access to the microchannel device, for a variety of purposes.

In one embodiment, the cover and the substrate are made from silicon wafers, and mating interface 415 is positioned between a polished silicon surface and a non-polished silicon surface, which because of long-range flatness provides a good seal over large areas (with appropriate preload against any flow pressure in the device), yet is resistant to bonding. The mating surfaces may be coated with appropriate layers such as silicon nitride ($Si_3N_4$) to further resist bonding at high temperatures.

In some instances, the straight sidewall geometries of microchannels and/or islands are achieved using reactive ion etching (DRIE). The sloped geometries can be fabricated in single-crystal substrates using an anisotropic etchant such as a potassium hydroxide (KOH) solution, where (111) planes are etched at a much slower rate than (100) planes. This is especially advantageous for creating microchannels with triangular (self-terminating) and trapezoidal (time-terminated) cross-sections, as well as exceptionally sharp island structures, which can be used to suspend individual growth sites in flow fields or concentrate electric fields at sharp tips.

Figure 18:
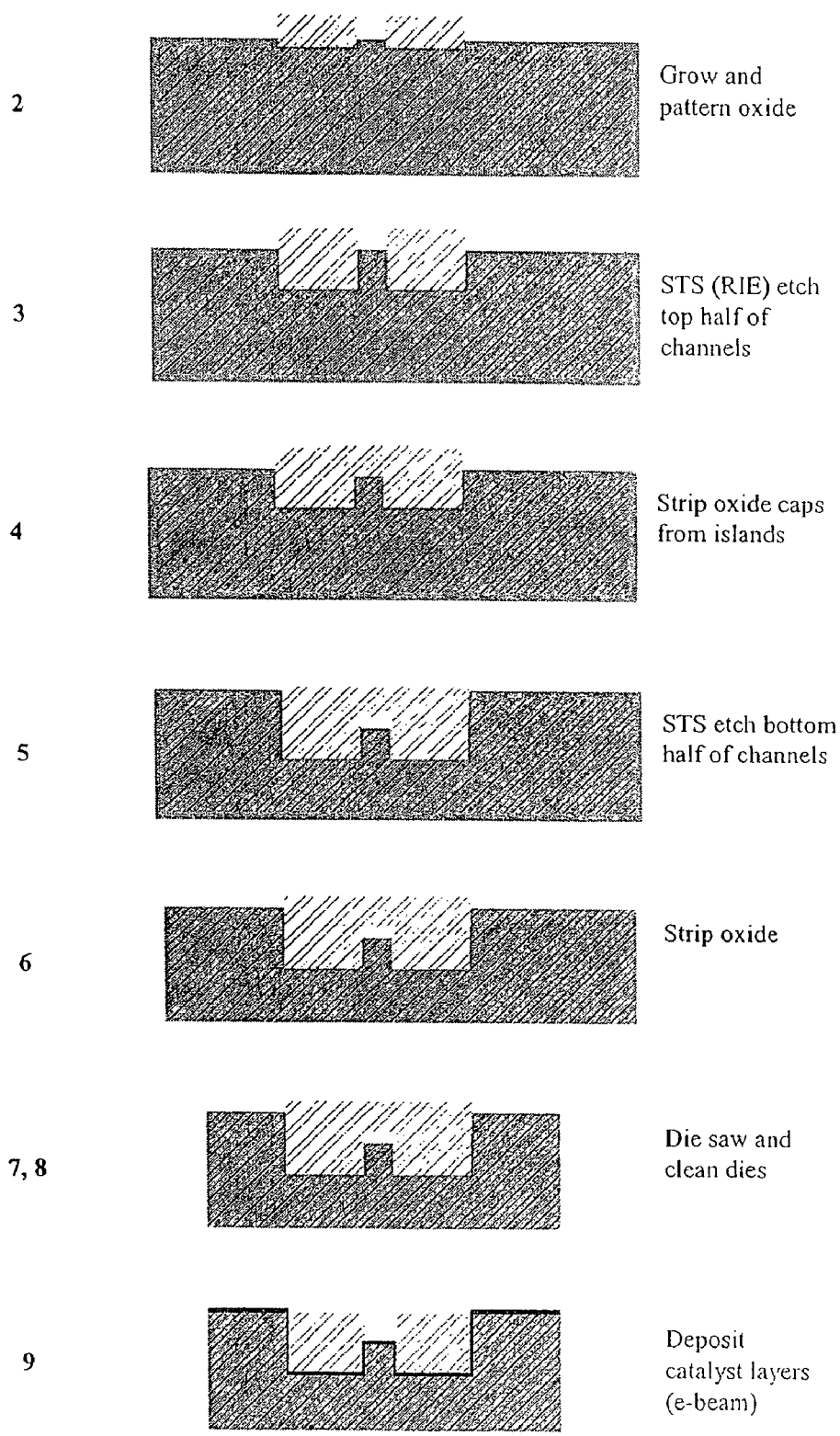
FIG. 18 outlines an exemplary fabrication process for a microchannel array with catalyst-coated areas and islands, with all microchannels having the same depth, according to another embodiment of the invention.
Figure 19A:
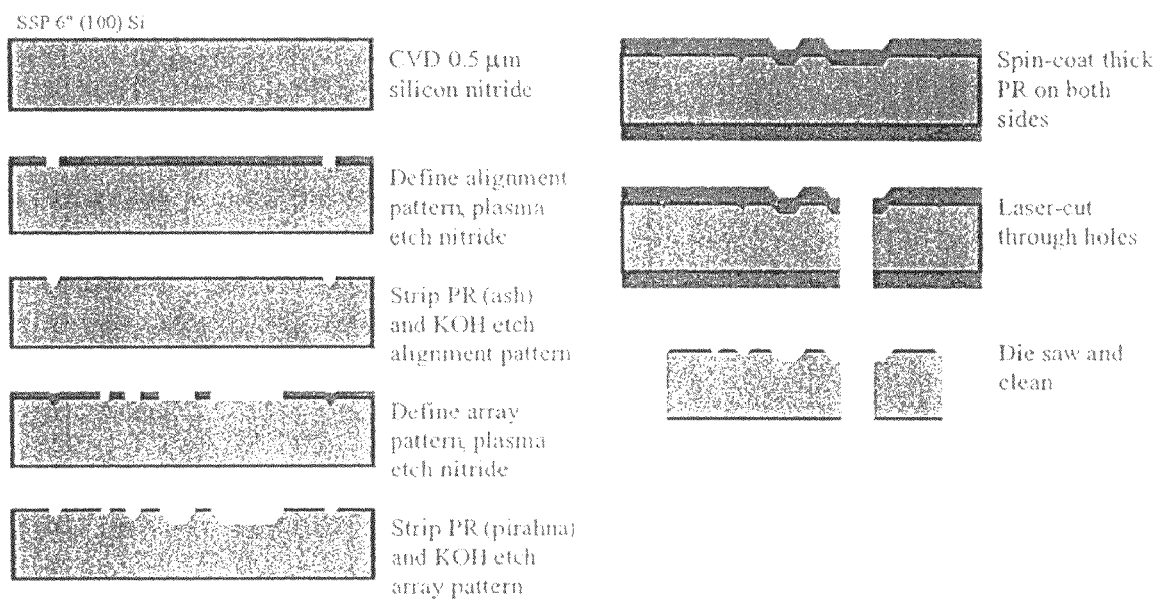
FIG. 19A outlines an exemplary fabrication process for a microchannel array with catalyst-coated areas and islands, with the microchannels having different depths, according to another embodiment of the invention.
Figure 19:
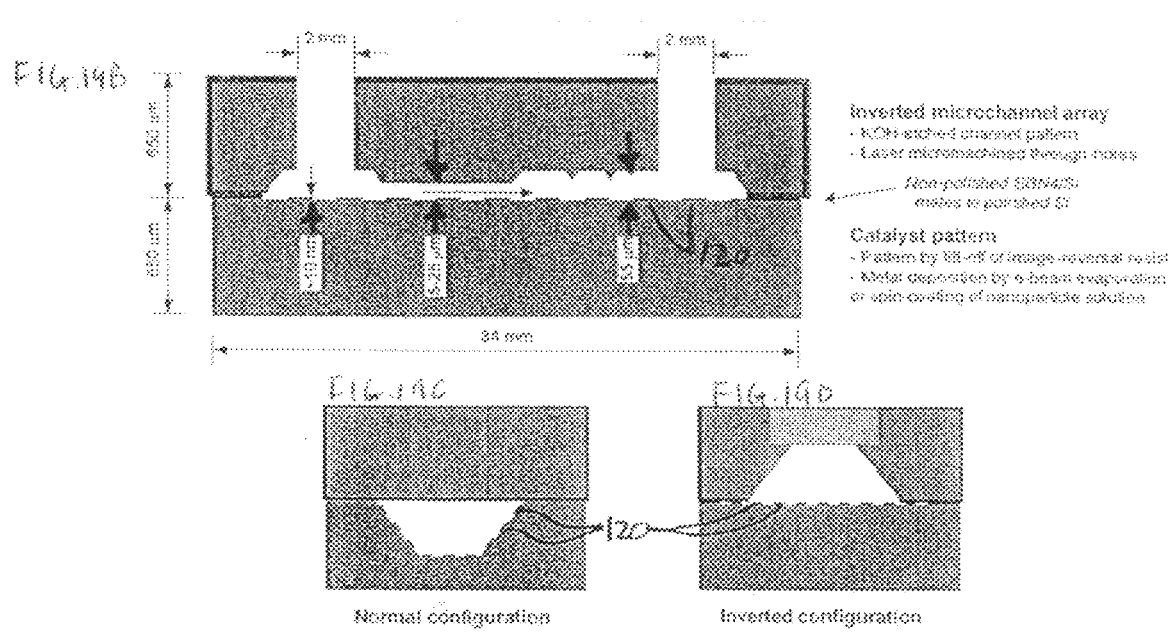
FIGS. 19B-D are diagrams showing inverted and normal channel configurations, according to another embodiment of the invention.

In some embodiments, the microchannels may have regions of substantially constant or converging cross-sections. The islands may have any suitable shape from the top view, such as a circle, rectangle, diamond, or teardrop. The shape of the islands can be chosen to direct the local gas flow around the island in a desired fashion to direct flow of reactants to the growth sites, and/or to establish forces on the growing nanostructures. FIG. 18 outlines an exemplary fabrication process for creating arrays of microchannels having recessed islands and equal depths, where all features have straight sidewalls, using reactive ion etching (RIE). FIG. 19A outlines an exemplary fabrication process for creating arrays of microchannels having sloped sidewalls and optionally unequal depths, and sloped islands. Note that in the process of FIG. 19A, the depths of regions of the microchannels can be chosen to give precise fluidic resistances, and/or to deliver precise flows to the growth and/or assembly areas. In these exemplary processes, a catalyst of Fe/Mo or Fe supported on a thin layer of $Al_2O_3$ can be deposited on the devices by electron beam evaporation. Catalysts can be localized on the islands using lift-off of photoresist or other processes known to those of ordinary skill in the art.

As shown in FIGS. 19B-D, different methods of positioning a catalyst in a channel are possible. Catalysts 120 can be patterned on a flat substrate, and microchannels may be placed on top of the catalysts in an "inverted configuration" (FIGS. 19B and D). Or, catalysts can be patterned on the walls of a channel and the channel can be enclosed by a substrate, i.e., in a "normal configuration" (FIG. 19C). In some cases, catalysts can be patterned on all sides of a channel by patterning the catalysts on the walls of the channel, as well as on the substrate that encloses the channel.

Figure 20:
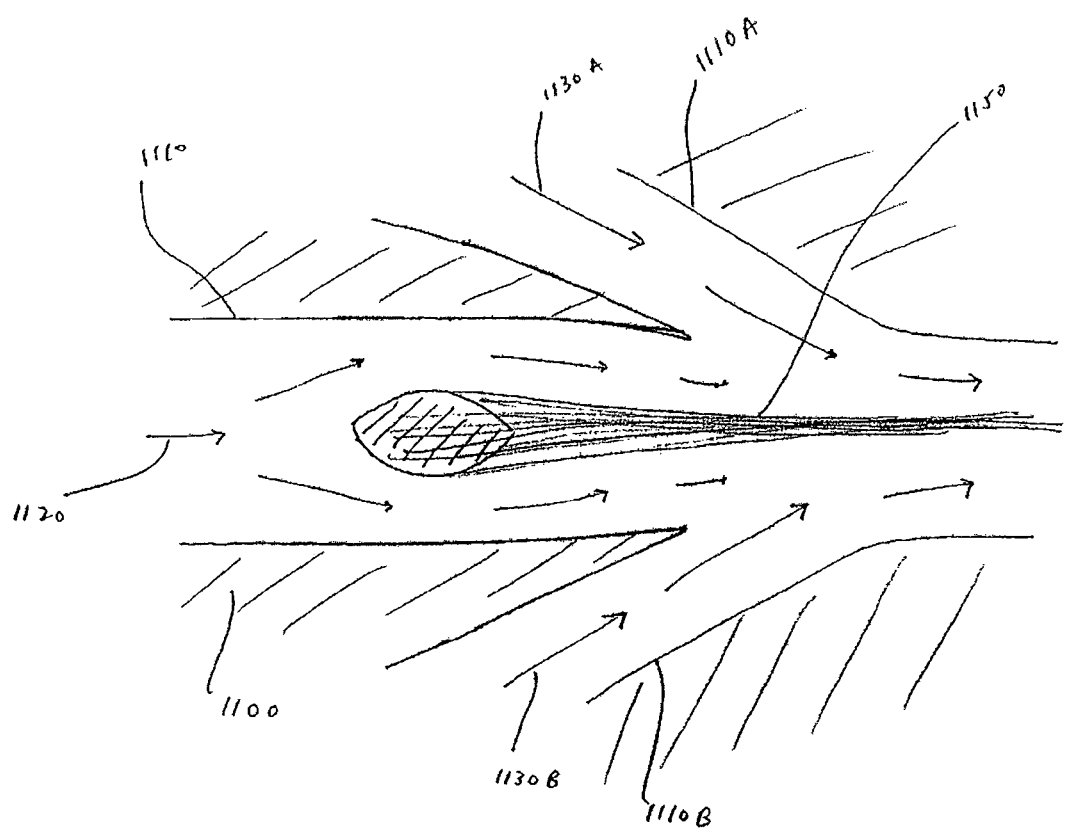
FIG. 20 shows an exemplary microchannel containing nanostructures growing from an island, where a second flow is introduced downstream of the growth site, according to another embodiment of the invention.

In another embodiment, the microchannel environments are used to introduce reactive and/or non-reactive species to control the growth and/or assembly of nanostructures. In some instances, the supplies of the species are introduced in a fashion to substantially decouple chemical processes of growing nanostructures from mechanical processes of controlling the configuration and/or orientation of the nanostructures. This can be done by applying forces to the nanostructures and/or to the growth sites. FIG. 20 shows an exemplary microchannel geometry 1100, where the species for growing and directing the initial growth of nanostructures 1150 are delivered by a main flow 1120. The flow is later augmented by addition of flows 1130A and 1130B flowing in supply channels 1110A and 1110B, respectively, which merge with the main path 1110. This method of augmenting flows may be used anywhere within the micro-scale environments of the present invention, i.e., to introduce reactive and/or non-reactive species at desired locations. These desired locations may contain nanostructures that are in specific stages of the growth and/or assembly process. In one particular embodiment for growing CNTs, flows of chemical species that are necessary to grow the CNTs, e.g., $CH_4$ and $H_2$, are introduced near the growth site. Downstream of the growth site, flows of an inert species (e.g. Ar) and/or a doping species (e.g. $N_2$) can be introduced to induce forces on, or further modify, the CNTs.

Nanostructures may be subjected to additional chemical species for a variety of reasons, i.e., to purify CNTs by removing amorphous carbon from the CNTs. In some cases, these additional species may influence the configuration and/or assembly of the nanostructures. For instance, in one embodiment, these species may initiate attraction among the nanostructures to form a bundle, strand, and/or fiber. In another embodiment, these species may reinforce or protect the nanostructures by depositing, or initiating growth of, a coating layer. In other embodiments, chemical species may have a combination of effects on the nanostructures, such as the ones mentioned above.

In the overall spirit of the present invention, the microchannel environments can enable introduction of a wide variety of reactive and/or non-reactive chemical species throughout different locations of the device. Hence, a large number of sequential processing steps can be performed, which can enable precise control of the reaction rates and/or forces on the nanostructures. Control can be implemented by different methods, for instance, by precise delivery of very small quantities of species, by the use of micro-valves within the fluidic system, by metering fluids using passive fluidic resistors integrated with the environments, and/or by external handling equipment coupled to the environments. Also, for a wide variety of gaseous chemical species, the forces introduced by gas flows can be determined by the bulk properties (e.g., density, mean free path, viscosity) of the gases rather than the chemical activities of the gases. This can allow forces of similar magnitudes to be introduced by a wide variety of reactive and/or non-reactive species.

Figure 21:
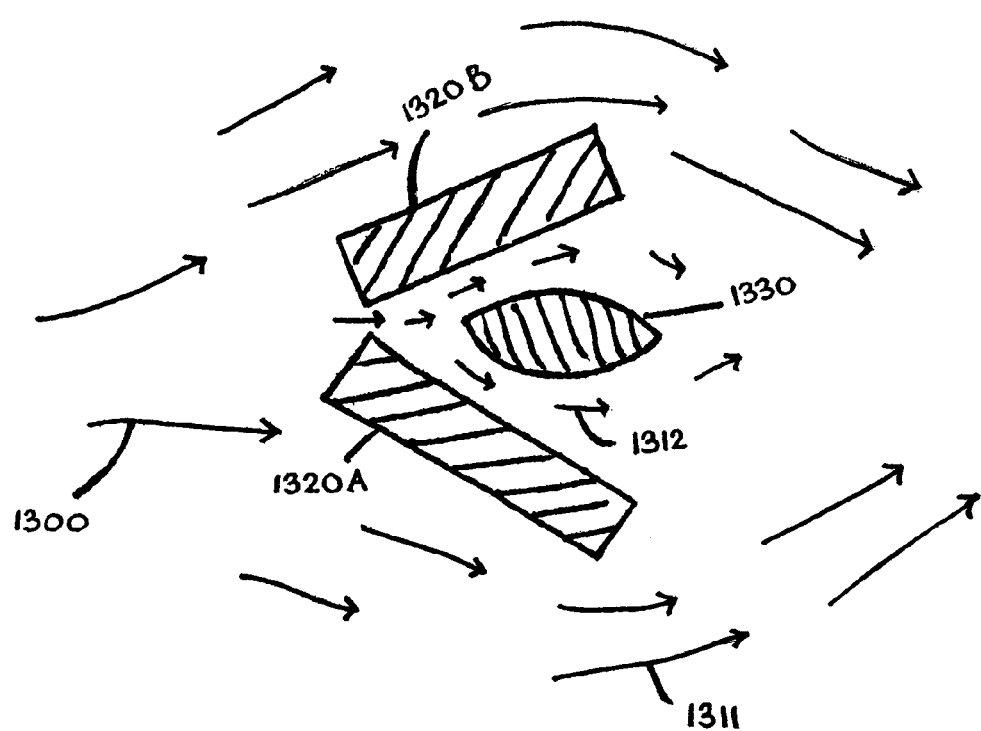
FIG. 21 shows a top view of an exemplary island structure which is designed to create a desired flow pattern around an island anchoring the growth of nanostructures, where the flow around the island returns to its fully-developed profile downstream of the island, to direct the long-range growth of the nanostructures, according to another embodiment of the invention.

In another embodiment, partitioning gas flow within a microchannel environment is achieved by appropriately designing blockages within the microchannels. FIG. 21 shows a top view of an exemplary blockage island structure in flow field 1300. Blockage structures 1320A and 1320 B can direct portion of the flow 1312 to an island 1330, which can anchor the growth of nanostructures, while remainder of the flow 1311 flows around the blockage structures. The remainder of the flow can eventually reach a steady-state, and can direct the growth of the nanostructures.

Figure 22:
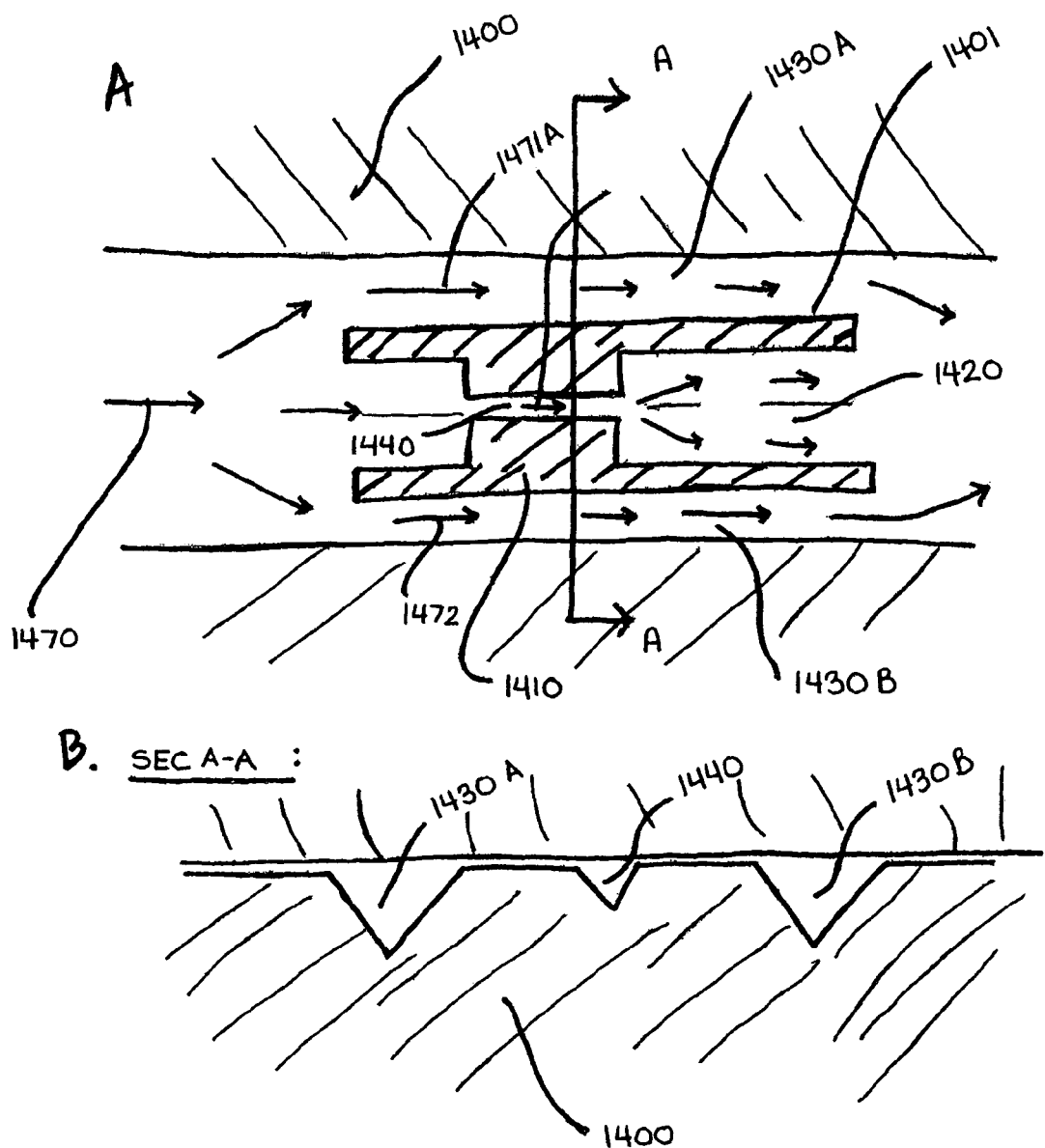
FIGS. 22A and 22B show top and cross-sectional views, respectively, of an exemplary island structure, designed in the same manner as the island shown in FIG. 21, but achieved by anisotropic wet etching, to partition a single gas flow in a microchannel into a first flow directed to a designated growth region, and a second flow directed around the growth region to provide downstream influence on the growing nanostructures, according to another embodiment of the invention.

Using anisotropic etching (e.g., KOH etching of silicon), a similar function of partitioning flow can be achieved using the structure shown in FIG. 22, where an area of a microchannel 1400 is masked by a 'H'-shape 1401. The etchant can create self-terminating triangular channels in the areas of the microchannel which are not masked by the 'H'. In this embodiment, the main flow 1470 is partitioned into symmetric flows 1471A and 1471B through channels 1430A and 1430B, which are positioned around the 'H', and into a single flow 1473 through the center channel 1440 of the 'H'. Here, size of the masked 'H', and therefore the widths and lengths of the channels 1471A, 1471B, and 1440, can be chosen to locally partition the flow as desired. Furthermore, in some cases, the flow through the center is directed to a growth zone 1420, containing growth sites for nanostructures. The nanostructures can then grow in the direction of the local gas flow and can be later directed downstream as the main flow returns to steady-state downstream of the 'H'. For example, the flow of reactive species through channel 1440 could be chosen to limit, and therefore control, the growth rate of the nanostructures from the growth sites in region 1420. Note that the exemplary sketch of FIG. 22 neglects undercutting of unprotected convex structures in KOH solutions; appropriate mask compensation techniques known to those of ordinary skill in the art can be applied.

Figure 23A:
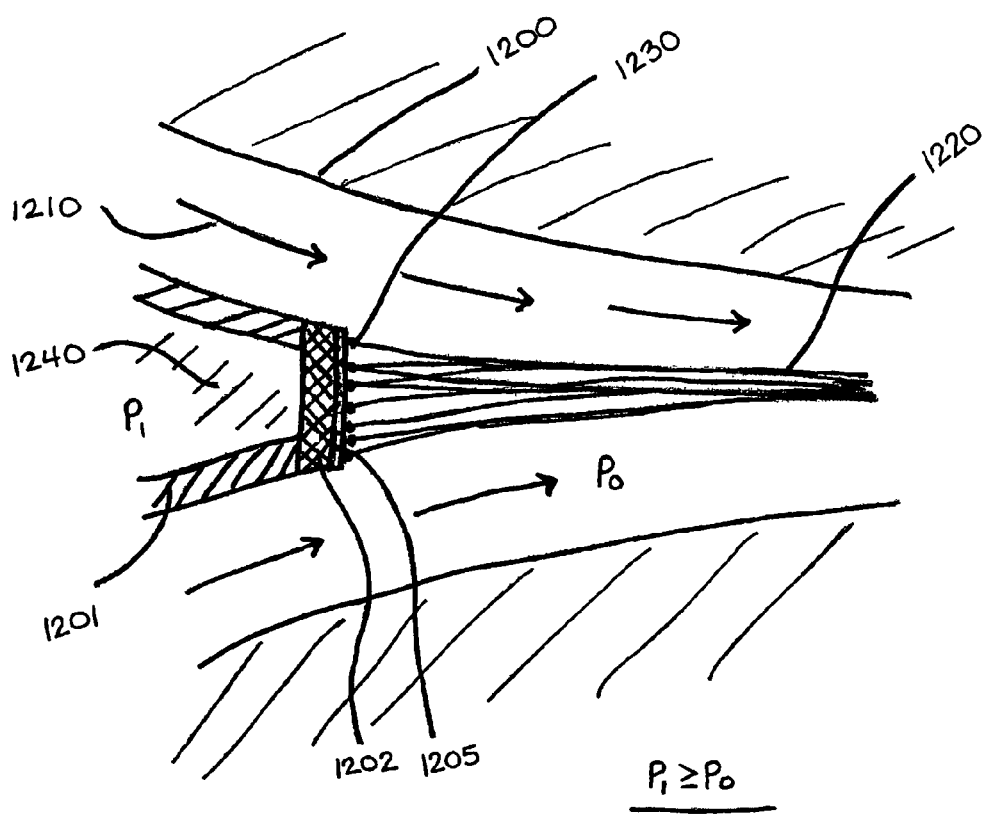
FIG. 23A shows an exemplary microchannel, where the mixture of reactive species used to grow nanostructures is supplied through a porous barrier in an island holding growth sites, and the growth of a bundle of nanostructures is directed by a secondary flow, according to another embodiment of the invention.

In another embodiment, partitioning flows involves decoupling a supply of reactive species used to grow nanostructures from the flow of species used to induce forces on the nanostructures (i.e., to direct the configuration and orientation of growth and/or assembly of the nanostructures). FIG. 23A shows an exemplary microchannel structure 1200, where supply 1240 containing reactive species is contained behind barrier structure 1201. The supply containing reactive species penetrates porous region 1202 of the barrier structure to feed growth sites 1205, where nanostructures 1220 begin to grow. Flow 1210 through the microchannel surrounds the barrier structure and directs the nanostructures.

Figure 23B:
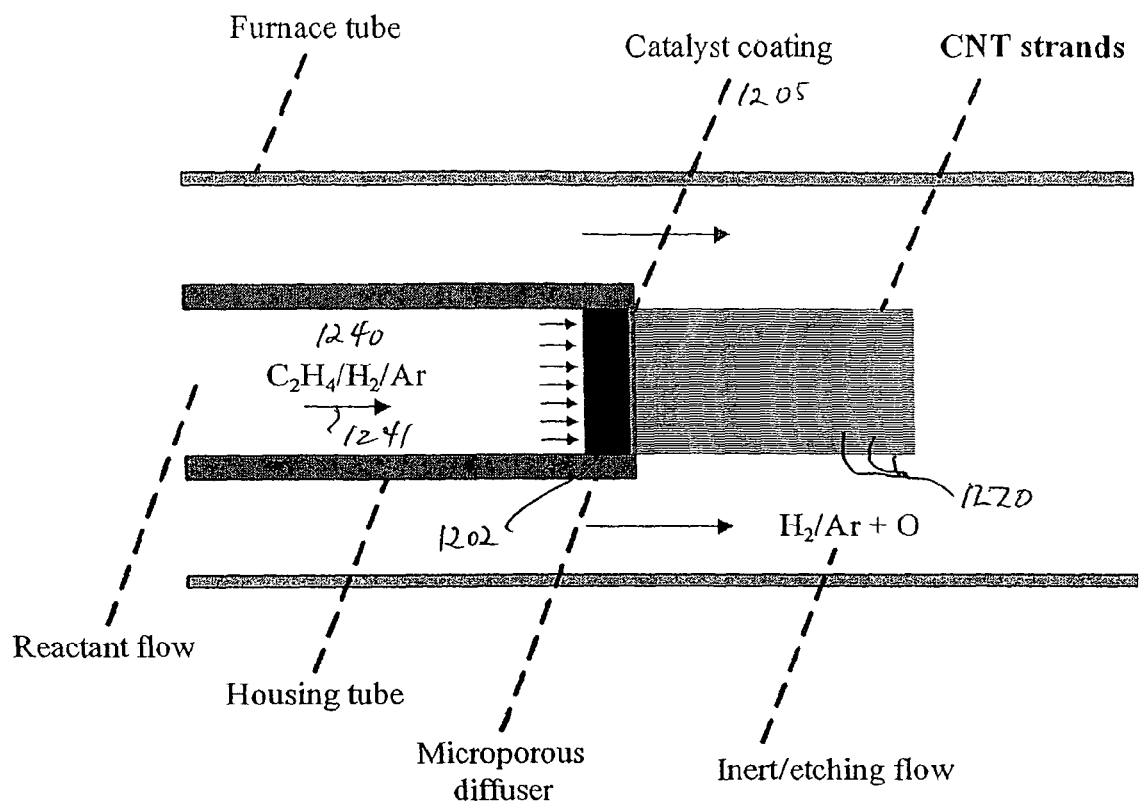
FIG. 23B shows a porous substrate used to grow nanostructures, according to another embodiment of the invention.
Figure 23C:
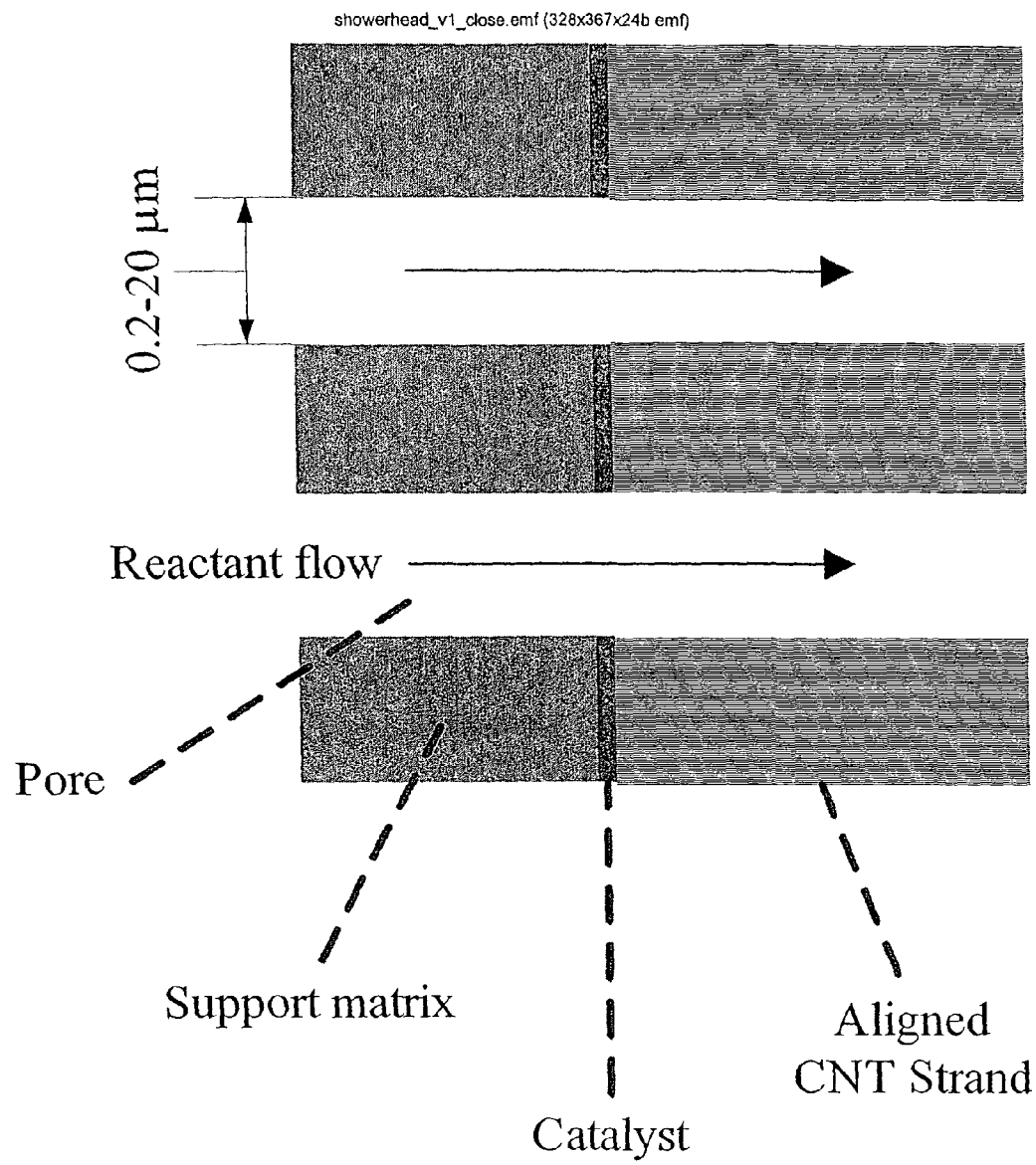
FIG. 23C shows a close-up of a porous substrate used to grow nanostructures, according to another embodiment of the invention.

FIG. 23B shows porous substrate 1202, which can be used to direct the growth of nanostructures 1220. Although FIG. 23B shows porous substrate 1202 positioned perpendicular to the direction of flow, the substrate can be positioned in any suitable direction, e.g., in the same direction, or at an angle (i.e., 30 degrees, 45 degrees, 170 degrees, etc.) relative to the fluid flow. In one embodiment, the porous substrate comprises growth sites 1205. These growth sites may be catalysts, i.e., in the form of a coating, positioned on one side of the porous substrate, on multiple sides of the substrate, or in the pores of the substrate. A close up figure of a porous substrate is shown in FIG. 23C.

The pores of the substrate may have any suitable orientation (e.g., a uniform, aligned, or a random orientation) within the substrate. The orientation may depend on, for instance, the material in which the substrate is fabricated and/or the method of fabricating the pores. A non-limiting example of a porous substrate is a silicon wafer with micron-sized holes etched through the wafer. Another non-limiting example is a porous membrane in which sub-micron pores have been fabricated by electrochemical etching. Different sizes of pores are also possible; for instance, pores may have diameters of less than 500 microns, less than 100 microns, less than 50 microns, less than 10 microns, less than 1 micron, less than 0.1 microns, less than 10 nanometers, or less than 1 nanometer. In some cases, pores can have different diameters within a single substrate.

In another embodiment, a method for growing nanostructures is provided. The method may comprise flowing a fluid (e.g., reactive species 1240) from a back surface to a front surface of substrate. The fluid may flow in a first direction upstream of the substrate, i.e., as indicated by arrow 1241 of FIG. 23B. In some cases, a portion of the fluid may pass through pores of the substrate. In other cases, substantially all of the fluid is passed through the pores of the substrate (i.e., rather than around the substrate). Different methods of passing, such as by convective or diffusive flow, are possible. Passing of these species may cause elongated nanostructures 1220 to grow from a surface of the substrate, and in some instances, the nanostructures may grow and/or align in the first direction. In some embodiments, nanostructures self-organize on the surface of the porous substrate, i.e., by surface interactions and/or by steric interactions between the nanostructures (e.g., the spatial arrangement of the nanostructures). The porous design may provide a uniform, and time-invariant reactant flow to the catalyst. In other embodiments, nanostructures formed using this method are assembled into larger structures such as bundles, fibers, or strands.

In some instances, the pores of a porous substrate can be used as micro-scale environments. For instance, in one embodiment, the porous substrate is positioned in a flow reversal configuration (as described in more detail below and in FIG. 42). Fluid can be passed through the pores of the substrate, i.e., by applying a positive or negative pressure to cause flow. In another embodiment, growth sites on the porous substrate can be heated locally, e.g., by laser and/or inductive heating.

Figure 24:
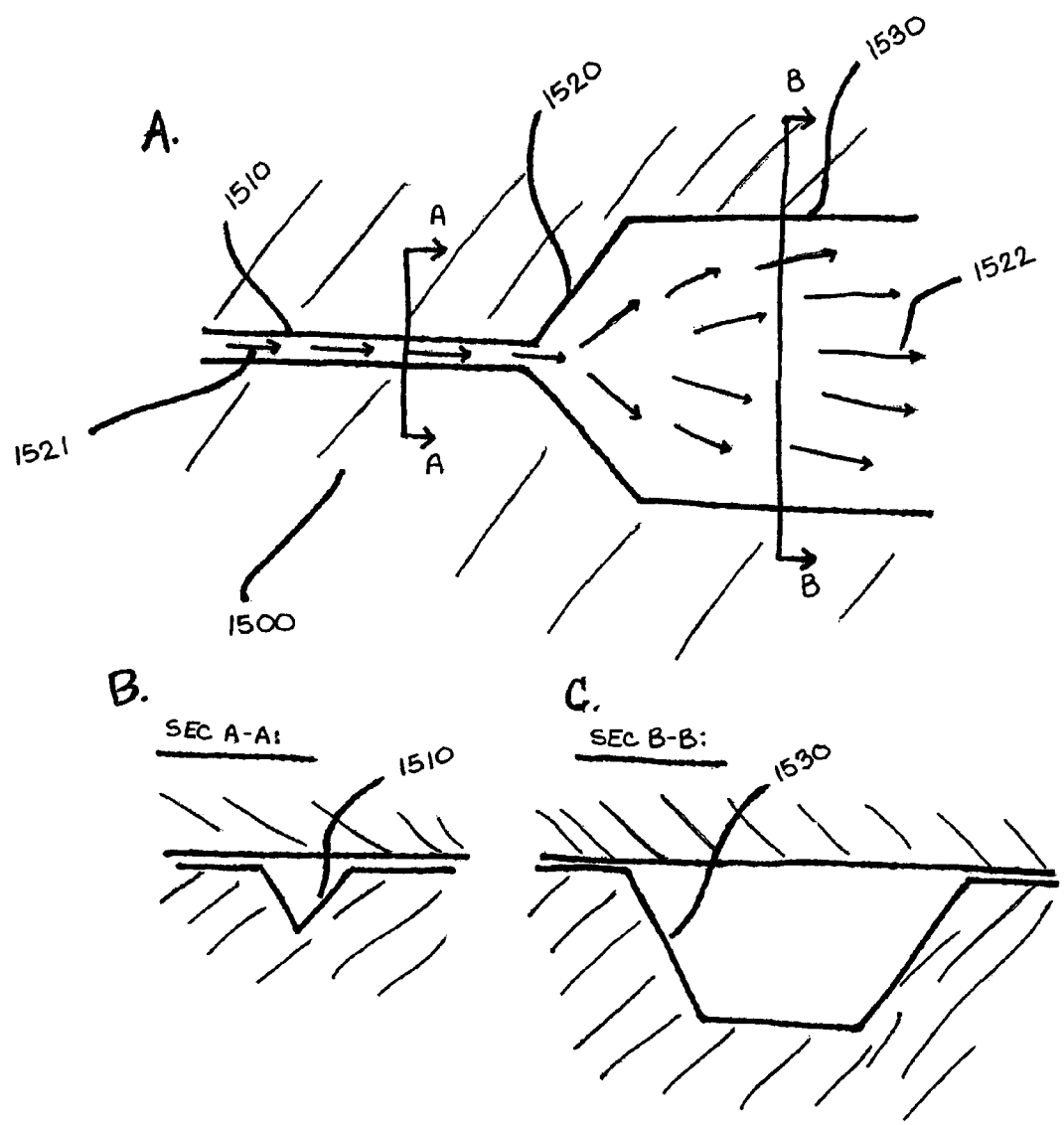
FIGS. 24A-C show an exemplary microchannel with regions having different cross-sectional shapes and sizes, specifically a sudden flow expansion or contraction between the regions, according to another embodiment of the invention.

Other methods of directing flow in microchannels are possible by designing channels having specific geometries. In one embodiment, a channel structure features a sudden change in the channel cross-section, as illustrated in FIG. 24. Here, anisotropic etching (e.g., KOH etching of silicon) is used to create microchannel 1510 with a first region having a triangular cross-section, and a second region 1530 with a much larger cross-section. Flow 1521 in the first region can expand and substantially slow upon entering the expansion region 1520, and can eventually reach a final fully-developed state 1522. The distance between the expansion and the fully-developed state depends on the parameters of the flow and the exact geometry of the channel expansion. The flow direction may be reversed, so a contraction of the channel structure, and therefore an increase in the flow velocity, can be introduced. Although growth sites may be located anywhere within this environment, in a particular embodiment, first region 1510 may be used primarily as a fluidic resistor to provide a controlled gas supply for growth of nanostructures in the region 1522. In this region, the flow through the channel structure may be determined primarily by the geometry of the first region and by the pressure difference from the input of the first region to the output of the second region.

Figure 25:
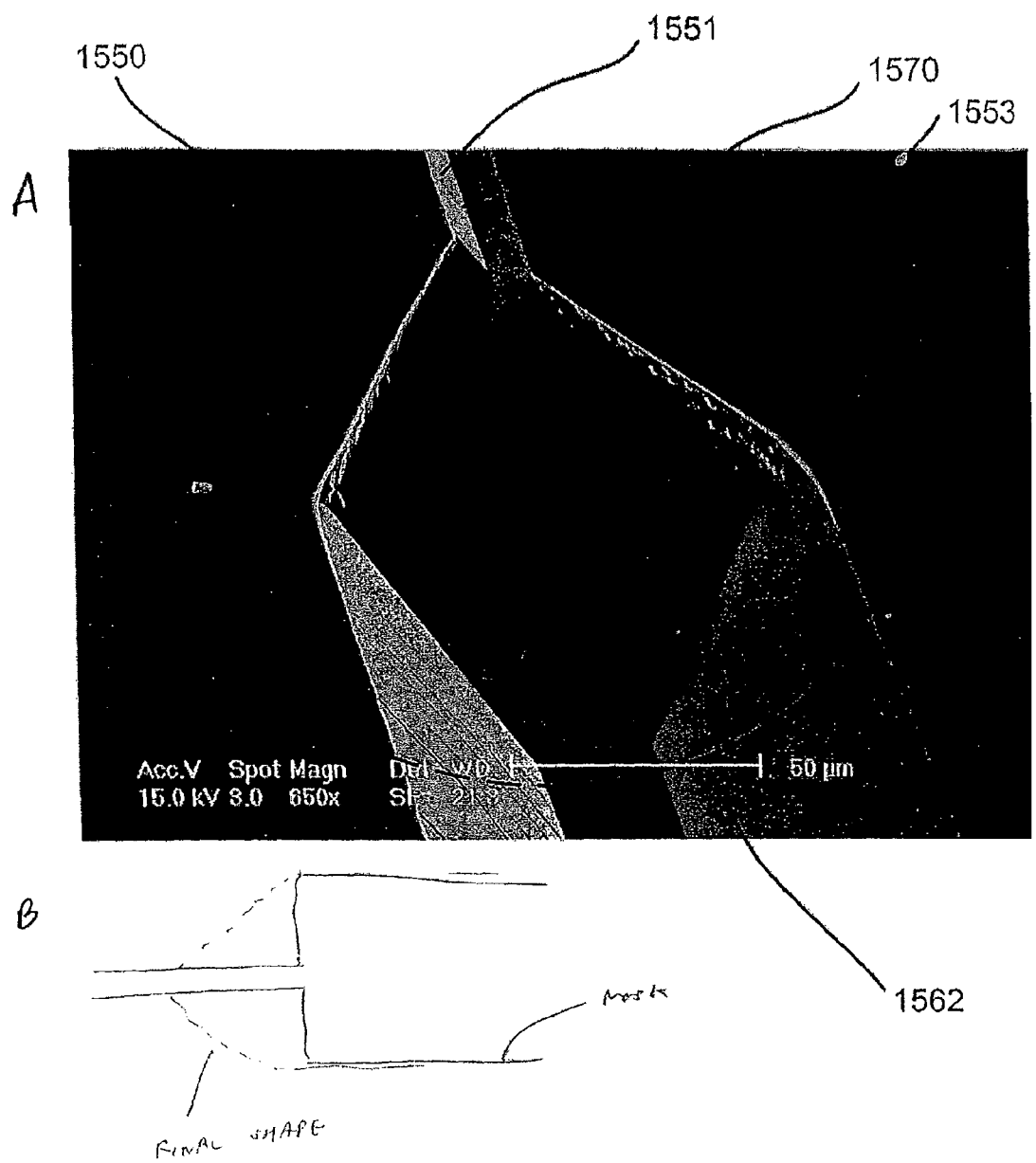
FIGS. 25A and 25B show regions of a microchannel with a sudden expansion in its cross-section, etched in a silicon wafer substrate using a potassium hydroxide solution, according to another embodiment of the invention.

FIG. 25A shows a scanning electron microscope image of an exemplary silicon microchannel in accordance with FIG. 24, fabricated by etching in a 20% KOH (80% DI $H_2O$) solution at 80° C., for 55 minutes. In a particular implementation of this structure, growth sites are placed in the outlined area 1570. Particularly, the growth of the nanostructures is carried off the edge of the first region 1551 to the expansion region 1553 by the expanding gas flow, and directed downstream along the second region 1562. Particularly, nanostructures growing from the growth sites on or near the terminal edge of the first region, which is extremely sharp because the KOH etching proceeds along well-defined crystal planes, may be immediately entrained in the gas flow and therefore can be prevented from making unfavorable interactions with surfaces. Furthermore, while the expansion flow remains laminar and therefore "smooth" without vortex shedding, curvatures in the flow pattern can influence the growth of nanostructures from the edge. Effects from curvatures in the flow pattern are also important in some embodiments with other island designs, for example those shown in FIGS. 21 and 22.

Figure 26:
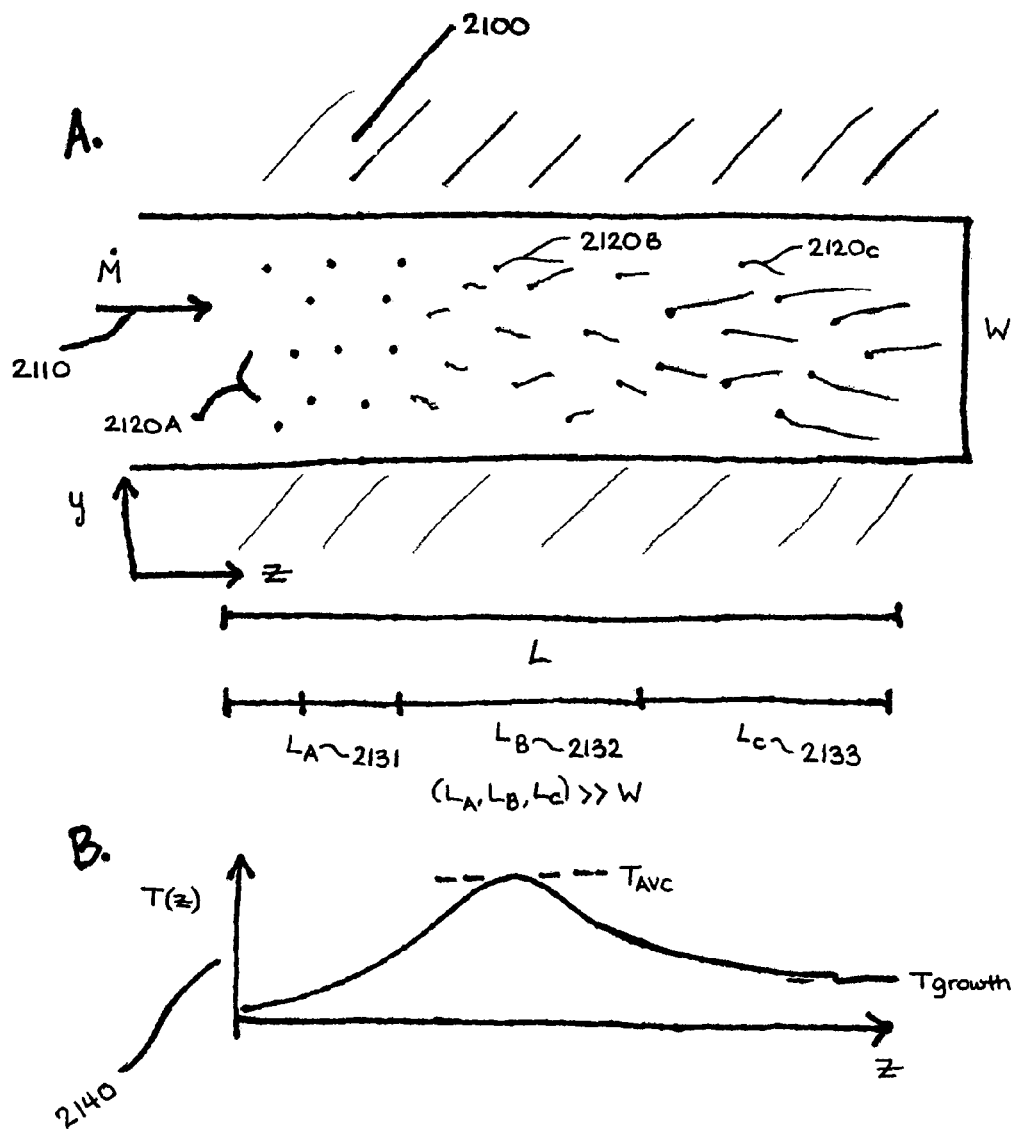
FIG. 26A shows how the growth of nanostructures from floating growth sites can be directed by the flow in a microchannel, according to another embodiment of the invention.
FIG. 26B shows how the temperature along the microchannel can be controlled to affect the nucleation and growth of the nanostructures, according to another embodiment of the invention.

In another aspect of the invention, nanostructures are grown from floating growth sites in microchannel networks. In some embodiments, higher densities of growth sites can be achieved with floating growth cites, rather than with stationary growth cites (i.e., on islands or walls of a microchannel), positioned in the micro-scale flow environments. FIG. 26A shows a top view of a section of an exemplary microchannel 2100, in which flow 2110 (M) carries a population of growth sites 2120A such as metal nanoparticles, into the first region 2131 ($L_A$). As the flow proceeds along the channel, nanostructures can nucleate from the floating growth sites and begin to grow into nanostructures 2120B in the second region 2132 ($L_B$). These nanostructures can become longer nanostructures 2120C as they continue to grow in the third region 2133 ($L_C$). Clearly, FIG. 26A is not drawn to scale, and each of the regions can be substantially longer than the characteristic width dimension of the microchannel. In some cases, it is desirable to stabilize the floating growth sites against undesired agglomeration of the nanoparticles or of the growing nanostructures, in regions where agglomeration is unfavorable. For example, it may be desirable to prevent the nanoparticles from becoming too large before nucleation occurs, and/or to prevent the nanostructures from adopting tangled configurations before being brought into desired (e.g., aligned) configurations at the intended locations within the microchannel networks.

Figure 28:
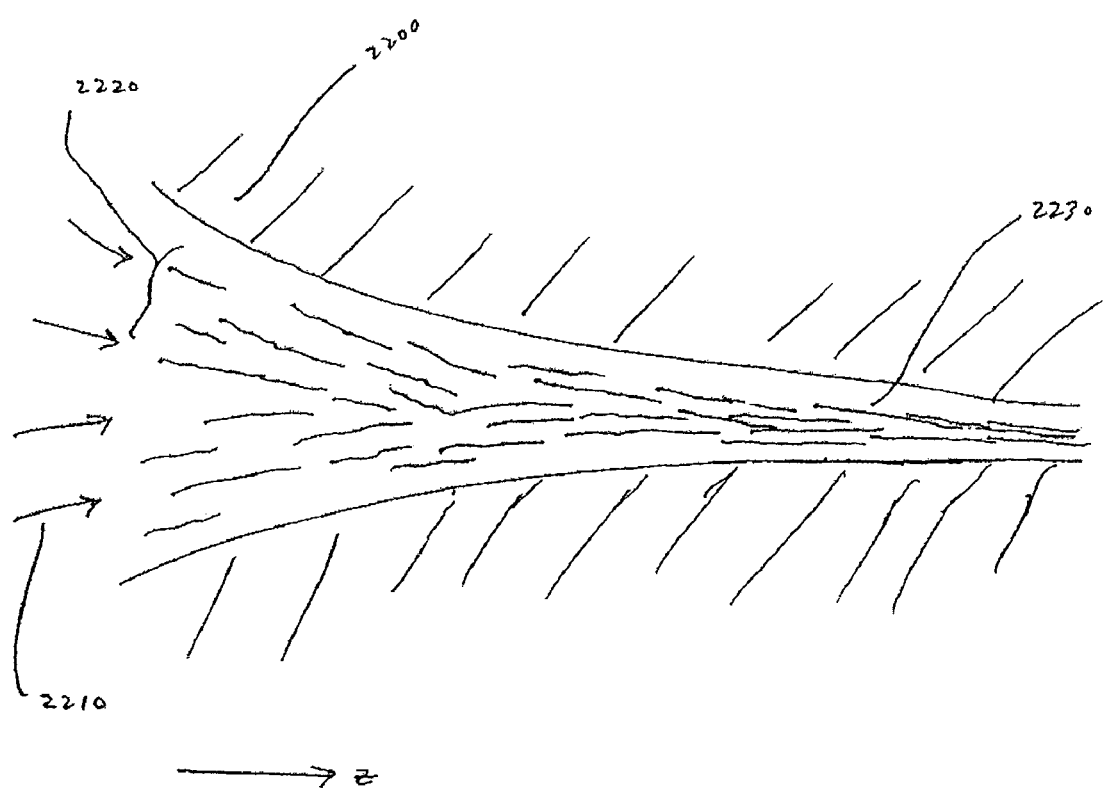
FIG. 28 shows how nanostructures growing from floating sites can be directed to a more confined configuration by a converging flow in a microchannel, according to another embodiment of the invention.

Similar to the use of focusing or converging flows and microchannel cross-sections to suspend and manipulate anchored nanostructures, nanostructures can be grown and assembled from floating sites in these environments. FIG. 28 shows an exemplary microchannel 2200 with a converging cross-section, where flow 2210 containing an input of nanostructures 2220 is focused. This focusing can cause alignment and narrowing of the configuration of the nanostructures within the flow. In particular, the flow can be focused so that adjacent nanostructures become substantially close enough to be attractively coupled to each other by surface interactions (e.g., van der Walls forces), while remaining substantially aligned with the flow.

Figure 27:
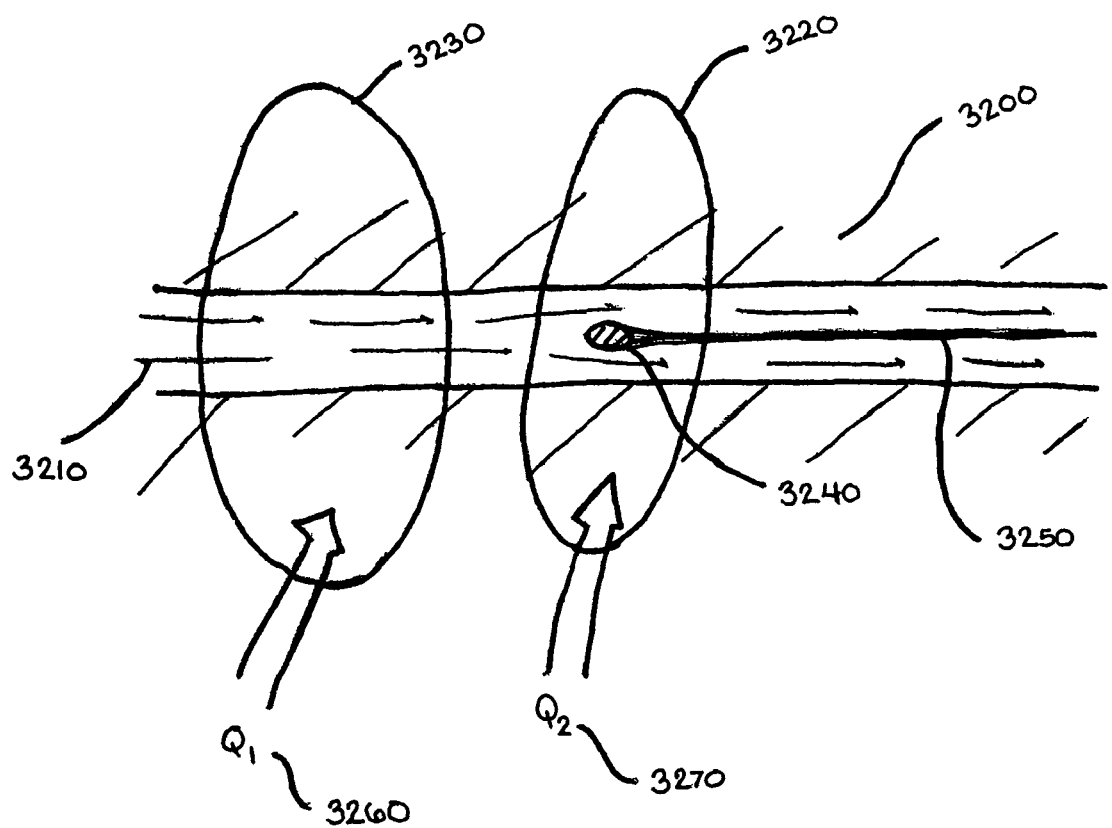
FIG. 27 is an exemplary diagram of how energy can be delivered to specific regions of a microchannel in which nanostructures are growing, to affect the growth reaction as desired, such as by using thin-film resistive heaters or focused laser beams, according to another embodiment of the invention.

FIG. 27 shows schematically how energy is delivered to regions of an exemplary microchannel within a micro-scale environment designed in accordance with the present invention. In an embodiment where CNTs are continuously grown and assembled from floating growth sites, floating growth sites may be introduced by evaporating precursors (such as solutions of ferrocene or iron pentacarbonyl), by introducing a vapor comprising catalyst nanoparticles, or by other suitable methods known to those of ordinary skill in the art. Energy may be used, for example, to activate and maintain activity of a growth site, and/or to maintain the growth site at a particular position within a microchannel, i.e., while fluid flows in direction 3210 in the microchannel.

In yet another embodiment, structures such as posts or islands within microchannels are used to anchor growth sites that are suspended in a stream of fluid. The nanostructures can be anchored to the posts by first supplying a stream of precursors to elongated nanostructures. A precursor to an elongated nanostructure can comprise a nanostructure that has just started growing from a catalyst, but does not yet have an elongated shape, and/or a nanostructure having an elongated shape, but which has not yet been grown to its final length. Examples of precursors to elongated nanostructures include growth sites (e.g., catalyst particles) or short nanostructures (i.e., short compared to the final length of the nanostructure) with attached growth sites.

Figure 29:
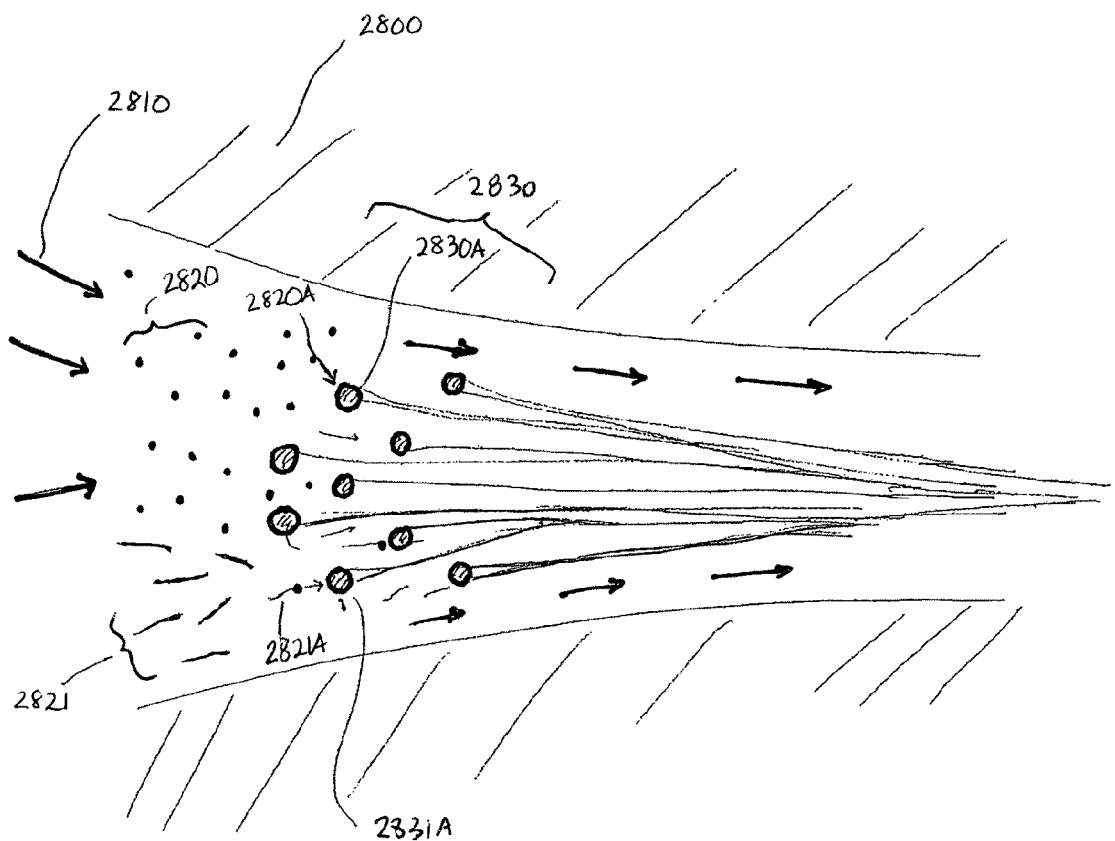
FIG. 29 shows how catalyst particles or short nanostructures can be delivered to islands in a microchannel, where the particles or nanostructures attach to the islands and are grown into long nanostructures, and aligned and combined by the downstream gas flow, according to another embodiment of the invention.

FIG. 29 shows an exemplary microchannel 2800 with input flow 2810. The input flow includes floating growth sites 2820 and/or floating growth sites containing relatively short nanostructures 2821. The growth sites can become attached to the posts 2830 by various methods. For example, in one embodiment, particle 2820A can be drawn to post 2830A, adhere to the post, and seed the growth of a nanostructure, which is drawn downstream in the channel. In another embodiment, a short nanostructure 2821A with its attached growth site can be carried to post 2831A, where it can adhere and be lengthened and/or drawn downstream These embodiments may be operated, for example, in a steady-state fashion where a continuous supply of growth species, including growth sites, is supplied to the posts, while nanostructures grow into substantially long and aligned configurations from the posts. In some cases, the nanostructures can detach from the posts when the nanostructures reach a certain length. Alternatively, the supply of precursors to elongated nanostructures may be introduced in a first step to "load" the posts with growth sites, and in a second step the nanostructures may be grown and assembled from these growth sites by appropriately changing the composition of the input flow and/or any other flows in the device to meet the required conditions.

The adhesion between the nanostructures and the posts may be broken by introducing a sufficient force on the nanostructures, and this operation sequence may be repeated in a "catch, grow, and release" fashion. These methods can be combined with certain embodiments to direct the growth and/or assembly of elongated nanostructures.

FIG. 26B shows an exemplary temperature profile 2140 (T(x)). In another embodiment, the temperature along the exemplary microchannel is controlled. Temperature may be controlled, for example, to preheat the growth sites and carrier species in the first region, induce nucleation of the nanostructures from the floating growth sites in the second region, and/or maintain growth without additional nucleation in the third region. This temperature profile may be achieved using a variety of heating methods, including resistive heating of the microchannels using thin-film elements, coupling of the micro-scale environment to a heated substrate, coupling of the micro-scale environment to an electric and/or magnetic field, or using lasers.

The micro-scale environments designed in accordance with the present invention may be operated in simultaneous or exclusive modes, including but not limited to preparing the device for growth and/or assembly of nanostructures, initiating the growth and/or assembly of nanostructures, continuing the growth and/or assembly of nanostructures, purifying the nanostructures, introducing additional reactive or non-reactive species for other additional processing of the nanostructures, releasing the nanostructures from the device, and/or cleaning the device to remove undesirable growth products. The supplies of reactive and/or non-reactive species, and the temperature and pressure inside the environment, can be suitably controlled to initiate and/or terminate these modes.

In addition to inducing forces on nanostructures using fluid flows in microchannels, forces can be induced on conducting and polarizable nanostructures, for example, by using electric and/or electromagnetic fields. For instance, these forces can be induced by patterning electrodes in the microchannel environments. In some embodiments, these forces can be used to assist the growth and/or assembly of nanostructures, i.e., in microchannel environments.

Figure 30:
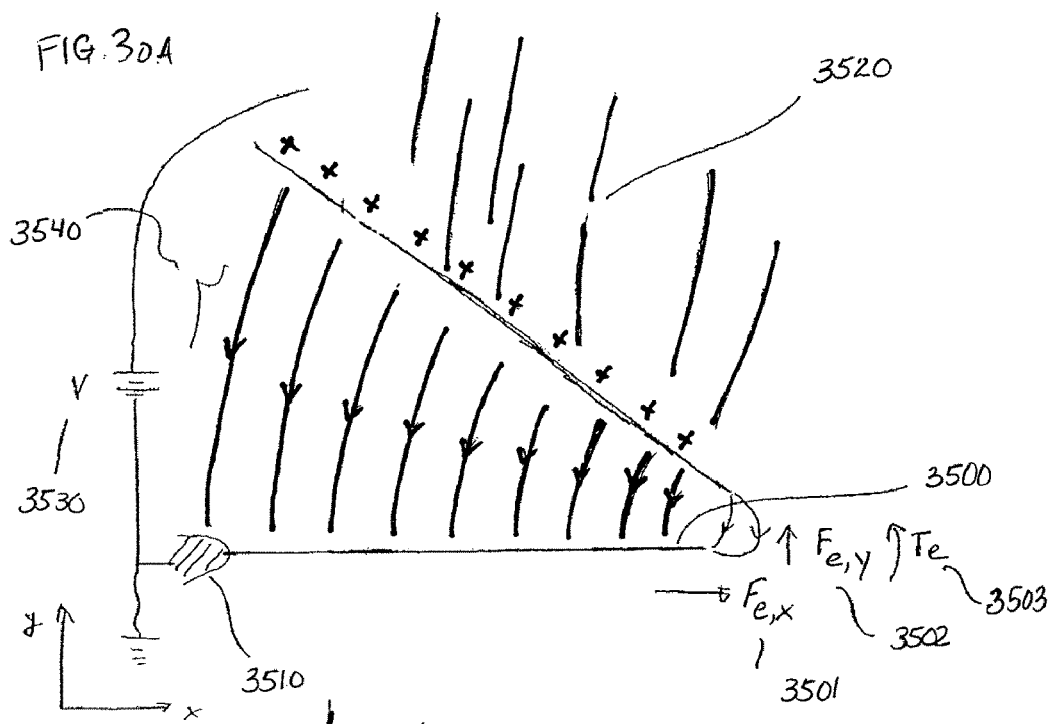
FIGS. 30A and 30B show diagrams of how an electric field can induce a force and a torque on a conducting nanostructure, according to another embodiment of the invention.
Figure 30:
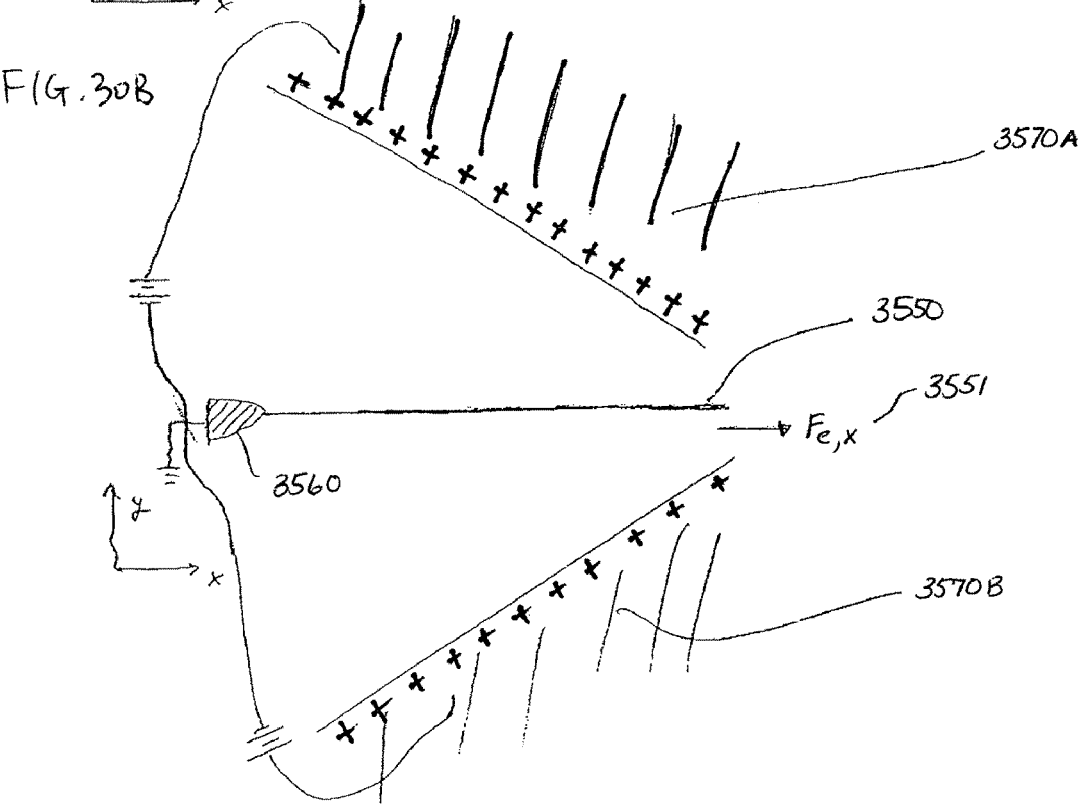

Accordingly, FIG. 30 shows how an electric field can induce forces on a conducting elongated nanostructure. As illustrated in this figure, conducting nanostructure 3500 is attached to electrically grounded anchor 3510, and voltage 3530 (V) is applied between the nanostructure and conducting electrode 3520. The electric field, with field lines sketched approximately as 3540, induces an axial force 3501 ($F_{e,x}$), a transverse force 3502 ($F_{e,y}$), and a torque 3503 (T) on the nanostructure. In an alternative configuration, in which grounded nanostructure 3550 is placed between symmetric angled electrodes 3570A and 3570B, only an axial force 3551 ($F_{e,x}$) is exerted on the nanostructure. The electric field may be direct-current (DC) or alternating-current (AC), and use of an AC field can prevent accumulation of charge on the electrodes in applications where the forces applied to the nanostructures are controlled with high frequency.

Figure 31:
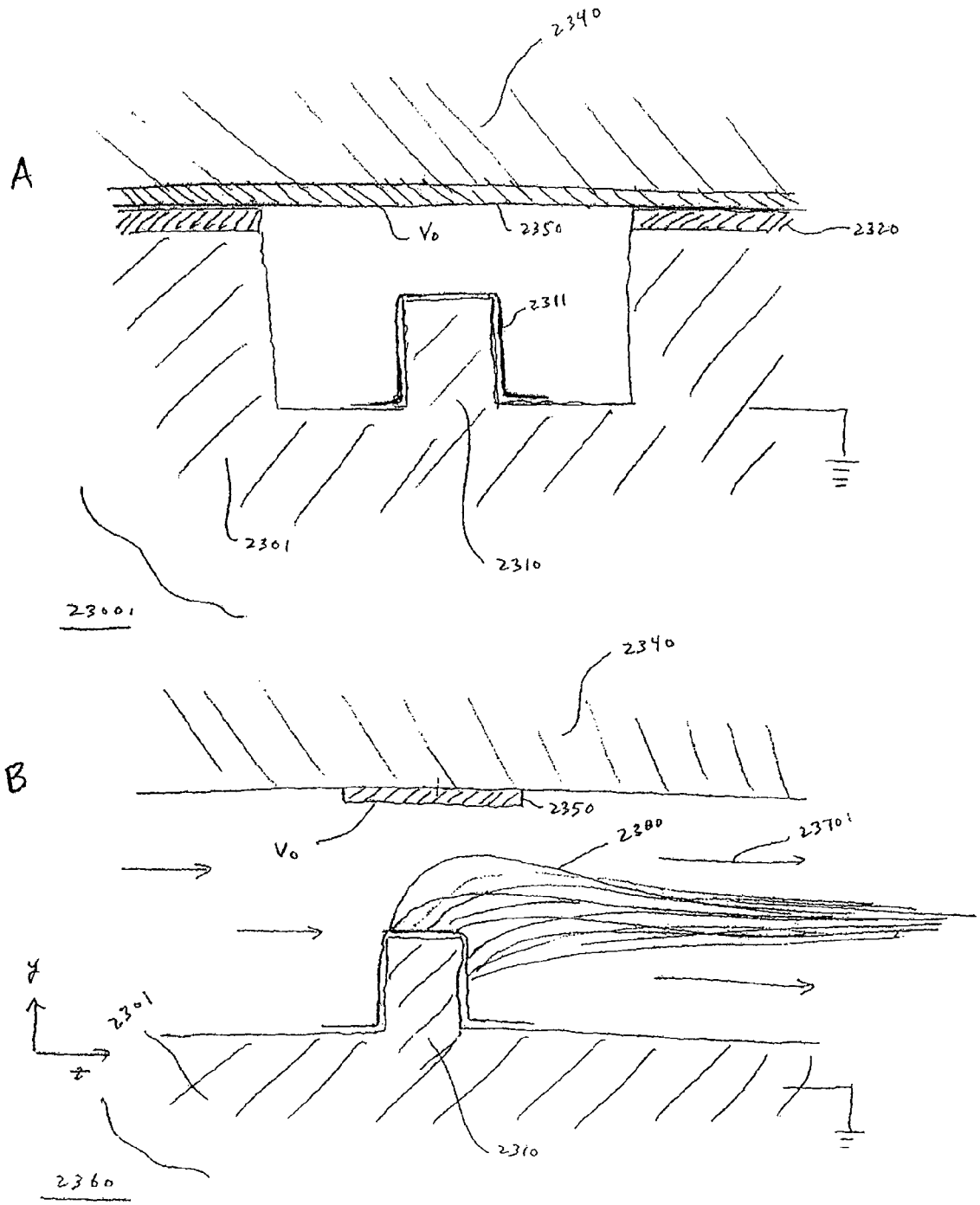
FIGS. 31A and 31B show how a vertical electric field applied to island in a microchannel can affect the initial growth direction of nanostructures from the island, while the flow in the channel can direct the growth of the nanostructures along the channel, beyond the neighborhood of the electric field, according to another embodiment of the invention.
Figure 32:
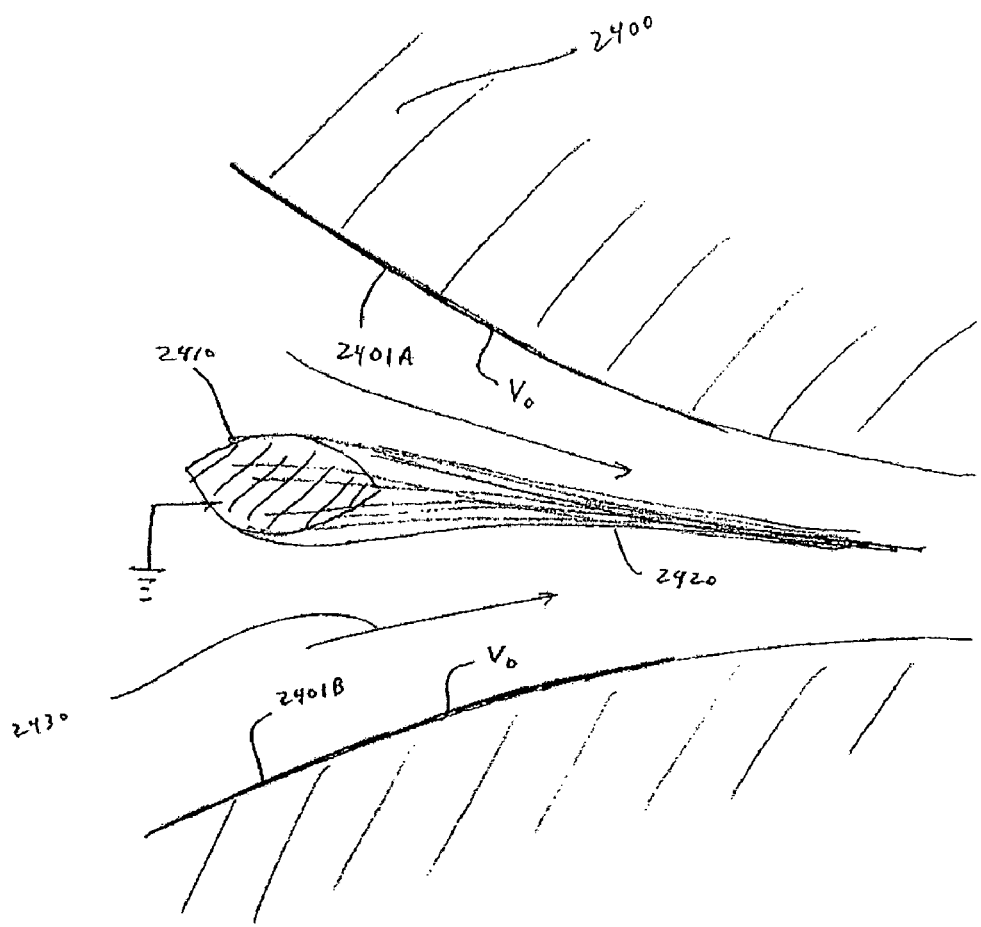
FIG. 32 shows how an electric field can be applied to an island in a microchannel from electrodes on the sidewalls of the microchannel, according to another embodiment of the invention.

FIGS. 31A and 31B show a cross-sectional and side view, respectively, of an embodiment that can be used to apply an electric field to an island that anchors the growth of nanostructures in a microchannel. For instance, microchannel device assembly 2300 comprises a microchannel in a substrate 2301, with island 2310 coated with an area of catalyst material 2311. The substrate can be grounded and electrically isolated from the capping layer 2340, e.g., by insulating layer 2320. The capping layer may be fabricated with electrode 2350. As shown in FIG. 31B, the electric potential between the electrode and the island can influence nanostructures 2380 to initially grow away from the surface of the island, and the nanostructures can be carried, aligned, and focused downstream by gas flow 2370. In another embodiment, shown in FIG. 32, the electric field is applied to island 2410 in microchannel 2400, using electrodes 2401A and 2401B on the sidewalls of the microchannel gas flow 2430 directs the structures downstream.

Figure 33:
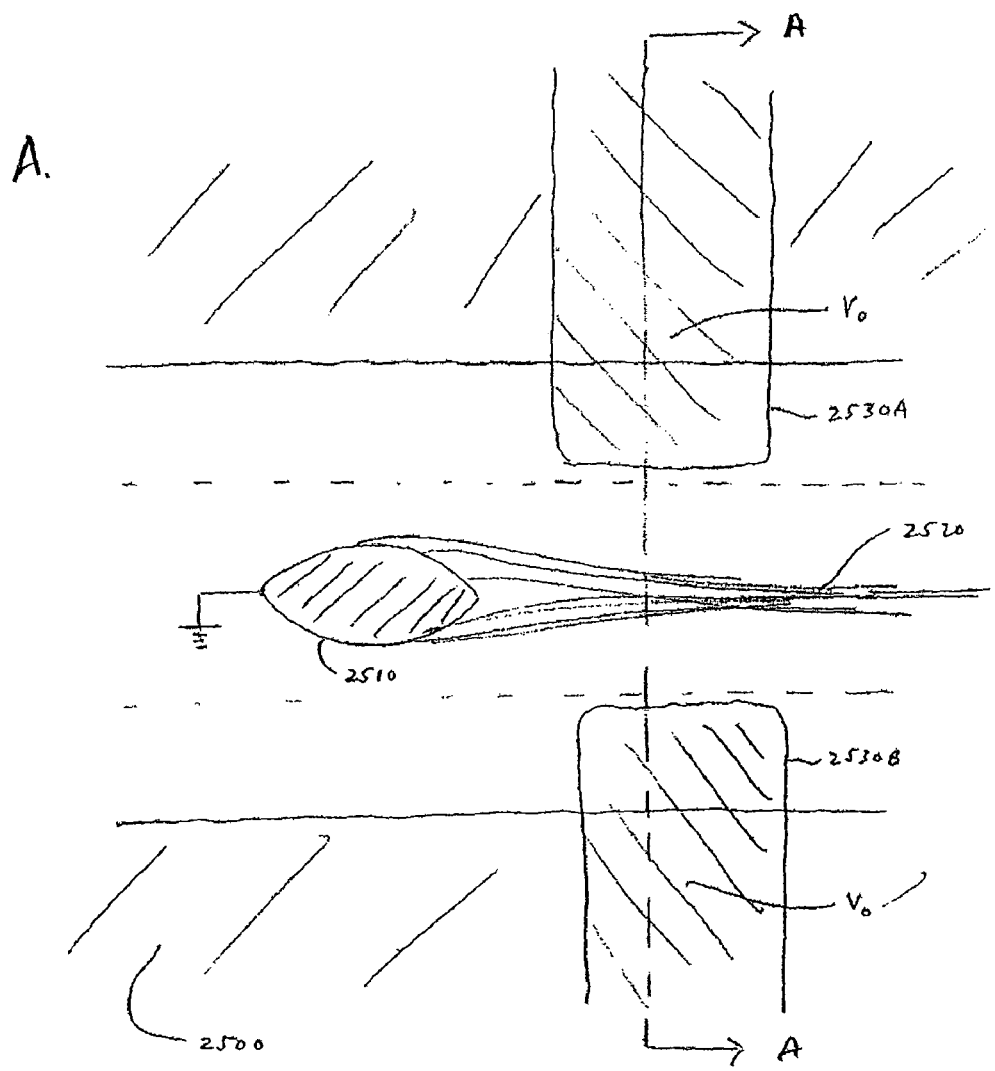
FIGS. 33A and 33B show how electrodes can be patterned on the sloped sidewalls of a microchannel, according to another embodiment of the invention.
Figure 33:
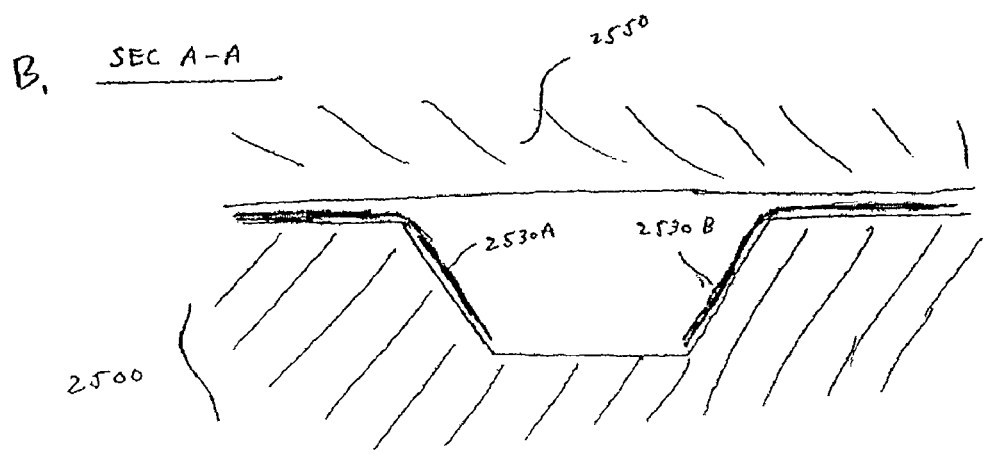

An example of another configuration is shown in FIGS. 33A (top view) and 33B (cross-sectional view), where electrodes 2530A and 2530B are placed on sloped sidewalls of microchannel 2500 to direct the growth of nanostructures 2520 from island 2510. Because it can be substantially less difficult to pattern electrodes on sloped sidewalls than on vertical sidewalls of microstructures using conventional microfabrication and metallization technologies, the sloped sidewall electrode configuration is sometimes preferred.

Electrodes 2530A and 2530B can be electrically isolated from the substrate, which may be capped by layer 2550.

Figure 34:
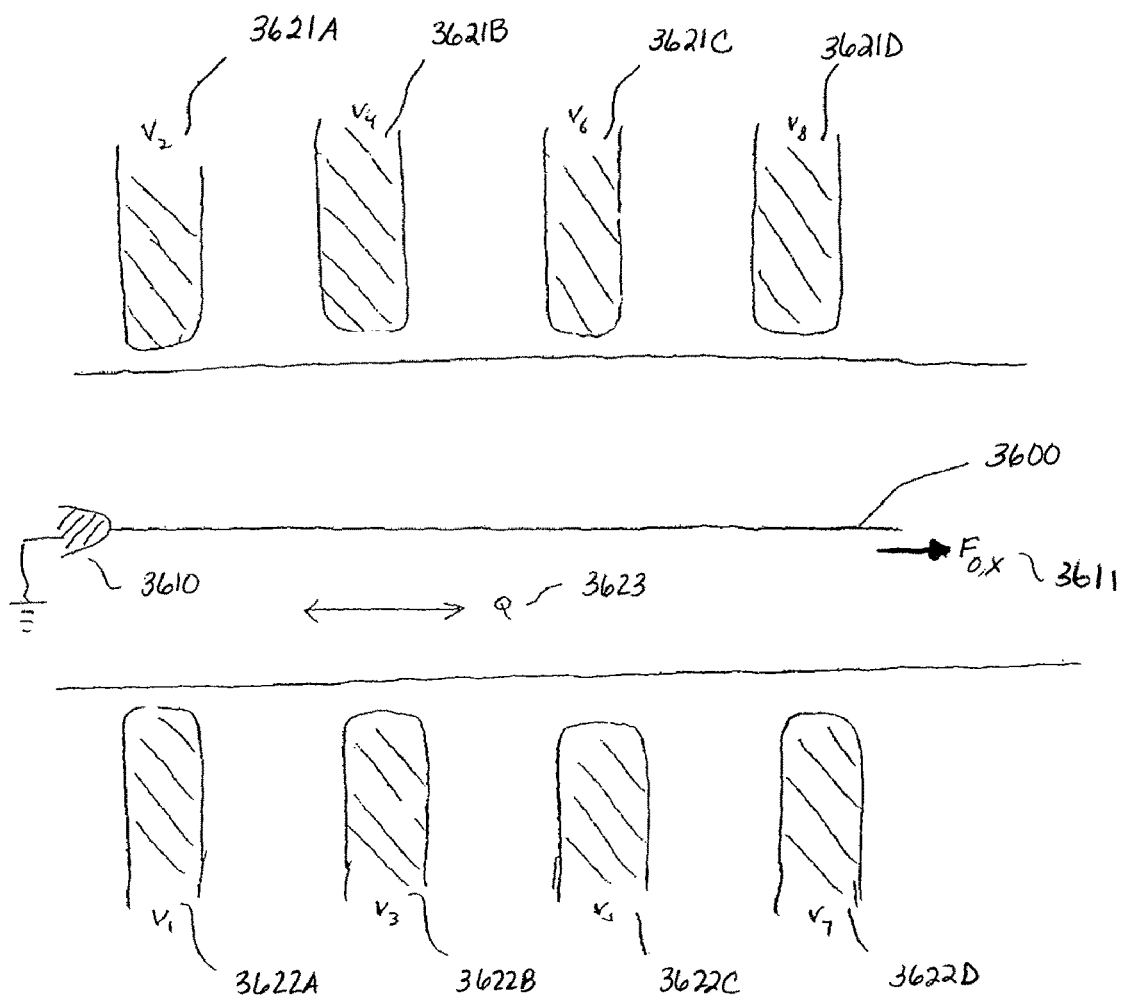
FIG. 34 shows how a series of electrodes along a microchannel can direct the long-range growth of a nanostructure, according to another embodiment of the invention.

Furthermore, FIG. 34 shows how electrodes can be patterned along a microchannel to direct the long-range growth of nanostructures (e.g., elongated nanostructures). For instance, electrodes 3621A-D and 3622A-D can be disposed symmetrically on both sides of the microchannel and may be established at identical or differing potentials to direct the growth of the nanostructure as desired. The total electric field induced on nanostructure 3600, which can be anchored to grounded island 3610, can generate an axial force 3611 on the nanostructure. This axial force can be augmented by gas flow 3623. It is appreciated that the forces induced by the electric field and the fluid flow may act in the same direction on the nanostructures, or in different directions (e.g., in opposite directions), to provide a desired net force to assist the growth and/or assembly of nanostructures as desired. In addition, electric field patterns such as those dictated by the embodiments may also be used to establish forces on nanostructures suspended from floating growth sites, e.g., to focus the flow and/or assembly of nanostructures.

In some cases, it is advantageous to design methods for growth and/or assembly of nanostructures to achieve independent control of the chemical interactions and mechanical interactions with the nanostructures. Because the gas flows may interact chemically with the nanostructures and growth sites, it may be advantageous to use forces induced by multiple means, such as both electric fields and fluid fields, both electric and electromagnetic fields, both electromagnetic and fluid fields, or different types of forces in the microchannel environments, especially in the regions of the growth sites.

Also, it is appreciated that the fluid forces scale roughly with the surface areas of the nanostructures that are exposed to the fluid flows. Therefore, for a given flow distribution and intensity around a nanostructure, the fluid-induced force grows as the nanostructure becomes longer, and the force per volume of nanostructure scales inversely with the diameter of the nanostructure (assuming a cylindrical nanostructure). On the other hand, electrostatic forces scale with the volume of the nanostructure.

In some embodiments of the invention, it is desirable to provide a specific force on each nanostructure and growth site at each instance and location of the growth and/or assembly processes. Hence, for the case of inducing both electric and fluid fields, it may be advantageous to independently control the forces induced by both local fluid fields and local electric fields to improve the dynamic range and resolution of control over the growth process.

It is sometimes desirable to constrain the magnitudes of the forces to prevent damage to the nanostructures, i.e., detachment of the nanostructures from anchored growth sites. For example, using a relatively high velocity gas flow to "pull" the nanostructures from islands may provide sufficient control while the nanostructures are relatively short, but as the nanostructures grow longer, the axial force induced on the nanostructures may increase enough to detach the nanostructures from the growth sites. Furthermore, while relatively strong flows are needed to direct the position and orientation of large bundles of nanostructures, much lesser flows are needed to support the nanostructures against their self-weight. Hence, in one embodiment combining both electric and fluid field forces, electric fields are used in the vicinity of the growth sites to provide constant forces on the growth sites, and to establish the initial growth direction and orientation of the nanostructures. Meanwhile, downstream of the growth site, forces induced by fluid flows can support the nanostructures and direct the sequential assembly of groups of nanostructures into larger configurations (e.g., bundles, strands, and/or fibers).

The electric fields can be controlled with very high frequency, and can be enhanced by several orders of magnitude at growth sites on sharp structures such as pyramidal silicon islands fabricated by KOH etching. Transient control of forces, e.g., those induced by fluid and electric fields, can be implemented to initiate growth of nanostructures, to continue growth, and/or to provide assembly of nanostructures into desired configurations and orientations.

Figure 35:
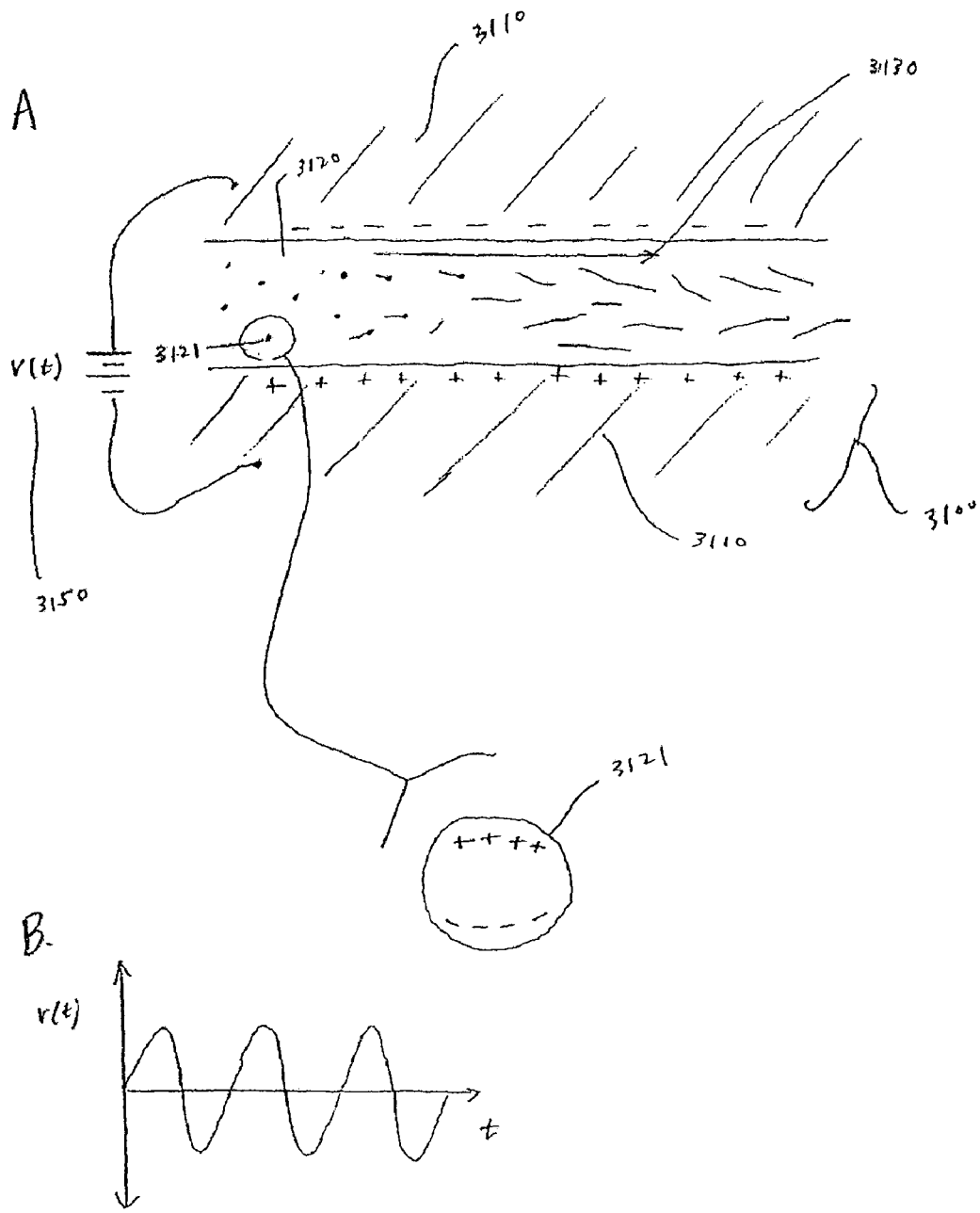
FIGS. 35A and 35B show how an alternating electric or magnetic field can be applied to growth sites and nanostructures in a microchannel, inducing charges in the nanostructures which cause volumetric heating and which prevent the nanostructures from agglomerating in undesired regions of the microchannel, according to another embodiment of the invention.

In some cases, alternating electric and/or magnetic fields may be used to supply energy to floating growth sites within the microchannel environments, e.g., to heat particles by Joule or dielectric heating. FIG. 35 shows microchannel 3100 with alternating field 3150 applied between across the channel. Particle 3121 is heated by the applied field, and can be used as a floating growth site for a nanostructure. Particle 3121 may be carried downstream by gas flow 3130.

In some embodiments, the micro-scale environments are constructed and arranged to conduct large numbers of simultaneous experiments for the growth and/or assembly of nanomaterials. In some cases, large numbers of simultaneous experiments can be performed by specifically varying a single operating parameter or other condition, or a set of operating parameters or conditions. This can be done, for example, by suitable design variations of the integrated control elements (e.g., fluidic resistors), or by suitable adjustments of externally-established parameters (e.g., temperature and/or operating pressure). These control elements and parameters may determine the growth and/or assembly conditions inside the micro-scale environments.

A suitable example is an array of a plurality (e.g., 60) of microchannels (i.e., oriented parallel to one another) that can be used to introduce a wide range of velocities and/or gas compositions for the growth of aligned CNTs from $Al_2O_3$-supported Fe or Fe/Mo catalysts, which are deposited on islands within the microchannels. For instance, because the fluidic resistance of a channel varies approximately with the inverse fourth power of the characteristic dimension of its cross-section, a variable-depth array can be used to dramatically vary the growth conditions across a single device. Flow in the first channel of the device may have, for instance, an average velocity of 0.005 m/s, and the velocity of flow in each neighboring channel can be incremented by a constant geometric factor to reach a maximum value (e.g., 1 m/s) in the last channel. In one embodiment, an experiment using such a device can deliver the same composition of reactive and/or non-reactive gases to each channel, such as a $C_2H_4/H_2/Ar$ or a $CH_4/H_2/Ar$ mixture. In another embodiment, an experiment may be conducted to vary the gas composition so that the partial flow of a single component (e.g., methane) is substantially equal among all the channels. The variation in the length, structure, and/or alignment of the nanostructures can be correlated to the well-controlled parametric variation in growth conditions across the device, making the microchannel environment distinctly advantageous for high throughput experiments in nanomaterials discovery and process optimization.

Figure 36:
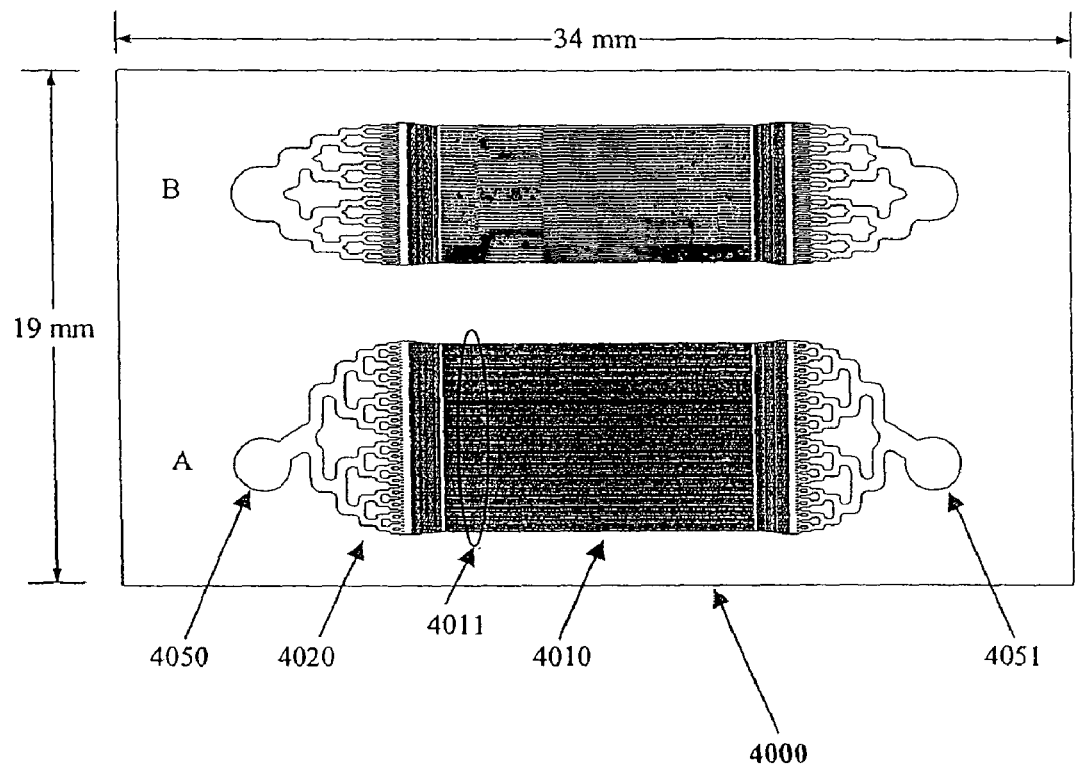
FIGS. 36A and 36B show diagrams of exemplary microchannel devices used to grow nanostructures, comprising an array of parallel microchannels with islands as anchors for the growth of nanostructures, according to another embodiment of the invention.
FIG. 36C shows a wide view drawing of KOH-etched array, according to another embodiment of the invention.
FIG. 36D is a diagram showing a two-stage channel design, according to another embodiment of the invention.
Figure 36C:
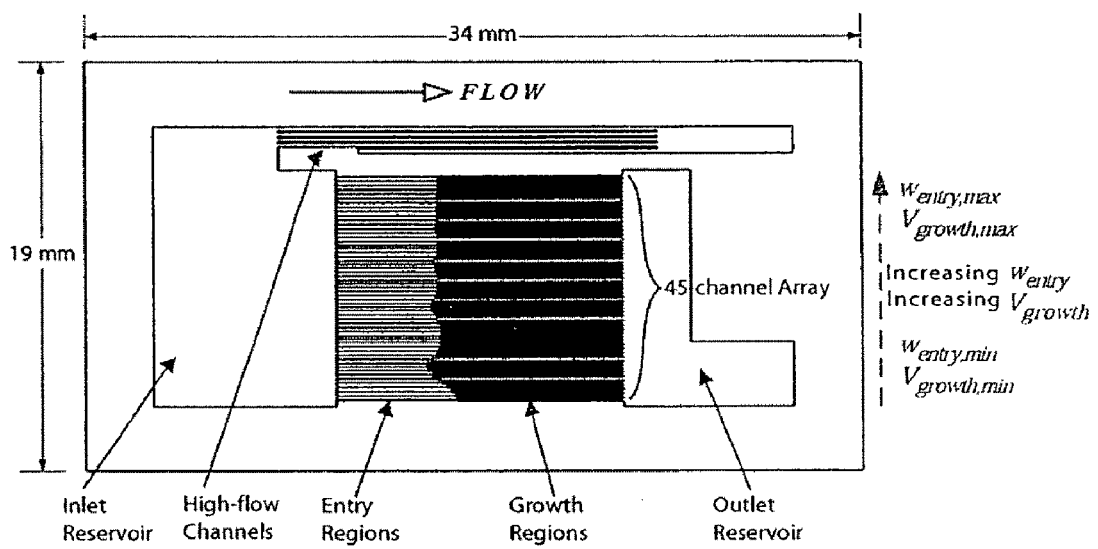
Figure 36D:
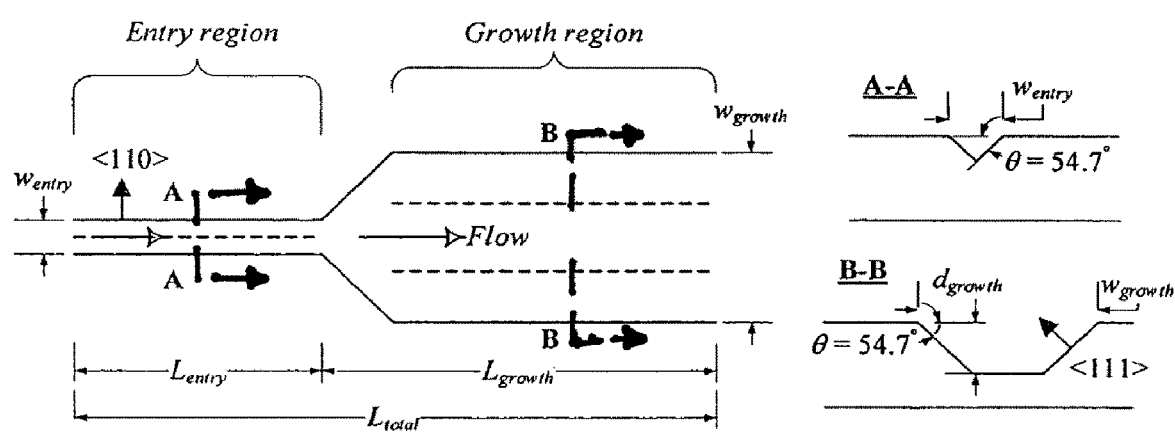

FIGS. 36A-C show examples of simple microchannel arrays designed in accordance with the present invention. Flow can enter device 4000 through input area 4050, which can be divided into an array of 64 parallel microchannels 4010 by input distributor 4020. Each microchannel can contain an island coated with growth sites for anchoring the growth of elongated nanostructures, in area 4011. Flow can continue through the channels and exit through the output concentrator into output area 4051. In some embodiments, one or more channels can have a two-stage design, as shown in FIG. 36D.

In addition to the integration of elements such as microfluidic resistors and electrical resistive heaters to establish the growth conditions within the micro-scale environments, the devices can be coupled to external elements such as mass flow controllers or rotameters, pressure regulators, temperature-controlled substrates, furnaces, vacuum pumps, thermocouples, and metrology equipment (e.g., Raman spectroscopy or mass spectrometry). These external elements can be used to control operating parameters of the environments and to provide active feedback to the growth and/or assembly processes by monitoring the quality of the nanostructures produced.

Figure 37:
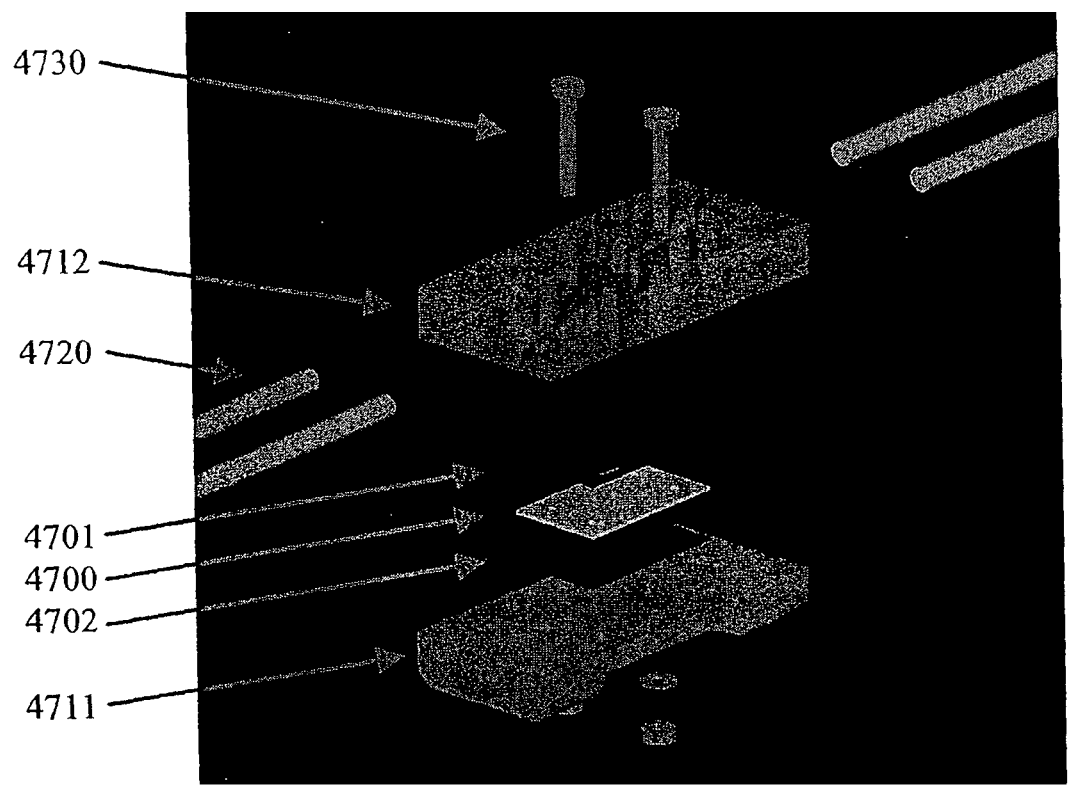
FIG. 37 shows an exemplary assembly used to package a microchannel device used to grow nanostructures, inside a conventional tube furnace, according to another embodiment of the invention.
Figure 38:
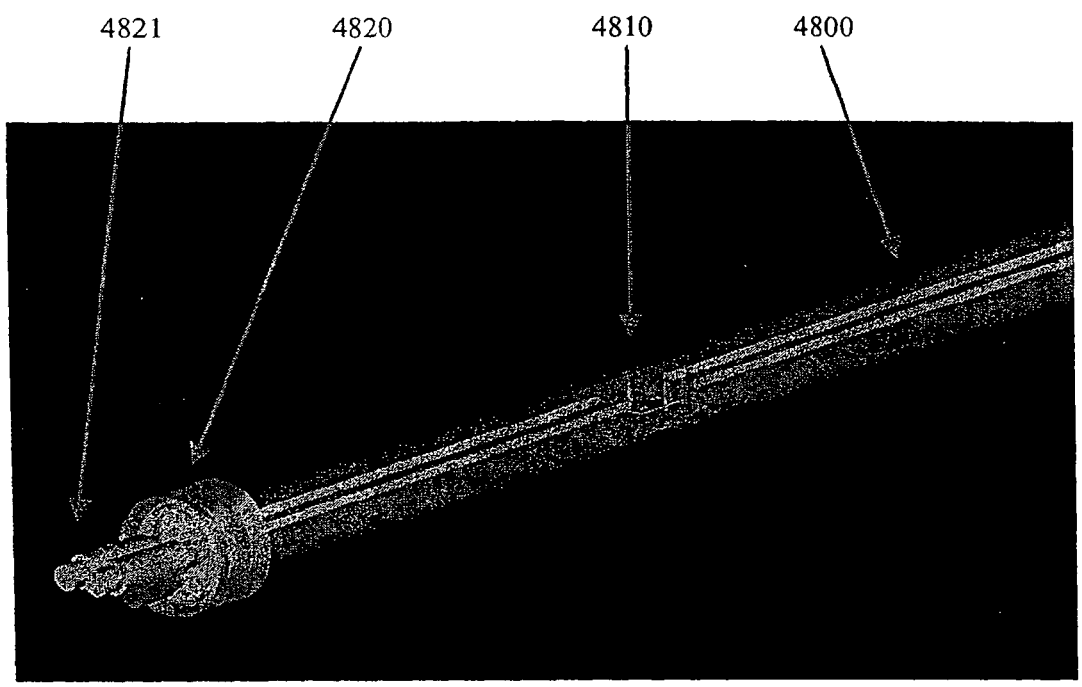
FIG. 38 shows an exemplary configuration for mounting the package of FIG. 37 inside a cylindrical furnace tube, according to another embodiment of the invention.

FIG. 37 shows an exploded view of an exemplary fixture for delivering gases to a microchannel device. Device 4700 (e.g., of FIG. 36) can be packaged in a fixture (e.g., quartz or ceramic) comprising top connection block 4712 and bottom support block 4711. The device can be clamped between capping die 4701 and high-temperature gasket 4702 (e.g., a graphite sheet), and the package can be assembled by tightening ceramic bolts 4730. Gases may be carried to and from the device through pipes 4720. FIG. 37 shows how this package can be contained in a conventional furnace tube, where package 4810 rests in furnace 4800, and gas connections to the delivery pipes are made through a specially designed tube cap 4820, with fittings 4821. This setup can be used for conducting experiments with a micro-scale growth environment within a conventional growth system such as a tube furnace, where the conventional method of temperature control by heating the furnace tube and its contents can be used to maintain the temperature in the micro-scale environment. Different apparatus for delivering gases to a microchannel device are also possible.

Figure 39:
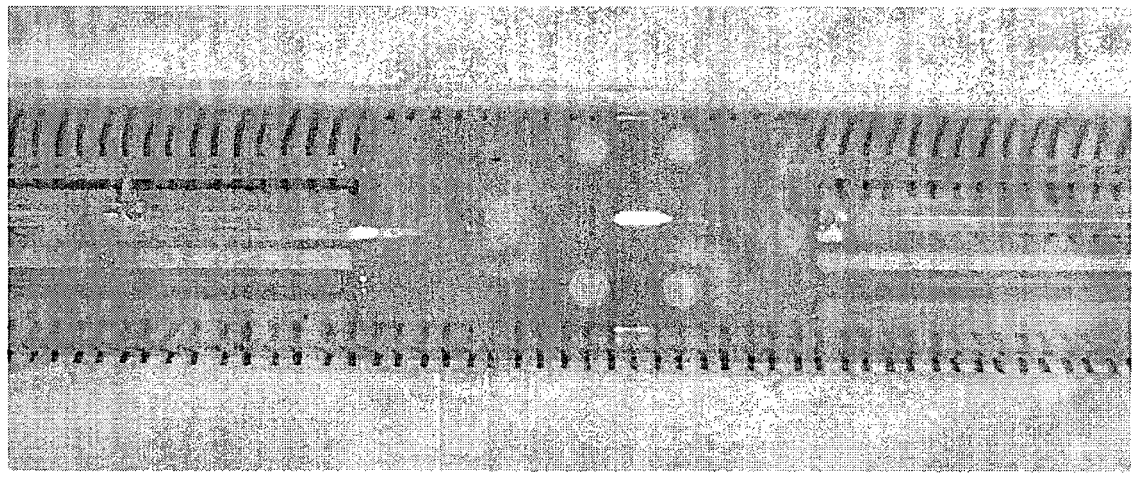
FIGS. 39A and 39B illustrate an example of packaging of a microchannel device inside a conventional quartz tube furnace, according to another embodiment of the invention.
FIG. 39C illustrates a method for placing a microchannel device on a substrate heater, which is used to establish the temperature inside the microchannel device, according to another embodiment of the invention.
Figure 39:
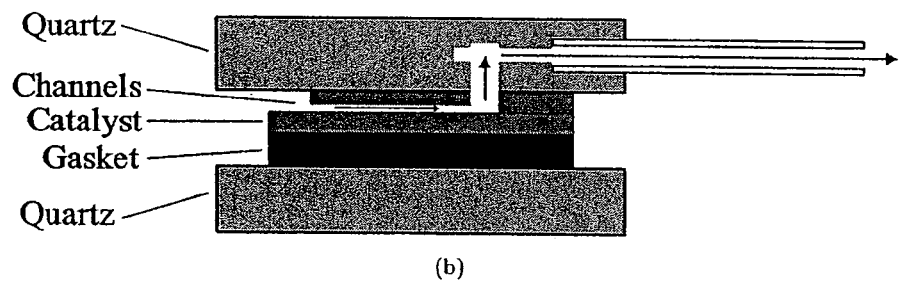

FIG. 39 shows an alternative embodiment for packaging a micro-scale environment designed in accordance with the present invention. In this particular embodiment, device 3320 is placed on a substrate 3300, where control of the temperature of layer 3310 of the substrate controls the temperature of the micro-scale environment. The device can be sealed by capping layer 3330 and connect block 3340, with application of preload 3343. An exemplary flow path through the system is also shown, where flow 3341 enters the connect block, travels path 3321 through an entry reservoir in the capping layer, travels through the environment showing exemplary island 3322 and nanostructure 3323, and exits on path 3324 through the output of the capping layer and path 3342 through the output of the connect block. Additional fluid connections to the connect block are not shown. In comparison to a tube furnace, packaging the system on a substrate heater improves the transient thermal control of the micro-scale environment, and enables rapid heating and cooling of the environment by bringing the environment in and out of contact with the substrate.

Furthermore, while the aforementioned embodiments involve micro-scale environments for self-contained growth and/or assembly of nanostructures, the devices may also be coupled to larger growth systems (e.g., furnace chambers). For instance, in one embodiment, an elongated nanostructure and/or a precursor to an elongated nanostructure can be grown in a chamber in fluid communication (i.e., fluidically connected to) a microfluidic channel, and the nanostructure can be flowed into the microfluidic channel. The larger growth systems (e.g., chambers) can be used to provide, for instance, pre-made growth sites and/or nanostructures including precursors to elongated nanostructures such as growth sites and short nanostructures with attached growth sites.

Figure 40:
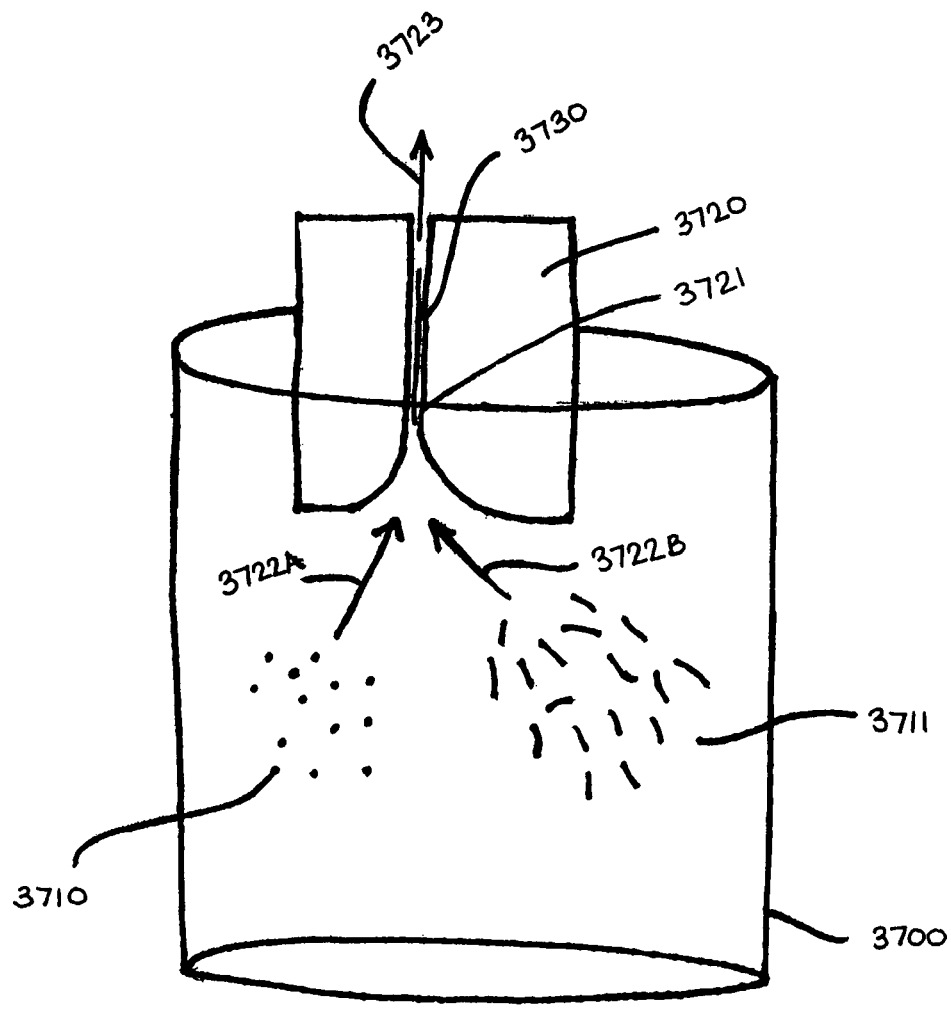
FIG. 40 shows how a channel collector including microchannels can be used to collect nanoparticles or individual shorter nanostructures from a larger growth chamber, and the channel collector can be used to direct the additional growth and/or assembly of the nanostructures, according to another embodiment of the invention.

When these nanostructures are flowed into a microchannel, additional growth and/or assembly operations may be conducted within the microchannel environments. FIG. 40 shows microchannel device 3720 coupled to a macro-scale growth environment 3700 containing nanostructures 3711 or growth sites 3710. A growth site can be a particle or a plurality of particles floating on a support, such as some metal nanoparticles on a small piece of oxide support. In one embodiment, the growth sites can be drawn into the micro-scale environment along flow path 3722A, grow into elongated nanostructures, and may additionally form an assembly of structures, while positioned in device 3720. In another embodiment, nanostructures 3711 can be drawn into the device along path 3722B. Nanostructures 3711 can continue to grow in channel 3721 and/or can form an aligned configuration of elongated nanostructures 3730 in channel 3721. Structures can exit the device along flow path 3723. Nanostructures and/or precursors to nanostructures can be grown and assembled in the micro-scale environment in combination with any of the embodiments mentioned herein, or with any suitable additional embodiments known to those of ordinary skill in the art.

Figure 41:
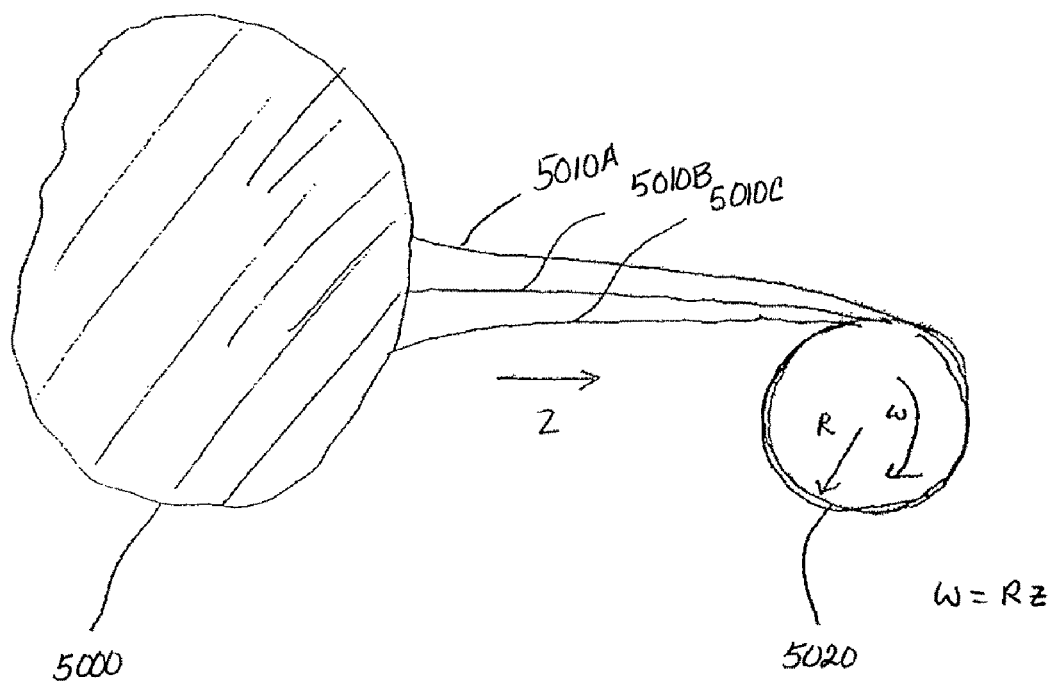
FIG. 41 is an exemplary diagram of an output collector used to gather long nanostructures produced by a growth system, according to another embodiment of the invention.

Furthermore, while some figures suggest orienting the growth environments and, specifically, the primary axes of the microchannels in the horizontal plane, the devices may be oriented in any direction with respect to gravity, including vertically, where flows through the devices would be upward or downward. Certain orientations may be desirable in some cases, for instance, for combining gravitational effects with one or more forces applied to the system.

Where it is an objective to continuously produce nanostructures from the micro-scale environments of the present invention, an environment may be coupled to an external mechanism such as a spindle to collect the nanostructures from the output of the environment. Microfluidic devices can be coupled to both micro-scale and/or macro-scale devices for collecting and/or processing nanostructures. In one embodiment, as shown in FIG. 41, growth environment 5000 is coupled to rotating element 5020, which collects exemplary nanostructure fibers 5010A-C, such as threads of aligned bundles of CNTs, and winds the threads onto a spool. In another embodiment, a microfluidic device is connected to a microfabricated spinneret for spinning and/or collecting long nanostructures.

Figure 42:
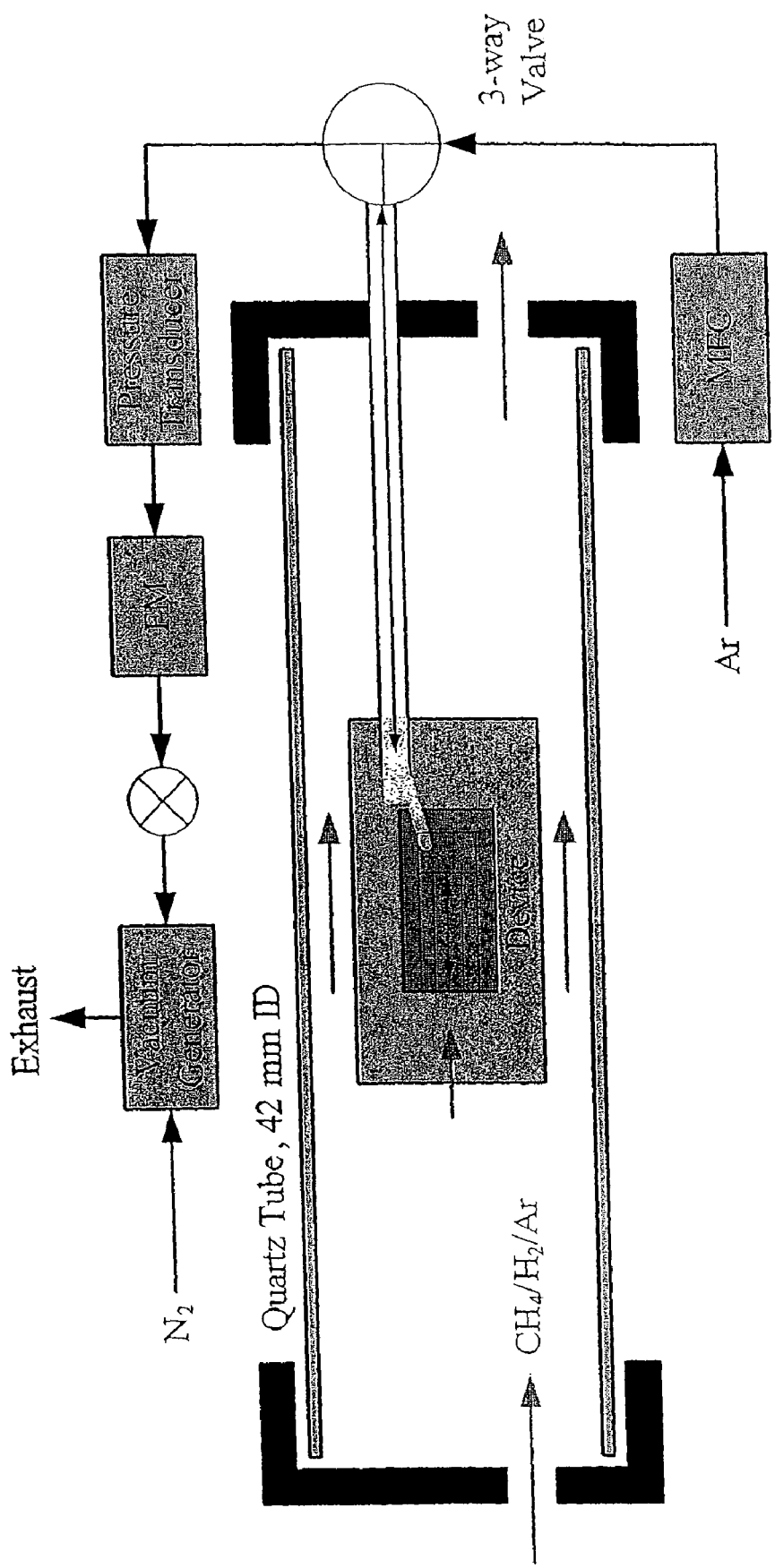
FIG. 42 is a diagram showing a flow reversal configuration for operating a microchannel device within a conventional tube furnace, according to another embodiment of the invention.

In another embodiment, a device (e.g., a microfluidic device) can be operated in a flow reversal configuration, as shown in FIG. 42. FIG. 42 shows a representative setup for packaging a microchannel array for conducting nanomaterials growth experiments within a conventional tube furnace. The reactant gases can be preheated in the furnace tube, and then drawn into the microchannel array when a vacuum source applies a pressure drop across the array, so that the pressure at the outlet of the array is less than the pressure inside the tube furnace. Alternatively, gases can flow through the microchannels and into the tube furnace by applying a greater pressure at the output of the channels, to enable rapid exchange of the gases within the microchannel array. Flows of various gases (e.g., $C_2H_4$, $CH_4$, $H_2$, Ar, $N_2$) into the microfluidic device can be controlled by valves and other mechanisms in this system.

Nanostructures of different types (e.g., single- or multi-walled carbon nanotubes and nanowires, etc.), sizes (e.g., lengths, cross-sectional dimensions), shapes, and configurations can be grown using embodiments described herein. Nanostructures can also be assembled into different forms such as bundles, strands, and fibers. For instance, elongated nanostructures and/or assemblies of nanostructures may be grown to a length of greater than 1 mm, greater than 5 mm, greater than 1 cm, greater than 5 cm, greater than 10 cm, greater than 50 cm, greater than 1 m, or longer. In one embodiment, a strand includes a plurality of nanostructures having a length of at least 1 mm, wherein the strand has a cross-sectional dimension of at least 1 micron and a length of at least 1 cm. In another embodiment, a strand includes a first end and a second end defining a length and comprises a plurality of elongated nanostructures, wherein at least one of the elongated nanostructures extend from the first end to the second end, the length being at least 1 cm. In some cases, a plurality of elongated nanostructures, e.g., more than 10%, more than 20%, more than 50%, more than 70%, or substantially all, of the nanostructures making up the strand, may extend from the first end to the second end, the plurality of nanostructures having a length of at least 1 cm.

While some embodiments are directly achieved by fabricating networks and arrays of microchannels using conventional microfabrication techniques, the present invention embraces the use of any suitable channel or tubular geometry (e.g., a capillary) for directing the growth and/or assembly of nanostructures. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid.

Most fluid channels in components of the invention have maximum cross-sectional dimensions less than 2 mm, and in some cases, less than 1 mm. In one set of embodiments, all fluid channels containing embodiments of the invention are microfluidic (i.e., have a cross-sectional dimension of less than about 500 microns). In another embodiment, the fluid channels may be formed in part by a single component (e.g., an etched substrate or molded unit). Of course, larger channels, tubes, pipes, chambers, reservoirs, etc. can be used to store fluids in bulk and to deliver fluids to components of the invention. In one set of embodiments, the maximum cross-sectional dimension of the channel(s) containing embodiments of the invention are less than 500 microns, less than 200 microns, less than 100 microns, less than 50 microns, or less than 25 microns. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, positioned to intersect with each other, etc.

In some cases, microchannel devices introduce a prescribed range of flow conditions within the microchannels by prescribed variation of both the depth and length of each microchannel. For instance, a microchannel may have a two-section design, where the first section is a dominant fluidic resistor with resistance dictated by a choice of its cross-sectional dimensions and length, and the adjoining second section has the same cross-sectional dimensions for all channels in the device.

Figure 43:
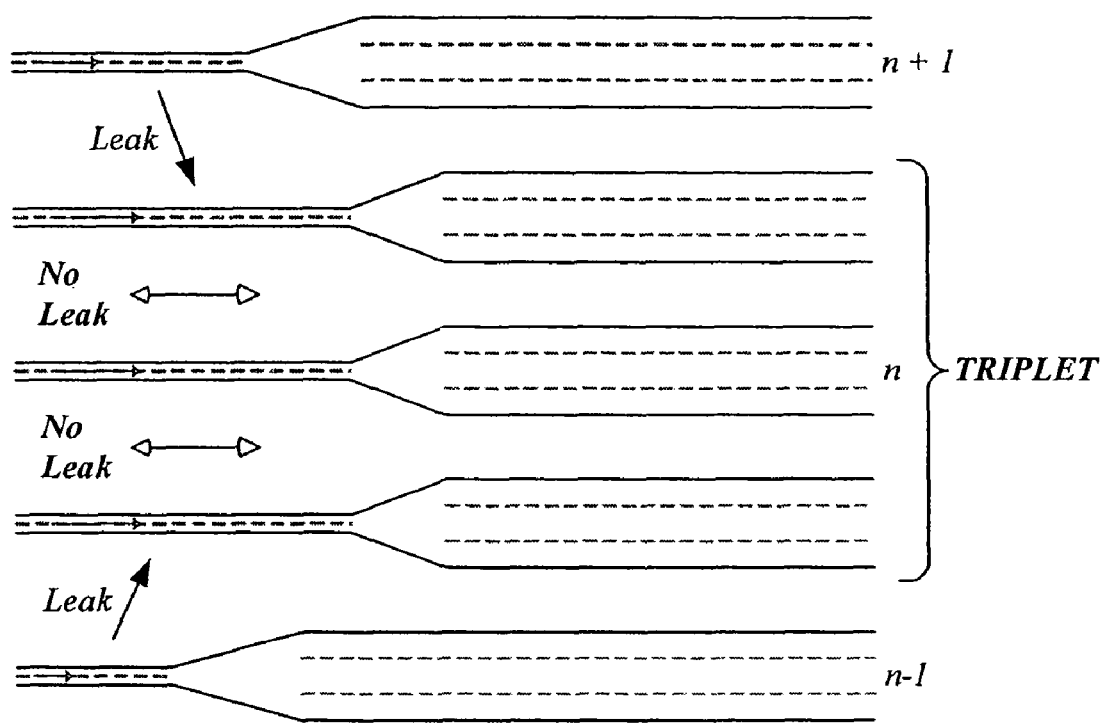
FIG. 43 is a diagram showing channels patterned in triplicate, according to another embodiment of the invention.

In some embodiments, neighboring microchannels are isolated by patterning the channels in triplicate, so the middle channel of the triplicate is substantially shielded from leaks from the flows in neighboring channels (FIG. 43). Devices such as these, as well as other devices described herein, may be fabricated, for instance, using anisotropic etching (e.g. KOH or TMAH) to achieve channels with different cross-sectional dimensions in a single etch process step.

It must be appreciated that many different sets of catalyst conditions (metals, supporting layers, particle sizes preparation and deposition methods, etc.) and reactive and non-reactive chemical conditions (feed gases, flow rates, temperatures, etc.) known to those skilled in the art can be combined to produce nanostructures in accordance with the present invention. Furthermore, slight changes in the catalyst, reaction chemistry, and/or reaction conditions can significantly affect the growth morphology of the nanostructures, which in turn, may influence the ability of the nanostructures to be fabricated in elongated configurations and processed in microchannels.

Figure 44:
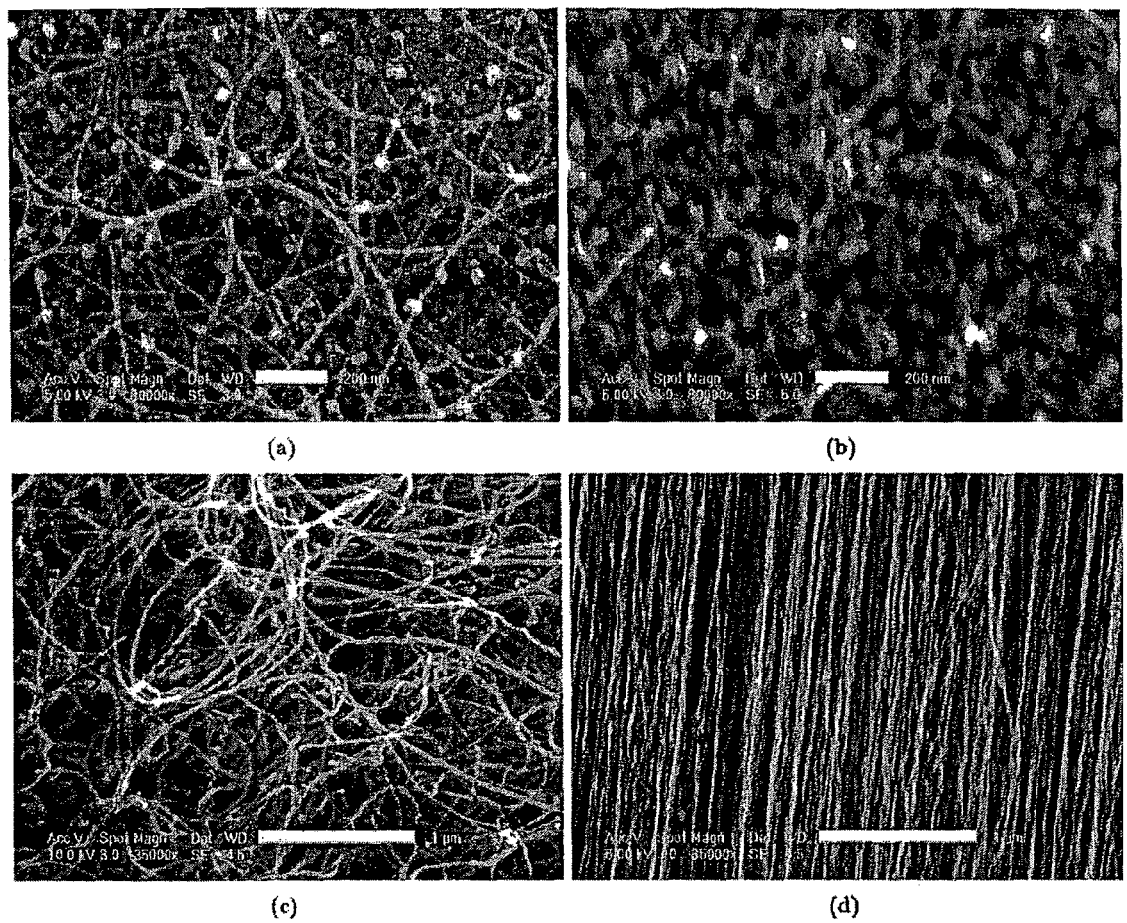
FIGS. 44A-D shows carbon nanotubes grown from catalyst films deposited by electron beam evaporation, according to another embodiment of the invention.
Figure 45:
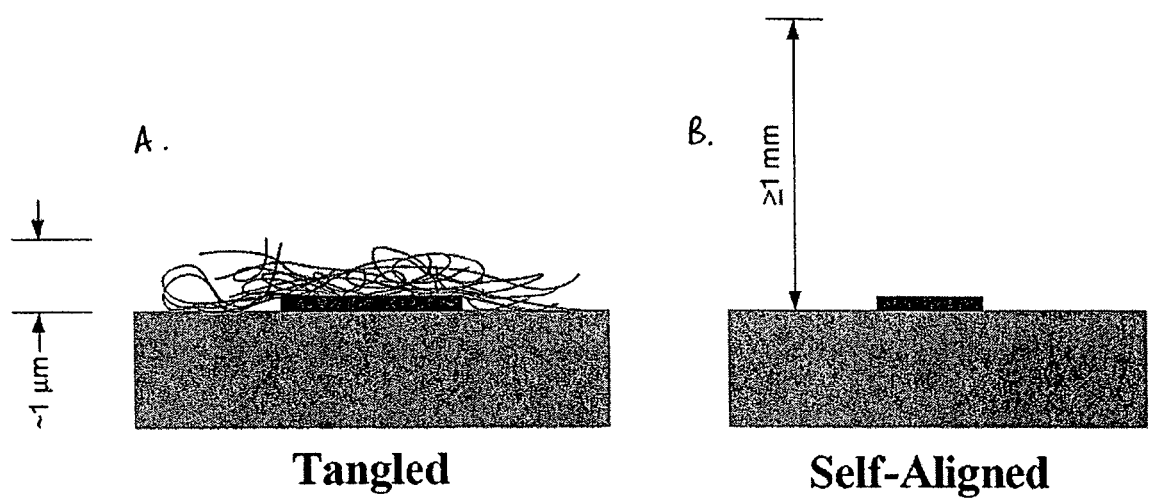
FIGS. 45A and 45B show the difference between tangled and self-aligned growth modes, according to another embodiment of the invention.
Figure 46:
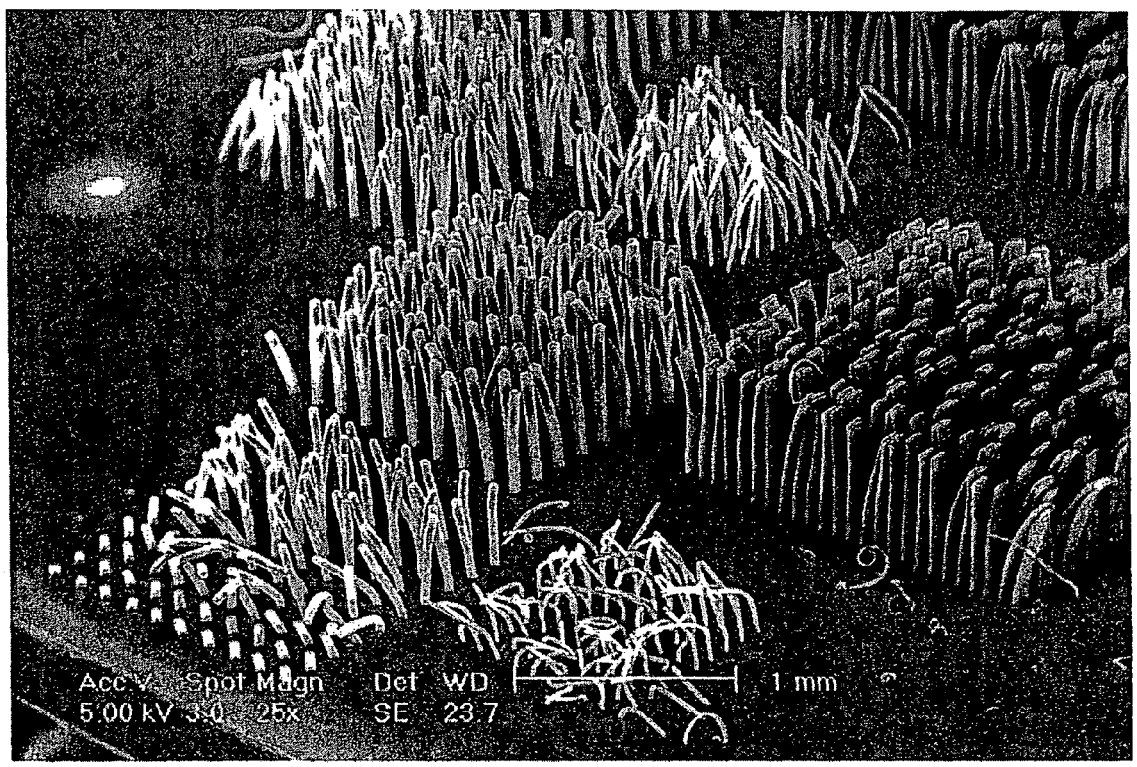
FIG. 46 shows examples of aligned nanostructures, according to another embodiment of the invention.
Figure 47:
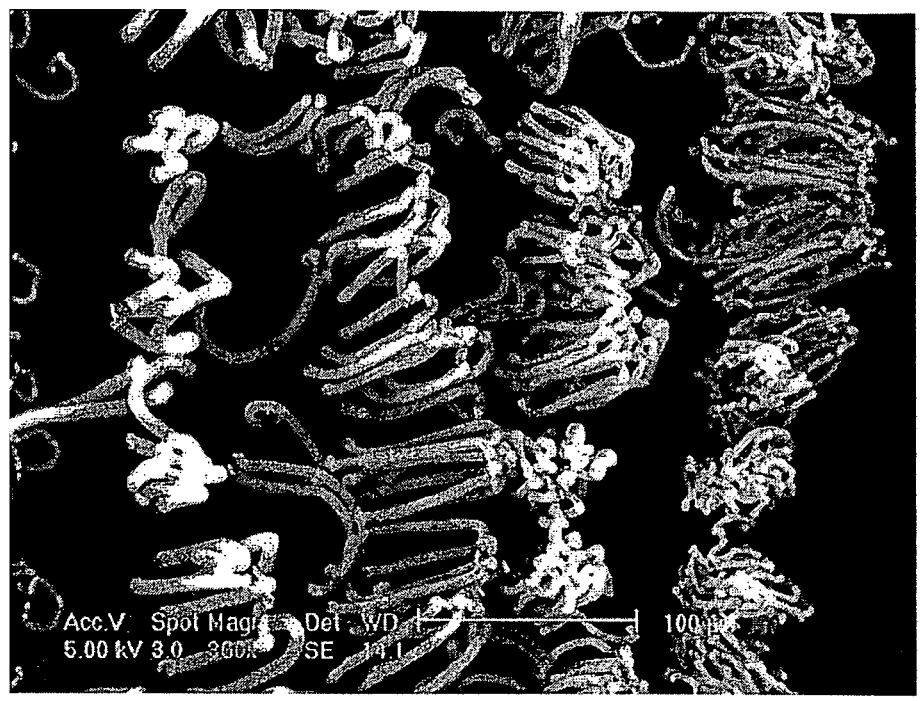
FIGS. 47A and 47B show different sizes of growth sites can influence the tendency of nanostructures to self-align during initial growth, according to another embodiment of the invention.
Figure 47:
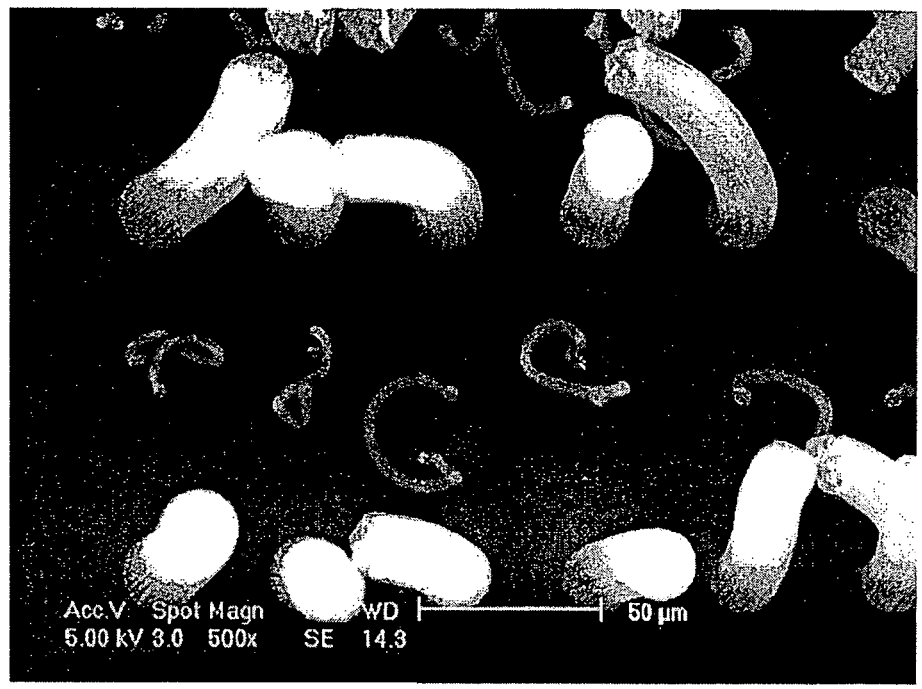
Figure 48:
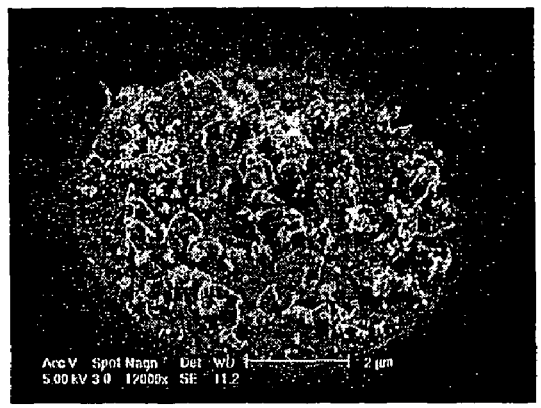
FIGS. 48A-F show CNT growth from similar circular catalyst patterns processed inside a microchannel, according to another embodiment of the invention.
Figure 48:
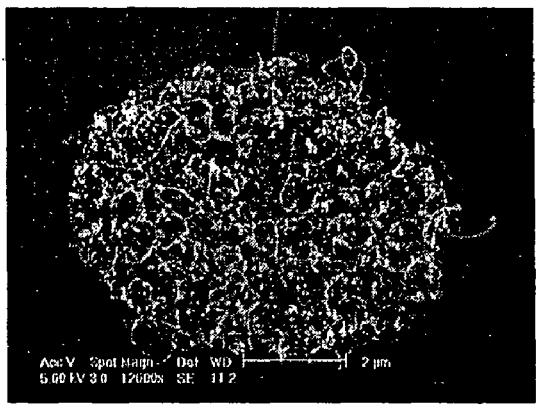
Figure 48:
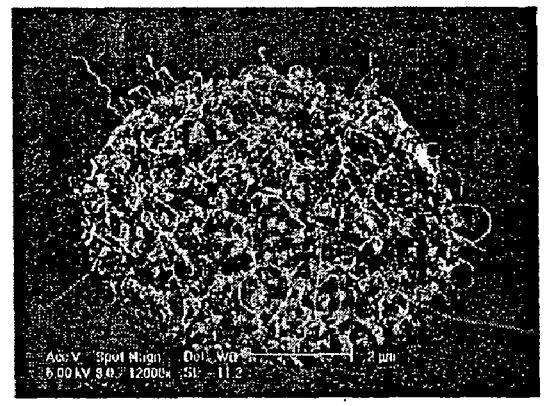
Figure 48:
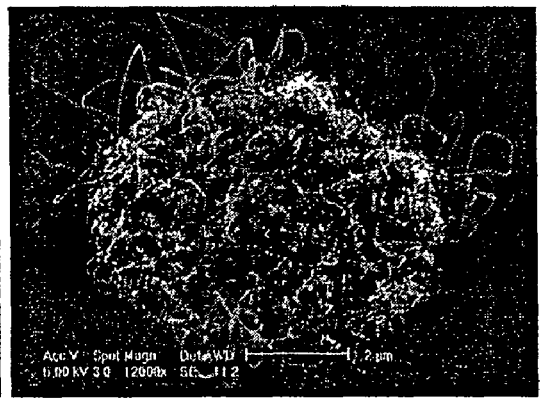
Figure 48:
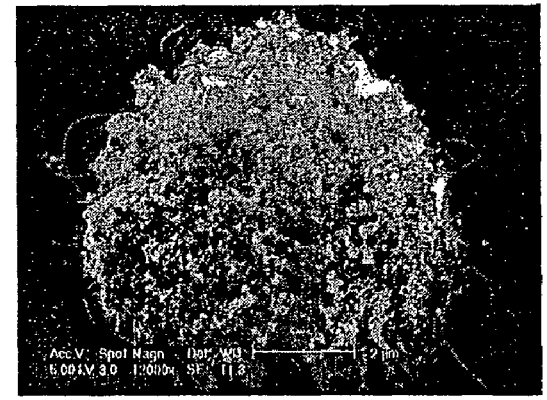
Figure 48:
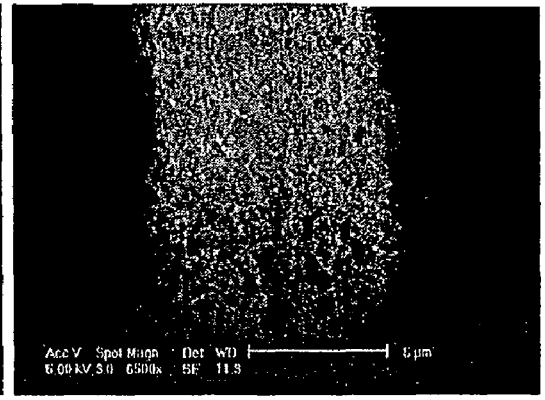

For example, FIGS. 44A-C show carbon nanotubes grown from catalyst films deposited by electron beam evaporation. When a 3/1.5/20 nm Mo/Fe/$Al_2O_3$ film is processed in 80/320 sccm of $H_2$/$CH_4$ at 750-900, a tangled film containing single-walled carbon nanotubes was grown. When a 1/10 nm Fe/$Al_2O_3$ film is processed in 100/400/250 sccm $C_2H_4$/$H_2$/Ar, a vertically-aligned film containing multi-walled carbon nanotubes was grown. In the latter case, the density of growth sites and the initial growth rate of the carbon nanotubes can be sufficient for the nanotubes to initially "self-align" or "vertically-align" and grow roughly perpendicular to the substrate, as is known to those of ordinary skill in the art. The long-range order among the CNTs can allow growth without significant hindrance due to surface interactions. In the former case, thermal vibration and other fluctuations in the growth environment cause the nanotubes to become tangled and bound to each other and to the substrate by surface interactions. Employing techniques for patterning the catalyst, the location and cross-sectional geometry of nanotube structures can be specified. The size of the growth site (i.e., the size of the catalyst area) can also influence the tendency of the nanostructures to self-align during initial growth, as shown in FIGS. 47A and 47B. FIG. 45 shows the difference in structure between the tangled and the self-aligned growth modes.

Furthermore, the yield of CNTs from a certain area of catalyst varies based on the time-temperature history of the reactant mixture. FIGS. 48A-F show CNT growth from similar circular catalyst patterns processed inside a microchannel, where enrichment of the flow along the channel (following from spots 1 to 6) causes increased yield and eventual high-yield growth, which resembles the "self-aligned" growth mode.

Production of long elongated nanostructures in large quantities could significantly affect materials and materials-based industries, because nanostructures such as CNTs could be woven into cables, thread, and fabric, or impregnated in composite matrices. These materials can have exceptional mechanical properties, being lightweight with high ultimate strength and resistance to buckling. In addition, superior electrical and electromechanical transduction properties of CNTs could warrant applications of the fibers as wires, supercapacitors, and actuators. Immediate applications may include lightweight aircraft and spacecraft structures, composite materials for the automotive and construction industries, and in small injection molded parts for a variety of applications.

The following examples are intended to illustrate certain embodiments of the present invention, but are not to be construed as limiting and do not exemplify the full scope of the invention.

EXAMPLE 1

Figure 39C:
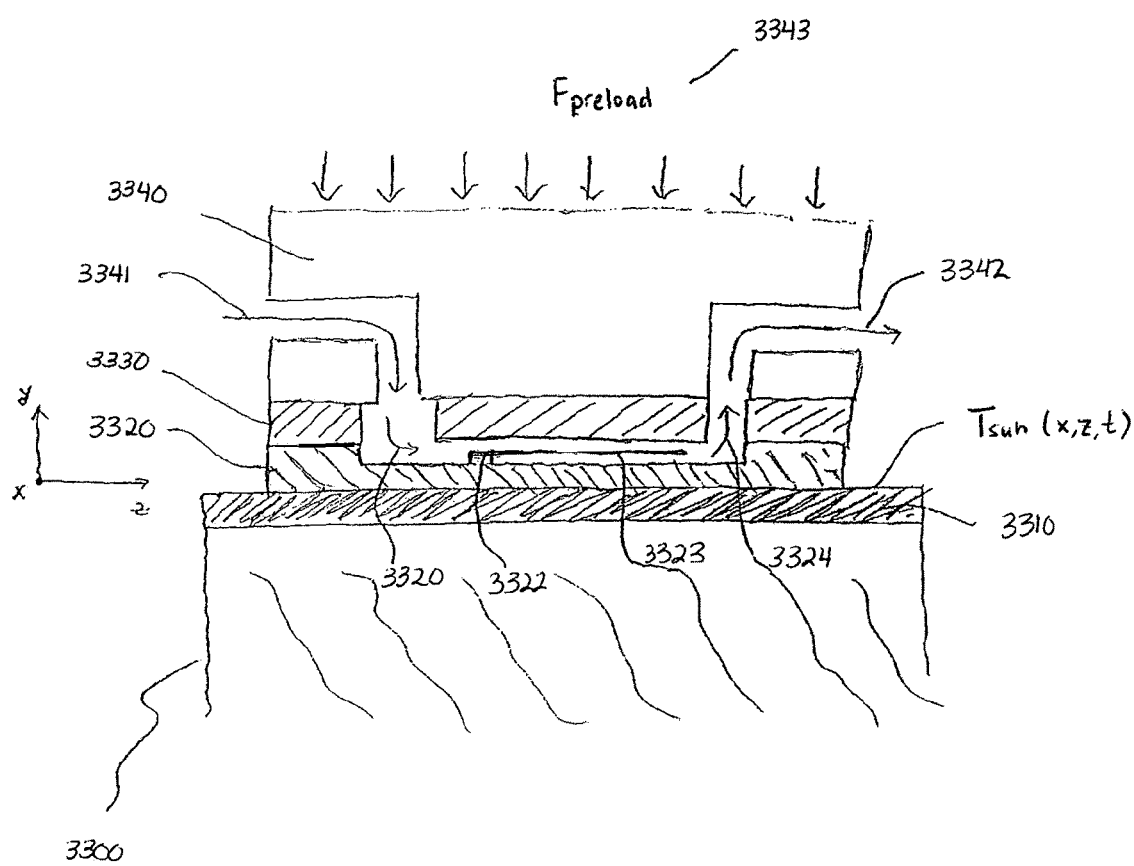

In a first example, gas flows in microchannels are used to grow long horizontally-aligned CNT strands. An array of parallel microchannels was fabricated on a (100) silicon wafer substrate by photolithography and KOH etching, following the process described in FIG. 19A. The microchannels had the "two-stage" design described previously and shown in (FIG. 36D). A catalyst film of 1/10 nm $Fe/Al_2O_3$ was deposited in the channels or on a complimentary substrate (as suggested by the inverted configuration of FIGS. 19B and 19D), by e-beam evaporation, and the catalyst was patterned by lift-off of image-reversal photoresist. The device can be clamped in a fixture and placed in a tube furnace as suggested by FIGS. 39A and 39B, or packaged on a heated substrate as suggested by FIG. 39C. The device was operated in the flow reversal configuration shown in FIG. 42, where the main furnace tube is filled with the reactant mixture of $C_2H_4/H_2/Ar$, and a pressure drop is applied across the microchannel array using a vacuum generator, drawing a desired flow of the reactant mixture into the microchannel array. The reactant flow initiates the growth of CNT strands from the catalyst patterns. The CNTs initially self-align and grow upward from the floor of the microchannel, and then are bent in the downstream flow direction and continue to grow horizontally along the length of the microchannel (i.e., in the direction of the fluid flow). This example shows that confined environments such as microchannels and flows therein can be used to direct the growth of elongated nanostructures.

EXAMPLE 2

In a second example, CNT strands are grown by flowing a reactant mixture through a catalyst-loaded porous diffuser. First, an array of fine holes (e.g. 7-70 mc diameter, 700 μm depth) was etched through a silicon wafer by DRIE, and then a $Fe/Al_2O_3$ film is deposited on one side of the wafer. The diffuser (e.g., a selected area of the silicon wafer, which has been cut into dies) was sealed on the end of a tube, and the assembly was placed in a tube furnace as suggested by FIG. 23B. A reactant mixture of $C_2H_4/H_2/Ar$ was introduced through the housing tube holding the diffuser, and the gas flowed through the holes in the substrate and reached the catalyst film on the opposite side of the substrate. Aligned CNT strands were formed on the surface of the substrate (FIG. 23C), and continued to grow into long strands. By providing a uniform supply of reactant to the catalyst over a broad area of growth sites, this configuration enables uniform chemical conditions throughout the CNT growth reaction because of the short diffusion lengths between the holes in the diffuser and the areas of catalyst. The gas flow through the holes and the past growth site carries away reaction products. An additional flow is provided in the environment surrounding the diffuser (e.g., in the main furnace tube) to maintain an inert atmosphere and maintain the purity of the CNTs throughout the reaction. This example shows that a porous substrate can be used to direct the growth and assembly of elongated nanostructures.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those of ordinary skill in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those of ordinary skill in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of growing an elongated nonostructure, comprising:
   causing a nanoparticle catalyst to float in a microfluidic channel by applying a magnetic or an electromagnetic field;
   flowing a fluid in a first direction in the microfluidic channel;
   initiating growth of an elongated nanostructure from the nanoparticle catalyst while the catalyst is floating in the microfluidic channel; and
   continuing growth of the elongated nanostructure substantially in the first direction in the microfluidic channel.

2. The method of claim 1, wherein a short nanostructure is attached to the floating nanoparticle catalyst prior to the initiating growth step.

3. The method of claim 1, wherein the continuing growth step occurs while the nanoparticle catalyst is floating.

4. The method of claim 1, further comprising attaching the nanoparticle catalyst to a post positioned in the microfluidic channel after the floating, initiating growth, and continuing growth steps, and further continuing growth of the elongated nanostructure.

5. The method of claim 4, further comprising releasing the nanoparticle catalyst and the elongated nanostructure from the post after the elongated nanostructure has reached a predetermined length.

6. The method of claim 5, further comprising introducing an additional catalyst into the microfluidic channel, and initiating growth of a second elongated nanostructure from the additional catalyst.

7. The method of claim 4, wherein the nanoparticle catalyst and the elongated nanostructure are released from the post by applying an electric or electromagnetic field.

8. The method of claim 1, comprising:
   attaching a plurality of nanoparticle catalysts to an island comprising an apex, wherein the island is positioned in the microfluidic channel, and wherein the plurality of nanoparticle catalysts are in the form of isolated growth sites that are positioned near the apex of the island and configured to determine the size and initial growth direction of a plurality of elongated nanostructures to be grown from the plurality of nanoparticle catalysts.

9. The method of claim 1, wherein the elongated nanostructure is a carbon nanotube or a nanowires.

10. The method of claim 1, comprising applying an electric field during growth of the elongated nanostructures, wherein the electric field is between the nanoparticle catalyst and one or more surfaces of the microfluidic channel.

11. The method of claim 1, wherein the initiating growth step comprises applying a first force to the nanoparticle catalyst, and wherein the continuing growth step comprises applying a second force different from the first force to the elongated nanostructures.

12. The method of claim 8, further comprising assembling the plurality of elongated nanostructures into a strand.

13. The method of claim 1, comprising:
   displacing at least a portion of the elongated nanostructure in a second direction by applying a directed force in the second direction.

14. The method of claim 1, further comprising growing a plurality of elongated nanoparticle nanostructures from the catalyst substantially in the first direction in the microfluidic channel.

15. The method of claim 14, further comprising assembling the plurality of elongated nanostructures into a strand.

16. The method of claim 13, wherein the directed force is produced by a magnetic or an electromagnetic field.

17. The method of claim 13, wherein the directed force is produced by an electric field.

18. The method of claim 13, wherein displacing comprises rotating or bending.

19. The method of claim 13, wherein displacing comprises translating.

20. The method of claim 1, wherein the fluid is a reactant for growth of the elongated nanostructure, and wherein the reactant is flowed into the microfluidic channel after the nanoparticle catalyst is introduced into the microfluidic channel.

21. The method of claim 1, wherein causing the nanoparticle catalyst to float comprises applying an alternating field.

* * * * *